United States Patent [19]

Rorden et al.

[11] Patent Number: 4,839,796
[45] Date of Patent: Jun. 13, 1989

[54] STATIC FRAME DIGITAL MEMORY

[75] Inventors: Randall J. Rorden, Orem; Ronald B. Arthur, Provo; Mark Muhlestein, Orem, all of Utah

[73] Assignee: Icon International, Inc., Utah

[21] Appl. No.: 75,063

[22] Filed: Jul. 16, 1987

[51] Int. Cl.[4] .......................................... G06F 12/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,285,039 | 8/1981 | Patterson et al. | 364/200 |
| 4,378,591 | 3/1983 | Lemay | 364/200 |
| 4,442,484 | 4/1984 | Childs, Jr. et al. | 364/200 |
| 4,445,170 | 4/1984 | Hughes et al. | 364/200 |
| 4,473,878 | 9/1984 | Zolnowsky et al. | 364/200 |
| 4,477,871 | 10/1984 | Keshlear | 364/200 |
| 4,479,180 | 10/1984 | Miller et al. | 364/200 |
| 4,484,262 | 11/1984 | Sullivan et al. | 364/200 |
| 4,485,435 | 11/1984 | Sibley | 364/200 |
| 4,488,256 | 12/1984 | Zolnowsky et al. | 364/900 |
| 4,500,962 | 2/1985 | Lemaire et al. | 364/200 |
| 4,519,032 | 5/1985 | Mendell | 364/200 |
| 4,527,232 | 7/1985 | Bechtolsheim | 364/200 |
| 4,528,648 | 7/1985 | Lew | 365/236 |
| 4,545,016 | 10/1985 | Berger | 364/200 |
| 4,550,368 | 10/1985 | Bechtolsheim | 364/200 |
| 4,577,274 | 3/1986 | Ho et al. | 364/200 |
| 4,580,217 | 5/1986 | Celio | 364/200 |

OTHER PUBLICATIONS

K. Shankar, "Wait-State Remover Improves Systems Performance", VLSI Systems Design, Nov. 1986, pp. 102-103, 110.

Primary Examiner—Raulfe B. Zache
Attorney, Agent, or Firm—Workman Nydegger Jensen

[57] ABSTRACT

A digital memory system wherein a plurality of frames in the memory, each frame holding a page of data, may be rapidly accessed utilizing static column dynamic random access memories (SCRAMs). The SCRAM devices are configured such that a page of data is located on corresponding rows of a plurality of SCRAM devices, the corresponding rows being referred to as frames. Once a row has been activated into static column mode, successive accesses to the same row may be made very rapidly. In the presently preferred embodiments, a plurality of banks are provided, each bank being capable of holding one page of data in static column mode. In the preferred embodiments, a tag register and comparator are provided which are associated with each bank. The tag register contains a portion of the address which previously caused an access to its corresponding bank. An address is presented to all the tag registers and comparators. If a match occurs, a memory access to the bank corresponding to the matching tag register may be made while the row in the selected bank is still in static column mode.

56 Claims, 61 Drawing Sheets

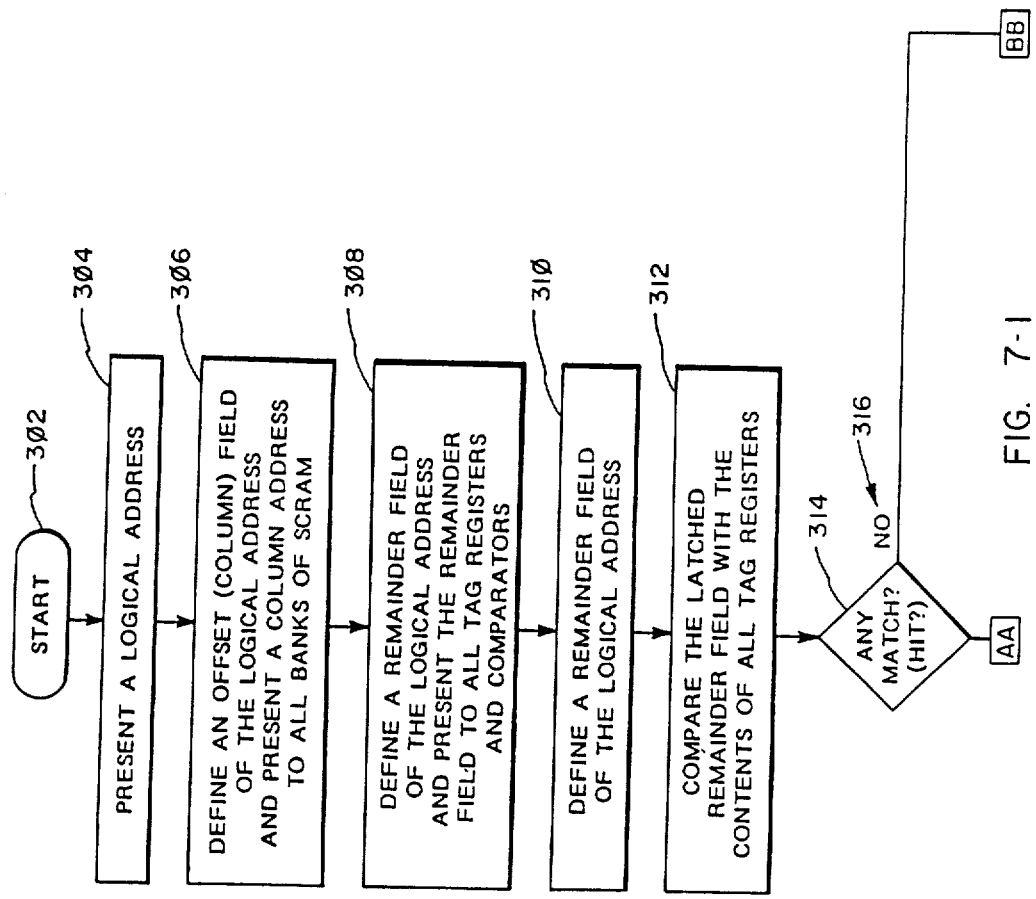

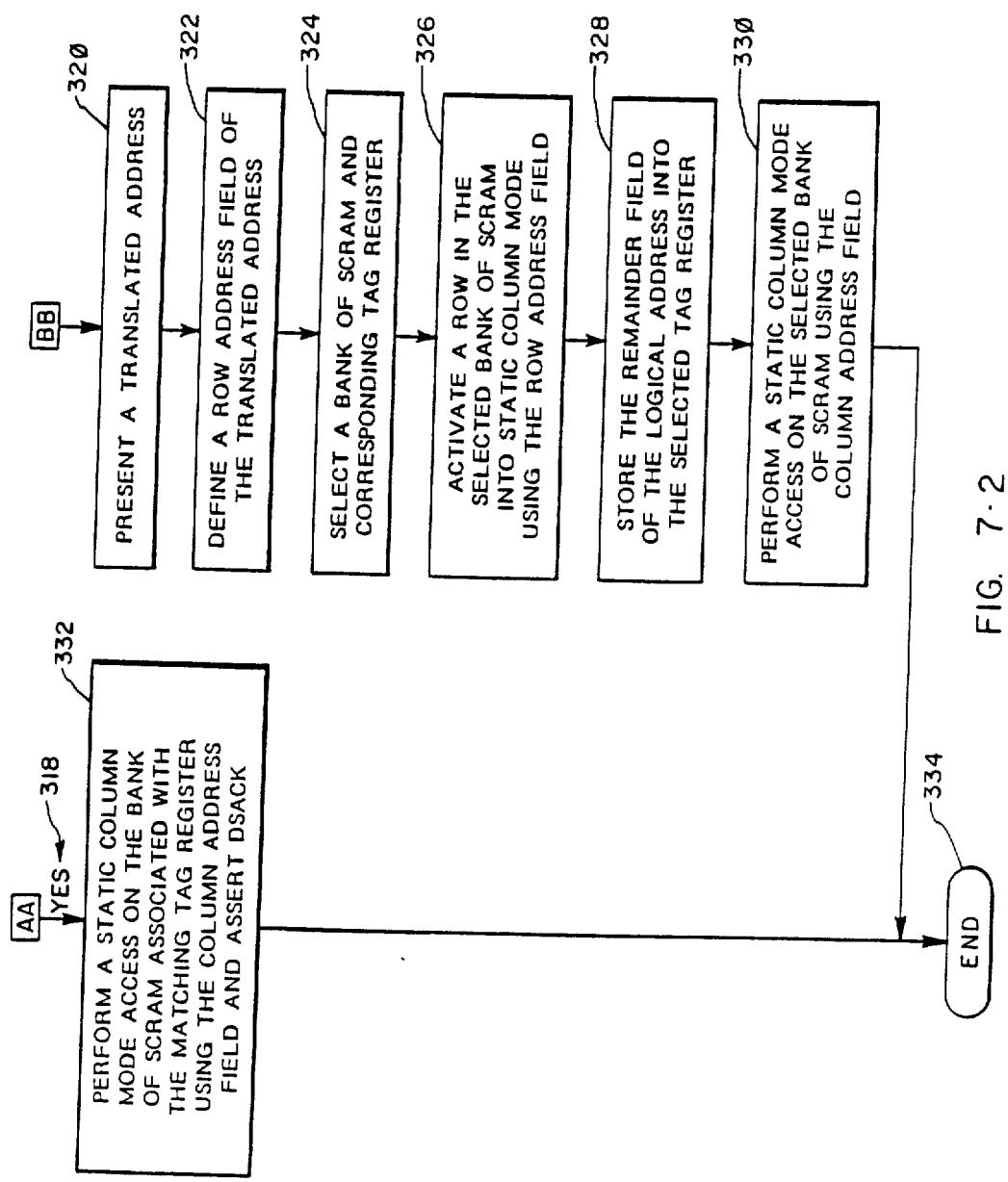
FIG. 7·2

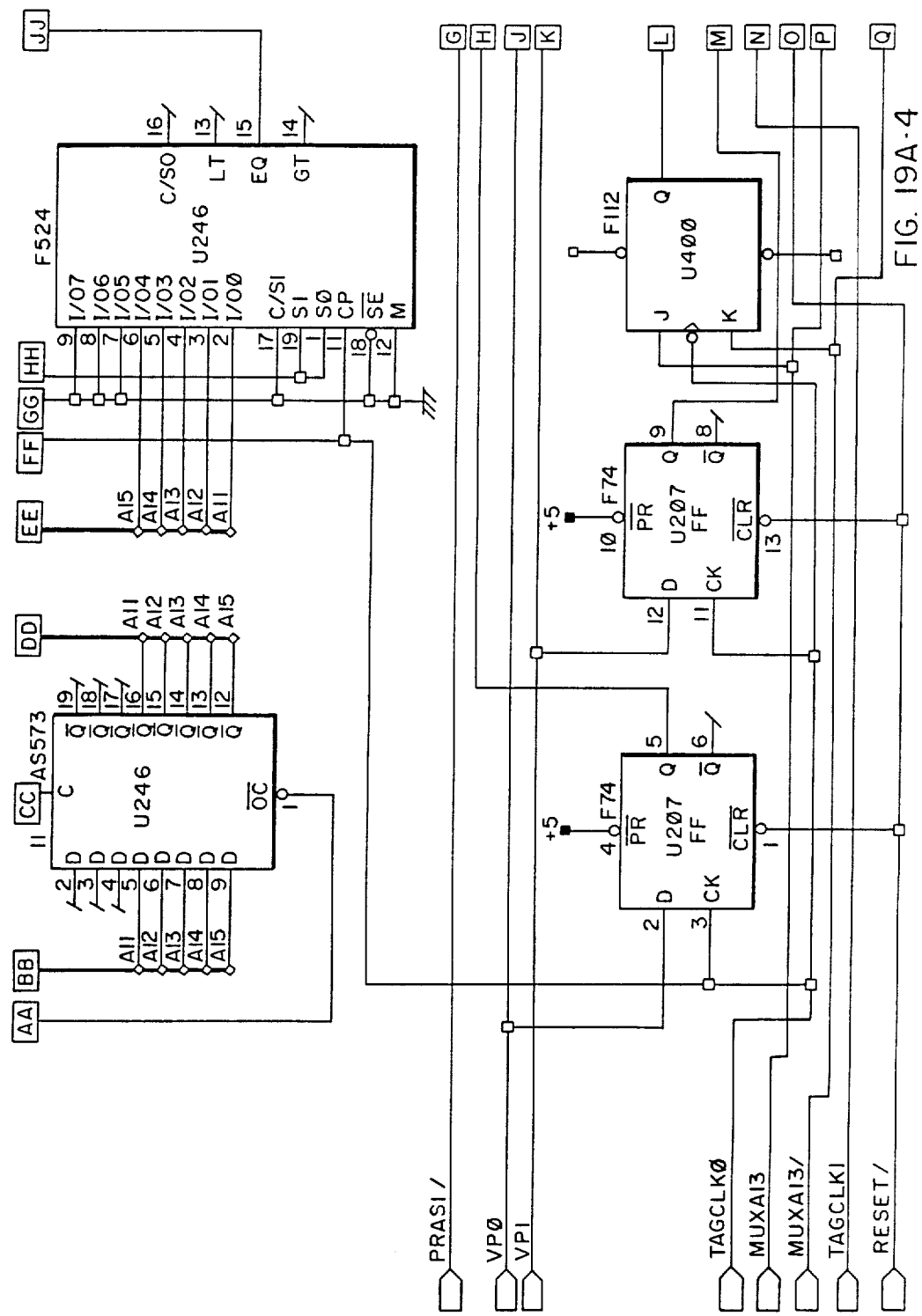
FIG. 19A·4

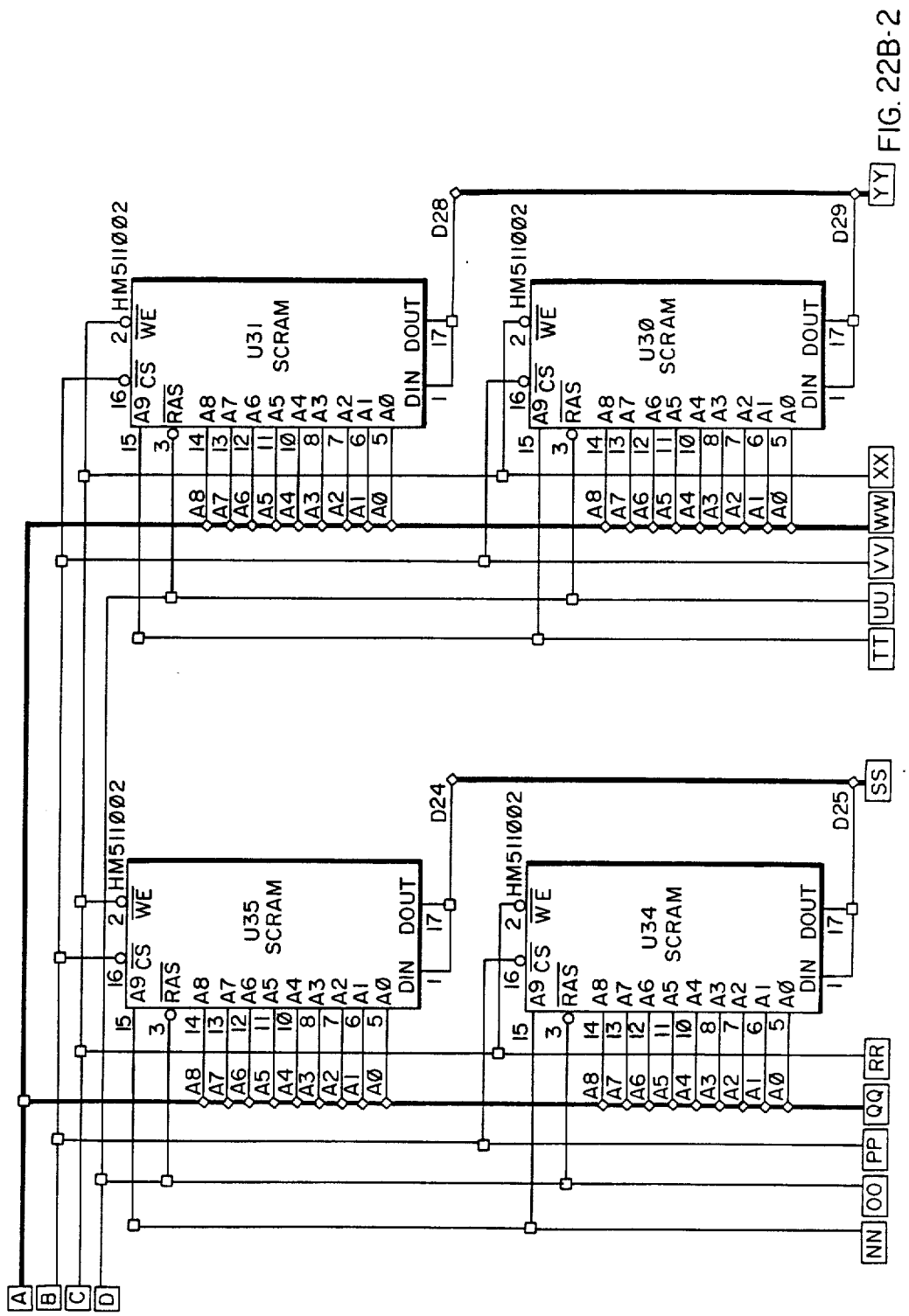

STATIC FRAME DIGITAL MEMORY

BACKGROUND

1. The Field of the Invention

This invention generally relates to memories for use in digital computers. More particularly, this invention relates to a system architecture and an accompanying method for providing a high speed and high density semiconductor random access memory for use in digital computers.

2. Background Art

At the heart of modern digital computers is the microprocessor. The power of available microprocessors has dramatically increased in recent years. State of the art microprocessors are versatile devices capables of performing a myriad of functions. Furthermore, modern microprocessors are capable of performing millions of operations per second. The speed at which microprocessors operate is expected to continue to experience dramatic increases in the foreseeable future.

Faster microprocessor operating speeds allow a single microprocessor to perform complex operations without requiring that an interactive user experience any noticeable delay between issuing a command and receiving the results. Alternatively, a single "fast" microprocessor can handle many individual processes sequentially without introducing any significant delays which are apparent to the user of the computer. Still further, multiple microprocessors may be used in a computer to increase the effective operating speed of the computer even further or to increase the number of processes which the computer can handle.

In contrast to the increase in operating speed of modern microprocessors, many memory devices used in conjunction with microprocessors operate much more slowly than the microprocessors themselves.

While the design of some memory devices has progressed to allow such memory devices to achieve operating speeds as fast as modern microprocessors, it appears that for the foreseeable future improvements in microprocessors operating speeds will outpace improvements in memory operation speed. Thus, it is not uncommon for many computer systems to be "memory bound." That is, the performance of the computer, i.e., the number of instructions per second (IPS) which the computer is capable of performing, is limited by the performance of the memory devices used therein.

In general, the broad category of memory devices which is relied upon during the operation of a computer is referred to as random access memory (RAM). A memory device can be considered a random access device if the length of time it takes to access any two locations within the memory device is approximately equal. Thus, a magnetic disc drive storage device can be thought of as a random access device.

Most often, however, "electronic" memory devices are used in computer systems as the primary, or main, memory. Generally, such memory devices are semiconductor based (such as TTL or CMOS technology) or are based on some other scheme such as bubble memories.

The density, speed of operation, and cost of a particular memory device are generally related. For example, magnetic disc drives, while providing very dense storage at a low cost per bit, are extremely slow (their speed of operation being measured in milliseconds) compared to the operating speed of modern microprocessors (their speed of operation being measured in nanoseconds). Presently, the memory devices which are capable of operating at speeds close to those required for use with a microprocessor are based upon semiconductor technology.

As commonly available now, semiconductor memory devices (which are fabricated as monolithic integrated circuits) are commonly available in either a configuration referred to as static RAM (SRAM) or dynamic RAM (DRAM).

SRAM devices have the predominant characteristic of being able to access locations within the SRAM internal memory array in a very short time period. Presently, SRAM devices are able to access an internal memory location in a time period on the order of 20 to 100 nanoseconds. Such fast access times allow computer memories to be designed which do not cause the microprocessor to "wait" for the memory access to be completed.

SRAM devices, however, are not very "dense" using present technology. Generally, only up to 65,536 bits (64 KBits) of memory are allowed on each integrated circuit. The low "density" of SRAM devices is due to the fact that each cell in the memory array (which stores one bit) may require the formation of up to six transistors.

Alternatively, DRAM devices are very dense. Presently, DRAMs are available which allow 1,048,576 million bits (1 Mbit) of memory on each integrated circuit. It is expected that the density of DRAM devices will increase dramatically in the future. The high density of a DRAM is possible because each cell in the memory array may require as few as one transistor and a capacitor.

Since DRAM devices are very dense, the cost per bit is generally much less than the cost per bit of SRAM devices. However, DRAM devices inherently operate at slower speeds than SRAM devices. Presently, access times for DRAM devices range from 80 nanoseconds to 150 nanoseconds. Such relatively "slow" access times, when combined with the other delays experienced in a computer, are not fast enough to allow a modern microprocessor, such as the Motorola MC68020, to operate without having to "wait" for the DRAM device to complete a memory access.

Because of the foregoing considerations, a designer of computer systems who desires to provide large amounts of random access memory must use DRAM devices to keep the cost and physical size of the memory at an acceptable level. However, the use of DRAM devices has the inherent drawback of not allowing the microprocessor to operate at its maximum possible speed. Alternatively, the designer of a computer system may use SRAM devices. This will increase the cost and the physical size of the computer system but gives the advantage of providing a memory system which can keep pace with a "fast" microprocessor. Still another alternative is to use a combination of both SRAM and DRAM devices in order to arrive at a compromise between available digital memory space, computer system performance, and cost.

Thus, it will be appreciated that it would be a great advance in the art to provide a digital memory system which would provide a high density memory, at a low cost which is possible using DRAM devices, but which is also capable of accessing memory locations very rapidly as is possible when SRAM devices are used.

It would be a further advance in the art to provide a memory system for use with digital computers which could be used with modern microprocessors and which would not require the microprocessor to enter into any wait states following a memory access request.

It would be a further advance in the art to provide a memory system which is particularly well adapted for use in a computer system implementing virtual memory schemes wherin the number of memory locations available to a process appear to be greater than the number of locations physically present in the memory. It would be yet another advance in the art to provide a memory system and method which is structured so as to allow rapid access to the memory locations most likely to be accessed by the microprocessor.

BRIEF SUMMARY AND OBJECTS OF THE INVENTION

The present invention includes a system and method whereby an address generating device, such as a central processing unit (hereinafter "CPU") or microprocessor, is able to rapidly access a large amount of high density random access memory. The present invention is structured such that those memory locations most likely to be addressed by the CPU may be accessed very rapidly. Central to the present invention is the use of devices known in the art as Static Column Random Access Memory devices (SCRAM), or any equivalent device.

Such SCRAM devices, referred to hereinafter as "SCRAM," are addressed in a manner similar to other semiconductor memory devices in that "device addresses" (row addresses and column addresses) are sequentially presented to the device. The SCRAM shares the high density characteristic of a conventional DRAM device and also shares the high speed characteristic of a conventional SRAM device. The SCRAM has the unique characteristic that once a row device address has been presented to the SCRAM, a great many accesses to various individual locations on the active row (the location being specified by column addresses) may be made very rapidly, on the order of the access time for a SRAM device.

The operation of presenting a row address to the SCRAM is referred to hereinafter as "activating the row into static column mode." The phrase "static column mode" describes the attribute that once a row address is presented to the SCRAM, the column addresses may thereafter be presented as they would be in a SRAM device. The present invention arranges the SCRAM devices such that long sequences of memory accesses may be made very rapidly in static column mode.

In the described embodiments of the present invention, a plurality of SCRAMs are arranged such that a large number of related memory locations, generally referred to as a "page," may be located on corresponding rows of the plurality of SCRAMS. The locations in the SCRAM devices which hold an entire page of data are referred to as a frame. Thus, when all of the corresponding rows of the SCRAM devices are simultaneously activated, i.e., when one frame in the memory is activated into static column mode, accesses to the various columns in the activated, or selected, frame may be made very rapidly. In one preferred embodiment, the number of SCRAM devices euals the number of bits in the word used in the computer system, thus allowing an entire word to be read out of, or written into, the memory system during a single operation.

Still further, the present invention provides a means for determining whether the memory location to be accessed is located in the same frame, i.e., the same row or rows, as that accessed by a previously presented address The present invention provides that all of the previously accessed rows remain in static column mode. Thus, if a currently presented address accesses the same frame in memory all that is necessary to complete the memory access is to present a column address and the memory access is completed very rapidly. Alternatively, if the previously accessed row is not addressed by the currently presented address, the preent invention activates the appropriate row into static column mode and then allows a memory access thereto.

In one preferred embodiment, the SCRAM devices are arranged such that a large number of frames are organized into a unit referred to as a "bank." Each bank can maintain one frame, corresponding to the "same row⇌ in the plurality of SCRAM devices, in static column mode. Furthermore, by providing a plurality of banks, it is possible to maintain several frames activated into static column mode at the same time.

In one preferred embodiment, in which each page comprises 2,048 bytes (1 byte usually representing 8 bits), each frame (which is located on corresponding rows of a plurality of SCRAM devices) allows 2,048 bytes to be accessed in static column mode. The number of frames which may be activated into static column mode increases as a multiple of the number of banks used in the memory system. In this way, a large number of pages of memory (each page being stored in a frame) may be rapidly accessed by the CPU as if the memory comprises static RAM.

Since the present invention allows an entire frame in digital memory to be accessed as if it were static RAM, the present invention is best referred to as a "Static Frame Digital Memory."

In view of the foregoing, it is a primary object of the present invention to provide a high density, fast access memory system and method for use in a digital computer.

Another object of the present invention is to provide a high density, fast access memory system and method which is particularly useful in a digital computer system implementing a virtual memory scheme.

Yet another object of the present invention is to provide a digital memory system and method which will allow a microprocessor to perform memory accesses without being required to undergo any wait states.

A further object of the present invention is to provide a digital memory system and method allowing for the efficient organization of data structures such that groups of data which are sequentially accessed are maintained in a mode which allows extremely fast access time to those locations.

These and other objects of the present invention will become more fully apparent during an examination of the following description and the appended claims taken in connection with the accompanying drawings.

BRIEF DESCRIPTION OF THE DRAWINGS

In the description which follows, and in the accompanying drawings, many of the figures have been divided into two or more parts in order to increase their clarity. Where a figure has been divided into two or more parts, the designation, "-N" has been added as a suffix to the figure number where "N" is the part into which the figure has been divided. For example, in the detailed schematic diagram shown in FIG. 9A, the figure has been divided into four parts designated as "FIG. 9A-1," "FIG. 9A-2," FIG. 9A-3, and "FIG. 9A-4." In the case of detailed schematic diagrams which have been divided into four parts, the schematic may be reassembled by placing the first part in the upper left position, the second part in the upper right position, the third part in the lower right position, and the fourth part in the lower left position. Also, the boxed letter designations indicate interconnections between the different parts of the same figure.

FIGS. 3-1, 3-2 are a representation of one bank of SCRAM devices arranged according to the present invention.

FIGS. 4-1, 4-2 are a representation of a bank of 32 SCRAM devices arranged for use in accordance with the memory system of the present invention and as used in the presently preferred embodiment.

FIGS. 7-1, 7-2 are a flow chart illustrating the method employed by the memory system of the present invention.

FIGS. 9A-1, 9A-2, 9A-3, 9A-4 are a detailed schematic diagram showing the circuit implementation of the logical address latch, tag registers, and comparators represented in FIG. 6 and which are associated with banks 0 and 1.

FIGS. 9B-1, 9B-2, 9B-3, 9B-4 are a detailed schematic diagram showing the circuit implementation of the logical address latch, tag registers, and comparators represented in FIG. 6 and which are associated with banks 2 and 3.

FIGS. 11-1, 11-2, 11-3, 11-4 are is a detailed schematic diagram showing the circuit implementation of the bank decode circuit represented in FIG. 6.

FIGS. 12A-1, 12A-2 are a detailed schematic diagram showing the implementation of the byte selection circuit (not explicitly represented in FIGS. 6 and 17) and which is associated with banks 0 and 1.

FIGS. 12B-1, 12B-2 are is a detailed schematic diagram further showing the implementation of the byte selection circuit (not explicitly represented in FIGS. 6 and 17) and which is associated with banks 2 and 3.

FIGS. 13-1, 13-2 are a detailed schematic diagram showing the circuit implementation of the SCRAM device address portion of the SCRAM address multiplexor represented in FIG. 6 and the board select circuit (not represented in FIG. 6) of the first presently preferred embodiment.

FIGS. 16A-1, 16A-2, 16A-3, 16A-4 and 16B-1, 16B-2, 16B-3, 16B-4 are detailed schematic diagrams showing the circuit implementation of one of the four banks represented in FIG. 6.

FIGS. 19A-1, 19A-2, 19A-3, 19A-4 are a detailed schematic diagram showing the circuit implementation of the logical address latch, tag registers, comparators, and frame latches represented in FIG. 17 and which are associated with banks 0 and 1.

FIGS. 19B-1, 19B-2, 19B-3, 19B-4 are a detailed schematic diagram showing the circuit implementation of the tag registers, frame latches, comparators, and frame latches represented in FIG. 17 and which are associated with banks 2 and 3.

FIGS. 20-1, 20-2 are a detailed schematic diagram showing the circuit implementation of the SCRAM device address portion of the SCRAM address multiplexor represented in FIG. 17 and the board select circuit (not represented in FIG. 17) of the second presently preferred embodiment.

FIGS. 22A-1, 22A-2, 22A-3, 22A-4 and 22B-1, 22B-2, 22B-3, 22B-4 are is a detailed schematic diagram showing the circuit implementation of one portion of the four banks represented in FIG. 17.

DETAILED DESCRIPTION OF THE PREFERRED EMBODIMENTS

Figure 1:
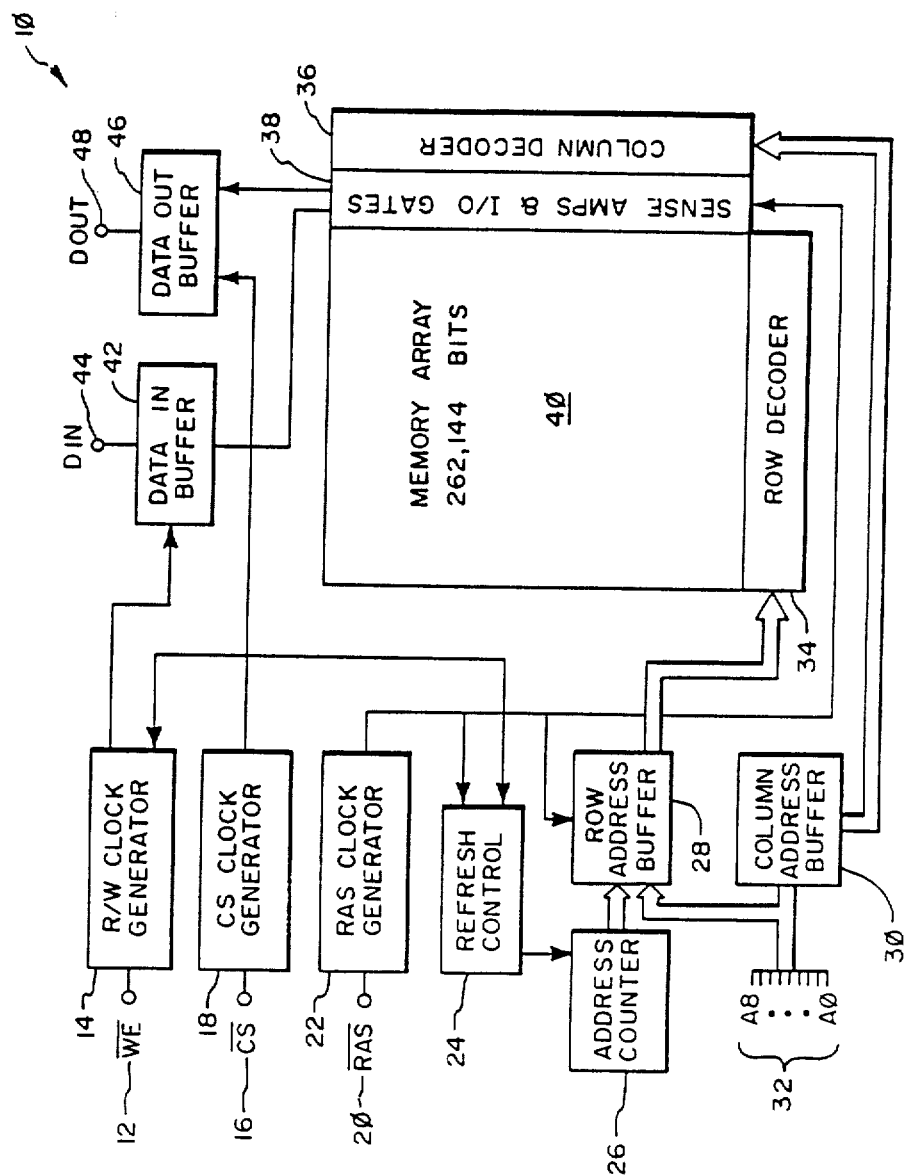
FIG. 1 is a block diagram of a static column random access memory (SCRAM) device which is presently available in the art.

It should be understood that the embodiments described herein, both of the system and the method, are illustrative only and that the invention may be carried out by many different structures and methods other than those described herein.

In the following description, a discussion of the structure and operation of the major component of the presently preferred embodiments will first be presented. Overviews of the systems and methods of the presently preferred embodiments will be provided. A discussion of the detailed circuit implementation of the described embodiments will also be presented.

In order to more clearly understand the detailed schematic diagrams of the circuitry of the presently preferred embodiments, the figures showing the schematic diagrams (FIGS. 9-16 and 19-22) have retained the alpha-numeric designations commonly used in the art. Throughout the drawings like structures and devices are provided with identical or similar alpha-numeric reference numerals.

1. Discussion of A Typical SCRAM Device and the System Architecture which Implements "Static Column Mode" as Used in the Presently Preferred Embodiments—FIGS. 1-4.

As explained previously, a major challenge facing designers of computer system is that of providing large amounts of high density, low-cost digital memory which is also capable of being very rapidly accessed. It is highly important to design a digital memory system which is capable of allowing modern microprocessors to access the digital memory without being required to "wait" for the presentation of stable data on the data bus.

One example of a modern microprocessor which represents the present state of the art is the Motorola MC68020 microprocessor. Complete information regarding the MC68020 microprocessor can be found in the publication entitled MC68020 32-bit Microprocessor User's Manual, 2d Ed. (1985), available from Prentice-Hall Publishers, which is incorporated herein by reference.

The MC68020 microprocessor is presently available in versions which are capable of being operated at speeds up to 20 MHz. Thus, when operating at this maximum speed the clock cycle has a period of 50 nanoseconds. The MC68020 requires three clock cycles, i.e., 150 nanoseconds, to perform a memory cycle. Within each memory cycle, from the time that an address request output occurs to the time that the MC68020 is ready to receive the data from the memory is 95 nanoseconds.

While the MC68020 microprocessor is capable of requesting and receiving data within a period of 150 nanoseconds, only very fast digital memory systems which until the advent of the present invention required relatively expensive static RAM devices, were capable of responding quickly enough to provide stable data to the CPU in such a short time period. Thus, a very fast digital memory is required for use with such modern microprocessors if the computer system is not to become "memory bound."

Furthermore, if past improvements continue at the same rate, the operating speeds of microprocessors will continue to increase during the foreseeable future. Thus, the present invention will have continued application for the foreseeable future as the speed of digital memory systems lags behind the increases obtained in the operating speeds of modern microprocessors.

Delays in memory systems are not only caused by the actual access time required for the memory devices, but also by the intervening circuitry between the CPU and the memory device itself. For example, to achieve the most efficient use of digital memory capacity, it is common to employ a memory management system within the computer. The tasks assigned to such a memory management system may include allocating memory space for each process in a multiprocessing environment as well as implementing a virtual memory scheme the purpose of which will be explained shortly.

A memory management system and method which has particular application for use in the present invention is described in the copending U.S. patent application entitled "Dynamic Memory Management System and Method," filed concurrently herewith, and incorporated herein by reference.

The presently preferred embodiment is also particularly well adapted for use with the MC68020 microprocessor. However, it should be realized that the present invention has application with many different types of microprocessors, and other devices and digital systems, generally referred to as "address generating devices," which are presently available or which may become available in the future. Furthermore, for ease of reference, the term CPU will be used when reference is made to a microprocessor or any other device or structure performing an equivalent function.

In order to provide a memory which has the shortest possible access time, while achieving the greatest memory density at the lowest possible cost, the present invention makes use of devices known in the art as a static column random access memories, or SCRAMs. SCRAMs are available from a number of manufacturers and in a variety of versions. It is expected that SCRAMs will become more sophisticated in the future and will achieve even faster operating speeds and greater memory capacity than those presently available.

Still further, it is expected that other devices which perform the same function as a SCRAM, i.e., capable of operating in a static column mode or a mode which performs the same function, may also become available. Thus, the term "SCRAM,;38 as used herein, is intended to encompass all such devices.

The SCRAM device used in the first presently preferred embodiment is commonly referred to in the art as an HM51258 262,144×1 bit static column dynamic random access memory manufactured by Hitachi Semiconductor, Integrated Circuits Division. Also available from Hitachi is a 1,048,576×1 bit static column dynamic random access memory commonly referred to in the art as an HM511002 and which is incorporated into the second presently preferred embodiment as will be explained. Full information regarding the SCRAM devices can be found in the specification sheets for these devices available from Hitachi at the time this application was filed and which are incorporated herein by reference.

In order to best understand the operation of the presently preferred embodiment, a comprehension of the workings of a SCRAM as presently available is useful. Therefore, a block diagram showing the internal structure of the Hitachi HM51258 SCRAM is provided in FIG. 1. A simplified timing chart showing the principal signals applied to and received from the SCRAM is provided in FIG. 2. In the following discussion, and the accompanying figures, the "slash" symbol ("/") is used to indicate when a signal is "low asserted" and is equivalent to the "bar" symbol used occasionally in the drawings.

Reference will now be made to FIG. 1 wherein is illustrated a block diagram of the internal structure of the Hitachi HM51258 SCRAM. The SCRAM device is generally designated 10. Four major "non-data" signals are presented to the SCRAM device 10 and are essential to its operation. These signals, and their functions, are summarized below in Table A.

TABLE A

| Signal | Function |
| --- | --- |
| WE/ | Write enable (low asserted). Asserted when a write operation to the SCRAM is desired. |
| CS/ | Chip select. (Low asserted). Asserted after a row has been selected and after the column address has been presented to the SCRAM. |
| RAS/ | Row address strobe (low asserted). Asserted when a row address has been presented to the device. |
| A0 ... A8 | 9-bit address bus. The same nine address lines are |

TABLE A-continued

| Signal | Function |
|---|---|
| | used to sequentially present the row address and then the column address. |

As shown in FIG. 1, write enable (WE/) signal 12 is presented to R/W (read/write) clock generator 14. Chip select (CS/) signal 16 is presented to chip select (CS) clock generator 18. Row address strobe (RAS/) signal 20 is also presented to row address strobe (RAS) clock generator 22 in FIG. 1. Refresh control 24 and address counter 26 carry out important functions for the operation of SCRAM 10.

In order to best understand the operation of SCRAM 10, reference will now be made to both the block diagram of FIG. 1 and the timing chart of FIG. 2.

Figure 2:
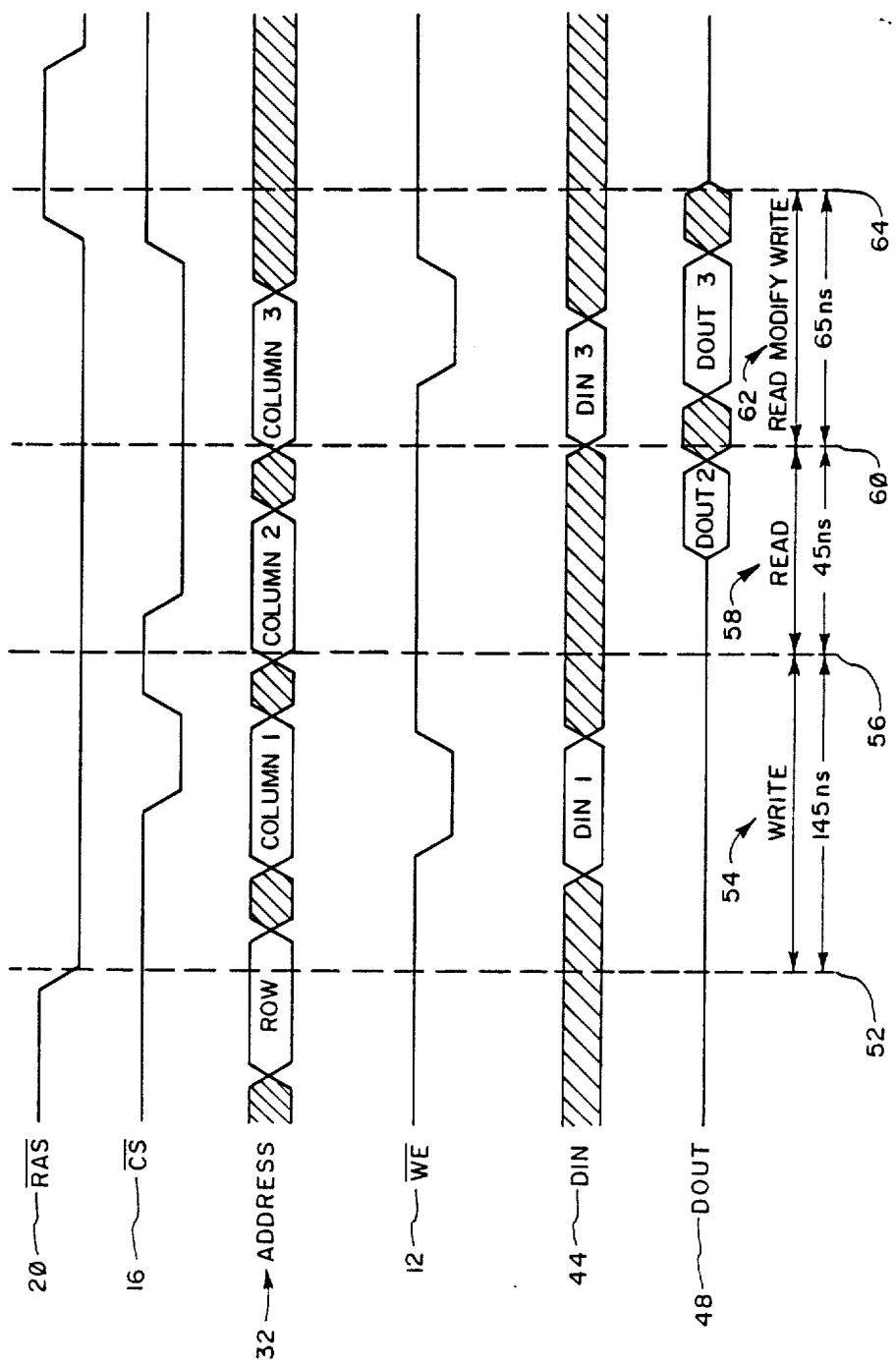
FIG. 2 is a timing diagram for the SCRAM device illustrated in FIG. 1.

In FIG. 2, the RAS 20, CS/ 16 and WE/ 12 signals are communicated to the internal structures of the SCRAM by single conductors. Thus, these signals are represented by single lines. Address 32 is communicated to the internal structures of the SCRAM by nine conductors represented in FIG. 2 by the double line. Likewise, data in (DIN) 44 and data out (DOUT) 48, being "non-control" signals are each represented by a double line symbol. However, in the HM51258 both the data in and data out buses contain only one conductor. Also, the timing marks shown in FIG. 2 are representative of the device.

When a memory access to one of the 262,144 bits in memory array 40 is desired, and no previous memory access has been made to the device, a row address is first presented to address lines 32 as represented in FIG. 2. After the row address has become stable, RAS/ signal 20 is asserted at the time represented at line 52 in FIG. 2. When RAS/ 20 is asserted, row address buffer 28 and row decoder 34 (FIG. 1) select one of 512 rows which may be designated by 9-bits of row address ($2^9 = 512$).

As shown in FIG. 2, once a row has been selected, RAS/ 20 continues to be asserted and a column address is presented to address lines 32. Once the column address on address lines 32 has become stable, CS/ 16 may be asserted and a single memory location may be accessed as will be explained.

The first operation indicated in FIG. 2 is a write operation generally designated 54. During the write operation, a first column address (COLUMN 1) is presented to address lines 32 as explained above. The WE/ 12 signal is then asserted after the data in signal (DIN) 44 has become stable. The 1-bit data signal is received by data in buffer 42 in FIG. 1 and presented to the sense amps & I/O gates 38 also shown in FIG. 1.

With a column address stable on address lines 32, CS/ 16 is then asserted. The column address is presented to column address buffer 30 (FIG. 1) and a specific cell in memory array 40 is selected by column decoder 36 (FIG. 1). The write operation to the memory cell is then completed and WE/ and CS/ are disasserted.

The next operation represented in FIG. 2 is a read operation generally designated 58. Importantly, in this example, the read operation will occur at a memory location in the same row as the previous write operation. Thus, RAS/ 20 remains asserted throughout this operation.

A second column address (COLUMN 2) is presented to address lines 32 at the time indicated by line 56. Once column address 32 (COLUMN 32) becomes stable for read operation 58 then CS/ 16 is once again asserted and the data out bit (DOUT 2) appears at the output of data out buffer 46 from sense amps & I/O gates 38 (FIG. 1).

The HM51258 SCRAM also allows a read modify write operation generally designated 62 in FIG. 2. During the read modify write operation 52, a third column address (COLUMN 3) is presented at the point in time represented by line 60. CS/ 16 may or may not remain asserted between the time that the COLUMN 2 address and the COLUMN 3 address are presented. DOUT 3 (data out 3) then appears at DOUT 48 (FIG. 1). DIN 3 (data in 3) is presented and WE/ 12 is asserted. Finally, RAS/ 20 and CS/ 16 are disasserted when all operations on the selected row are completed.

Importantly, once RAS/ has been asserted, any column located on the selected row may be rapidly accessed. When a row address has been presented, and RAS/ has been asserted, the selected row is said to have been placed in "static column mode." The CS/ (chip select) signal is so named because it functions in a manner very similar to the chip select signal of static RAM devices.

Most importantly, once RAS/ has been asserted, subsequent column addresses may be presented with much less time between each column address presentation than the 95 nanoseconds required by the MC68020 CPU to complete a memory read access. Thus, when operating in static column mode, a SCRAM is able to offer the speed of a static RAM and the density and cost of a dynamic RAM. Also, both the HM51258 and the HM5511002 SCRAMs operate in a manner similar to that just described.

As indicated earlier, the HM51258 and HM5511002 SCRAM devices allow only 1-bit of data to be written or read during a single operation. While it may be that it is sometimes useful to access a single bit of data very rapidly, it is generally much more desirable to access data in words consisting of many bits. By utilizing multiple SCRAM devices (each device allowing access to one bit at a time), it is possible to allow read or write operations to words of data in static column mode.

Figures 1, 3:
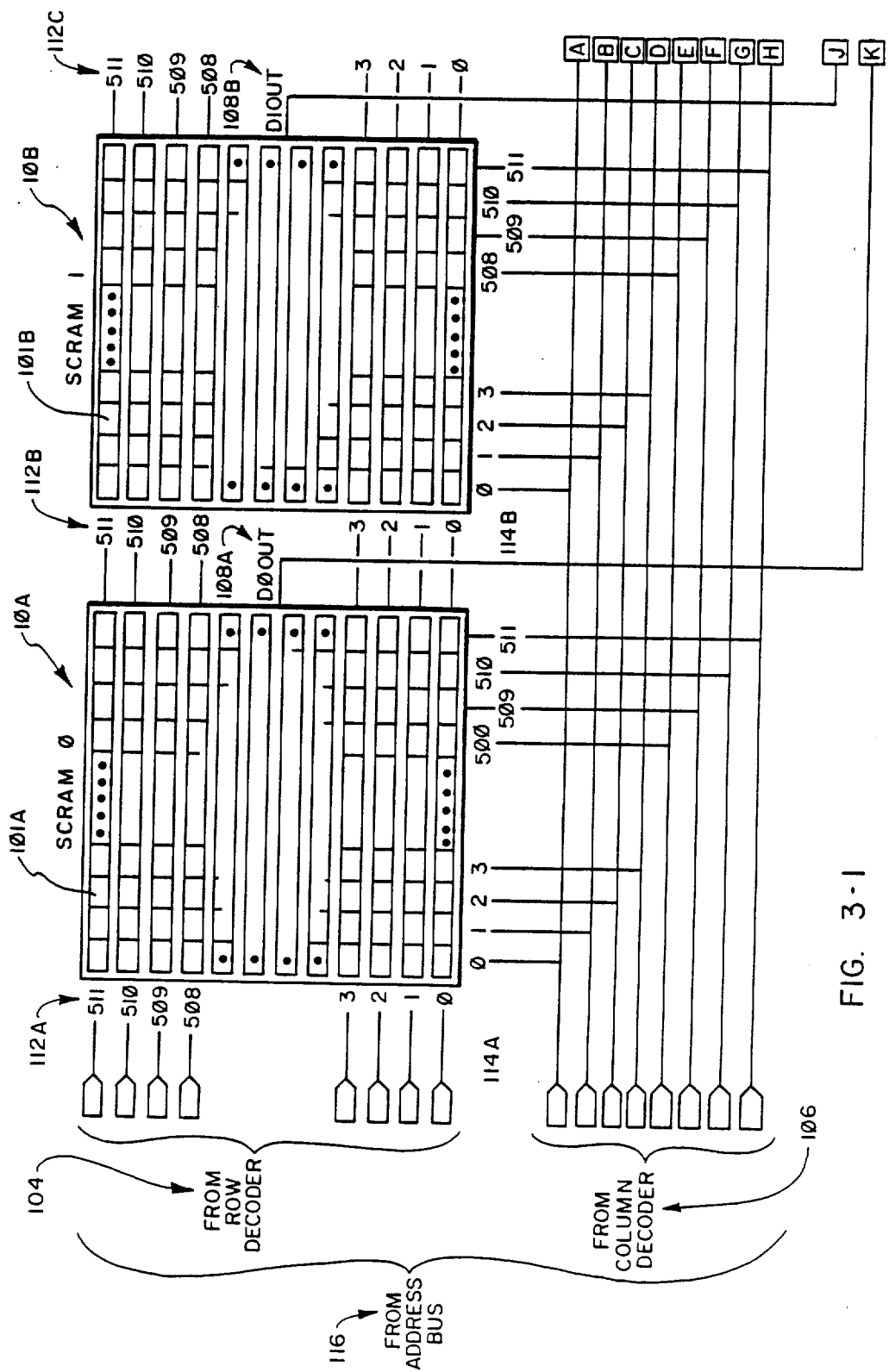
Figures 2, 3:
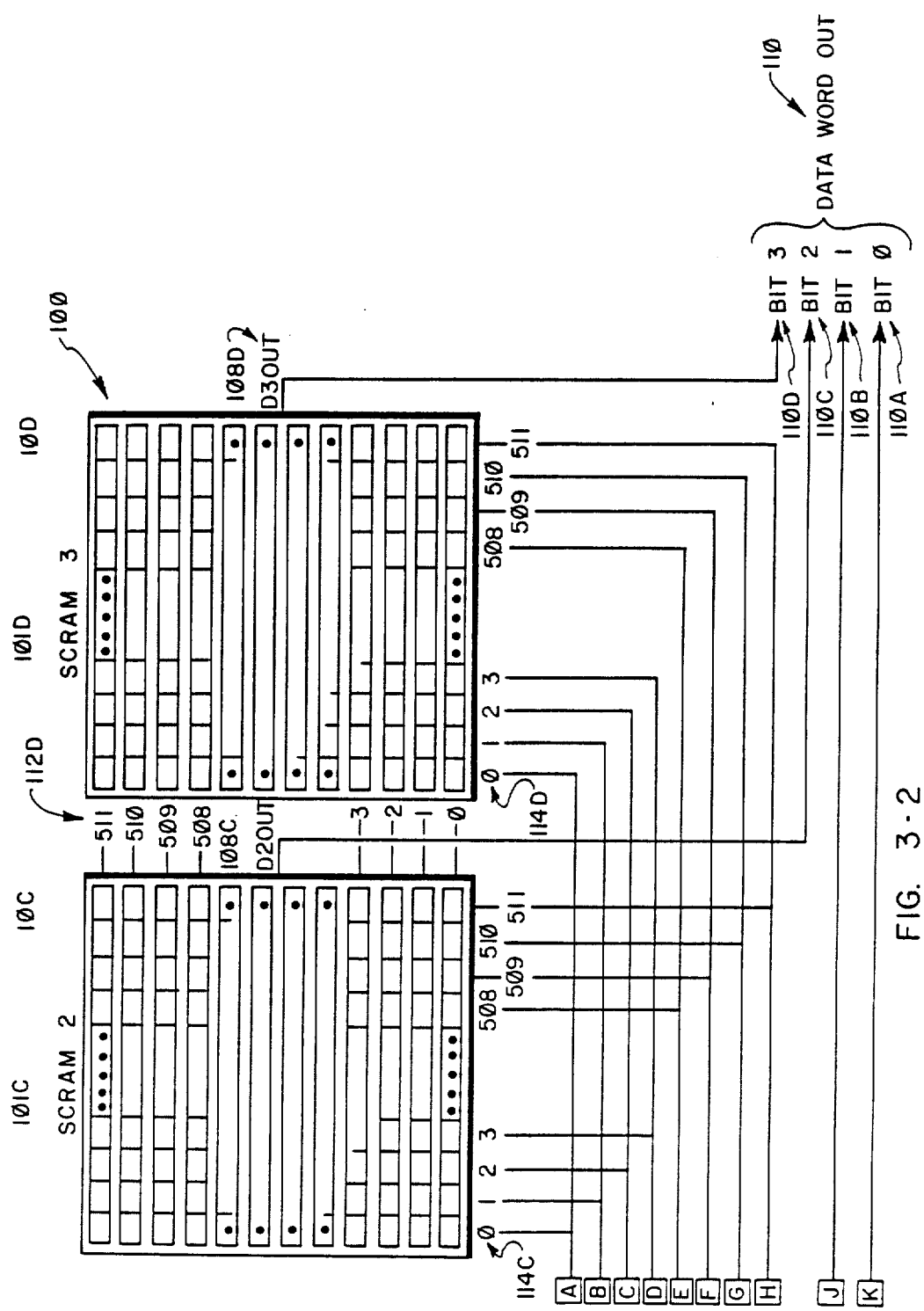

In FIG. 3, four 262,144 × 1-bit SCRAMs are arranged which provide a total memory capacity of 262,144 four bit words. In FIG. 3, four SCRAMs 10A-10D are arranged in what will be referred to as a "bank" and which is generally designated 100 in FIG. 3.

The 4-bit word represented in FIG. 3 is provided to conveniently explain the architecture used in the presently preferred embodiments. It should be understood that the principals explained in connection with FIG. 3 apply equally well to a system using any length of word as well as the presently preferred embodiments, which use a 32-bit word.

As schematically shown in FIG. 3, the internal organization of a HM51258 SCRAM can be conceptualized as consisting of 512 rows, each row being divided into 512 columns. (Thus the need for a 9-bit address input.) This organization is indicated in each of the four SCRAMs represented in FIG. 3. In FIG. 3, none of the internal control circuitry is explicitly shown but the individual 1-bit memory cells contained within the memory array (40 in FIG. 1) are represented at 101A-101D in each SCRAM 10A-10D.

In FIG. 3, the 512 (0-511) rows are generally designated at 112A-112D. The rows of all four SCRAMS 10A-10D are connected in parallel and all receive the same row address from their respective row decoder 34 (see FIG. 1) as generally represented at 104 in FIG. 3.

The 512 (0-511) columns are represented by the column addresses generally designated 114A-114D. As represented in FIG. 3, the columns can also be thought of as being connected in parallel and all receive the same column address from their respective column decoder 36 (see FIG. 1) as generally indicated at 106 in FIG. 3. It will be appreciated from the foregoing explanation that the row decoder 34 and the column decoder 36 of each individual SCRAM 10A-10D are all effectively paralleled to a single address bus as generally designated at 116.

By using the arrangement just explained, when a single address is presented on the address bus, with appropriate control signals as will be appreciated from the previous discussion, the corresponding memory locations are all sumultaneously accessed in each of SCRAMs 10A-10D. For example, if the address corresponding to memory cell 0, 0 was presented on the address bus represented at 116 in FIG. 3, and it was desired to conduct a read operation, the data bits stored at memory cells 0, 0 in each of the SCRAM devices 10A-10D would simultaneously appear at their respective data outputs (D0 OUT-D3 OUT) 108A-108D.

The data outputs 108A-108D of each SCRAM device 10A-10D each provide 1-bit (bit 0 110A-bit 3 110D) in a 4-bit data word generally indicated at 110 in FIG. 3. In this fashion, a plurality of SCRAM devices can be used as a bank to allow simultaneous access to a word containing any number of bits.

The ability of these SCRAM devices to operate in a static column mode is a particular advantage when the above-described bank arrangement is used. For example, it may be desirable to store 512 4-bit words in locations where they may be rapidly accessed. Using the arrangement illustrated in FIG. 3, the 512 4-bit words should all be stored on the same row, for example, row 0 in FIG. 3. That is, bit 0 of all 512 4-bit words are stored in SCRAM 10A. Further, bit 1 of each of the 512 4-bit words would be stored in SCRAM 1 102B. Similarly, bits 2 and 3 of each of the 512 4-bit words would be stored in SCRAM 10C and SCRAM 10D, respectively.

With all 512 words stored on row 0 of SCRAMs 10A-10D, when it is desired to rapidly access any of these words all located on row 0, it is first necessary to activate row 0 into static column mode by presenting the proper address for row 0 and then asserting RAS/ (as shown in FIG. 2). It is then possible to access the columns in each SCRAM 10A-10D by merely presenting the appropriate column address and asserting CS/ (as shown in FIG. 2), an operation which may require about 60 nanoseconds or less.

Once the appropriate column address is presented and CS/ asserted, the bit stored at the selected memory cell will appear at the corresponding data output (DOUT) 108A-108D and data word 110 will be placed on a data bus and presented to the CPU. Importantly, it is not necessary to sequentially access the columns. Rather, the column addresses may be chosen randomly as long as the desired memory cells are located on the row which has been activated into static column mode.

There is a maximum time period during which RAS/ can be continuously asserted. Also, it is necessary that a refresh of the memory array occurs periodically. Thus, once a row is activated into static column mode, column selection may not go on indefinitely. However, in the HM51258 SCRAM device RAS/ may be asserted for nearly as long as 75 microseconds. During this time, a large number of accesses to the bank of SCRAM devices may occur. Furthermore, as the SCRAM devices, or similar devices, undergo further development, the time during which RAS/ may remain asserted is expected to increase while the minimum time between column address presentations is expected to decrease.

As mentioned earlier, the arrangement illustrated in FIG. 3 may be carried out on a data word of any desired length. The presently preferred embodiments are adapted for use with a 32-bit computer system. However, it must be appreciated that the present invention has applicability in computer systems with other lengths of data words.

Figures 1, 4:
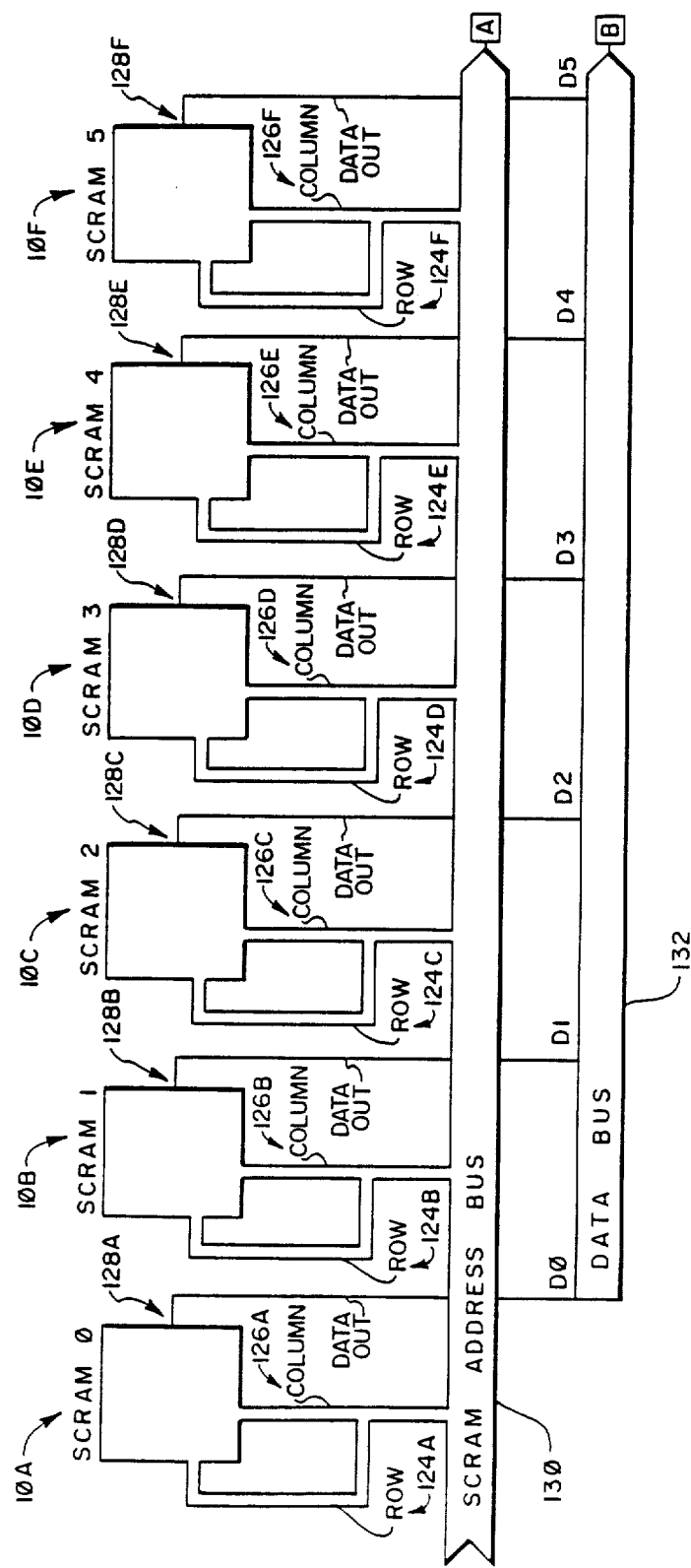
Figures 2, 4:
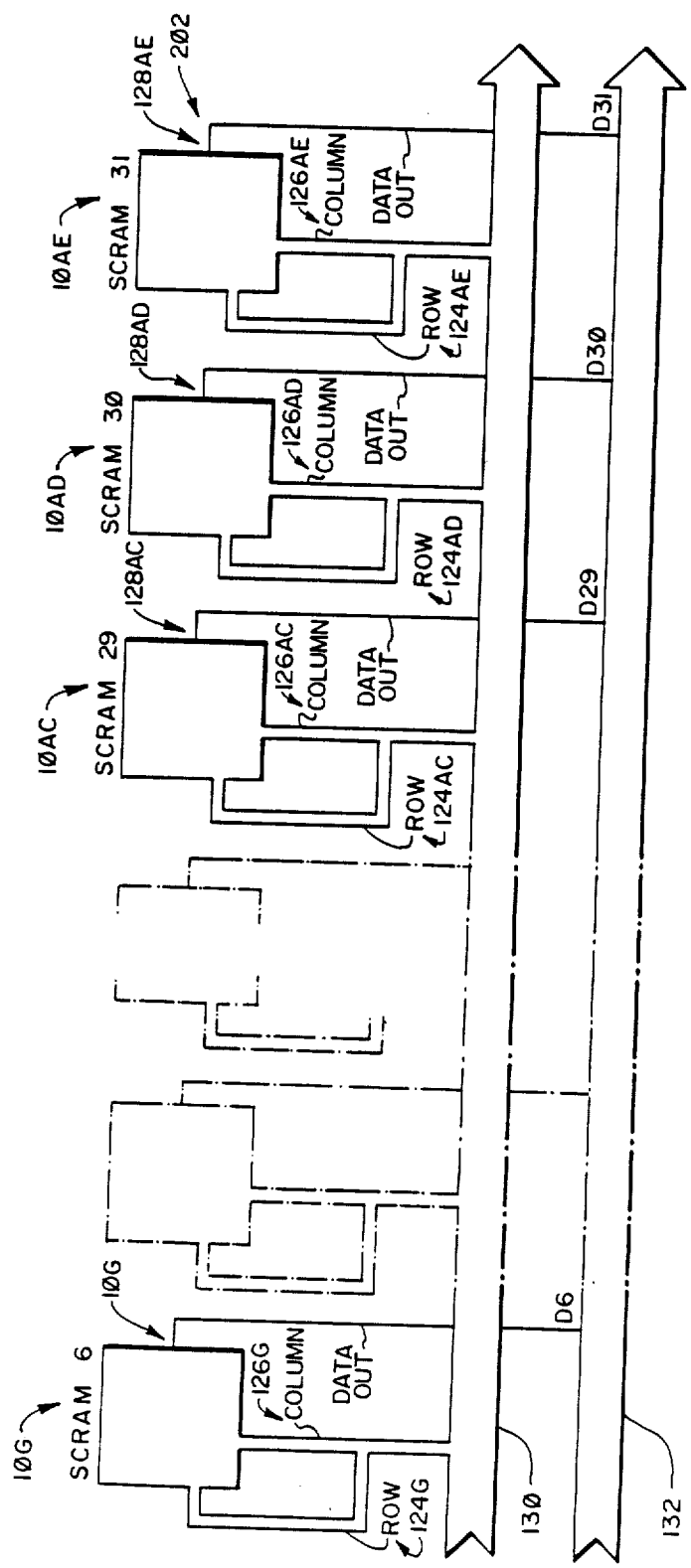

The architecture of the SCRAM memory bank in the presently preferred embodiments is represented in FIG. 4. As suggested in FIG. 4, the address inputs of each of the thirty-two SCRAM devices (10A-10AE) are connected to a common SCRAM address bus 130. In accordance with the explanation provided in connection with FIG. 3, a row address is initially presented on address bus 130 to all of the SCRAM devices, with appropriate control signals to select a row. Presentation of a device row address to each SCRAM device is represented by the "buses" generally indicated at 124A-124AE. A column address is subsequently presented on address bus 130 and to each SCRAM device as represented by the "buses" generally indicated at 126A-126AE. Data outputs 128A-128AE from each of SCRAMs 10A-10AE is applied to data bus 132 to form a 32-bit word (D0-D31).

By incorporating the concepts explained in connection with FIG. 3 into the embodiment illustrated in FIG. 4, a 32-bit data word may be rapidly accessed. The arrangement illustrated in FIG. 4 represents one bank (generally designated 202) in the presently preferred embodiments described herein. Bank 202 is capable of holding one "row", i.e., all the corresponding rows of 32 SCRAM devices, in static column mode.

2. Description of a First Presently Preferred 32-Bit Embodiment of the Present Invention—FIGS. 5-8.

The following discussion will describe a first presently preferred embodiment which is intended for use in a computer system utilizing the MC68020 CPU (a 32-bit CPU), the HM51258 SCRAM manufactured by Hitachi, and also a memory management system which supports virtual memory addressing whereby logical addresses in virtual memory are mapped to a location in physical memory. Such a memory management system is fully described in copending U.S. patent application Ser. No. 074,310 filed July 16, 1987, entitled "Dynamic Memory Management System and Method." However, it must be appreciated that the present invention has application in computer systems using components and word lengths different than those mentioned and which do not implement virtual memory schemes.

A virtual memory scheme, when implemented, makes it appear that a computer system is provided with a greater number of memory locations than are actaully present in physical memory. In this way, the processes (a single computer system may handle many separate processes) residing in a computer system appear to have access to a large number of logical memory locations within which to operate, while the number of physical memory locations is kept within practical limits.

Thus, a virtual memory scheme is commonly one in which the number of memory locations (represented by "logical addresses") which are available to a process is greater than the number of memory locations available in main memory (represented by "physical addresses"). Such virtual memory schemes make efficient use of main memory since any particular process only requires access to small groups of code or data (herein collectively referred to as "data") for short periods of time.

In computer systems implementing a virtual memory scheme, the total amount of memory available to a particular process, for example 1 billion bytes (1 GBytes), is usually stored on a magnetic disk device. A smaller amount of random access memory (RAM), for example 1 million bytes (1 MBytes), is provided for the process in the main memory of the computer system. The data contained on the magnetic disk is moved into the limited space available in RAM as needed by the process. As the process finishes its use of a portion of data, that data is moved from the main memory to secondary storage and replaced by other data moved into the main memory.

The above-described virtual memory scheme is conventionally carried out by dividing the total virtual memory space (also referred to as "logical space") into many equal-sized units called "pages." All of the pages of data for each process are stored on a secondary storage device, such as a magnetic disk. The locations in physical memory which store the data from one page in logical memory space are referred to as a "frame." As pages of data are required by the CPU they are moved into a frame in the main memory.

Pages may remain in main memory or they may be moved back to secondary storage as determined by their frequency of usage and restrictions on the amount of available main (physical) memory. One usual function of a memory management system is to detect the CPU's attempted accesses to pages not currently present in main memory and causing the suspension of operation of the CPU until the page containing the demanded address has been moved into the main memory.

Figure 5:
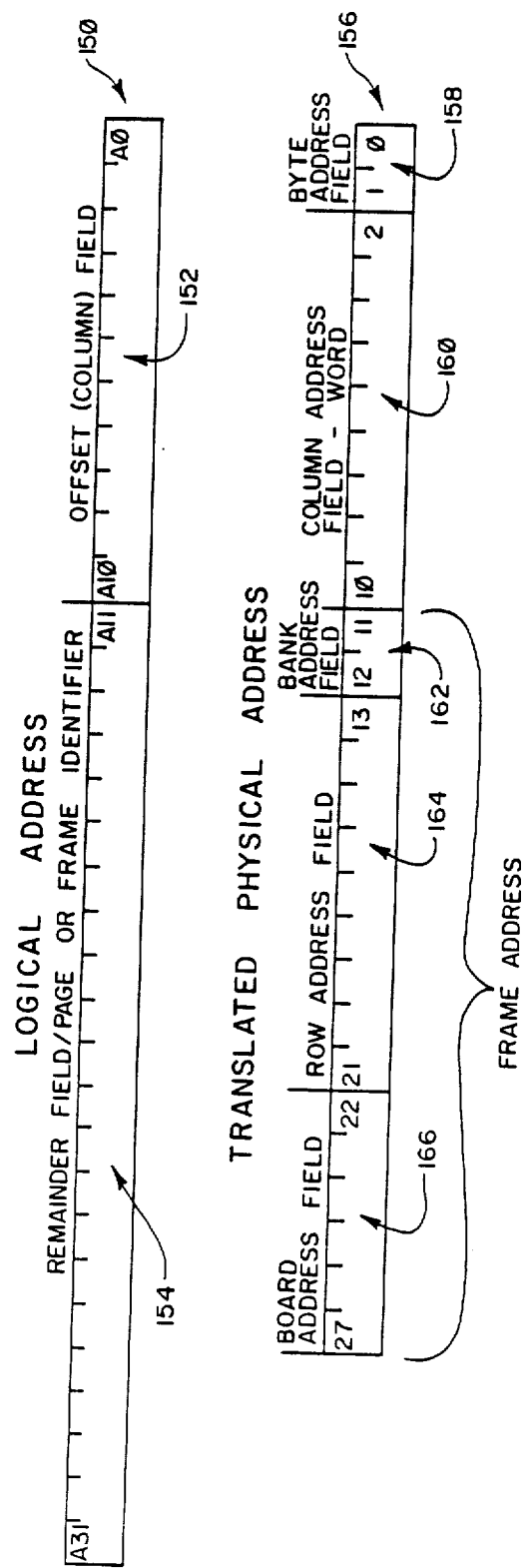
FIG. 5 is a schematic diagram indicating the bit arrangements for the logical address and the translated physical address as used by the memory system of the present invention.
Figure 18:
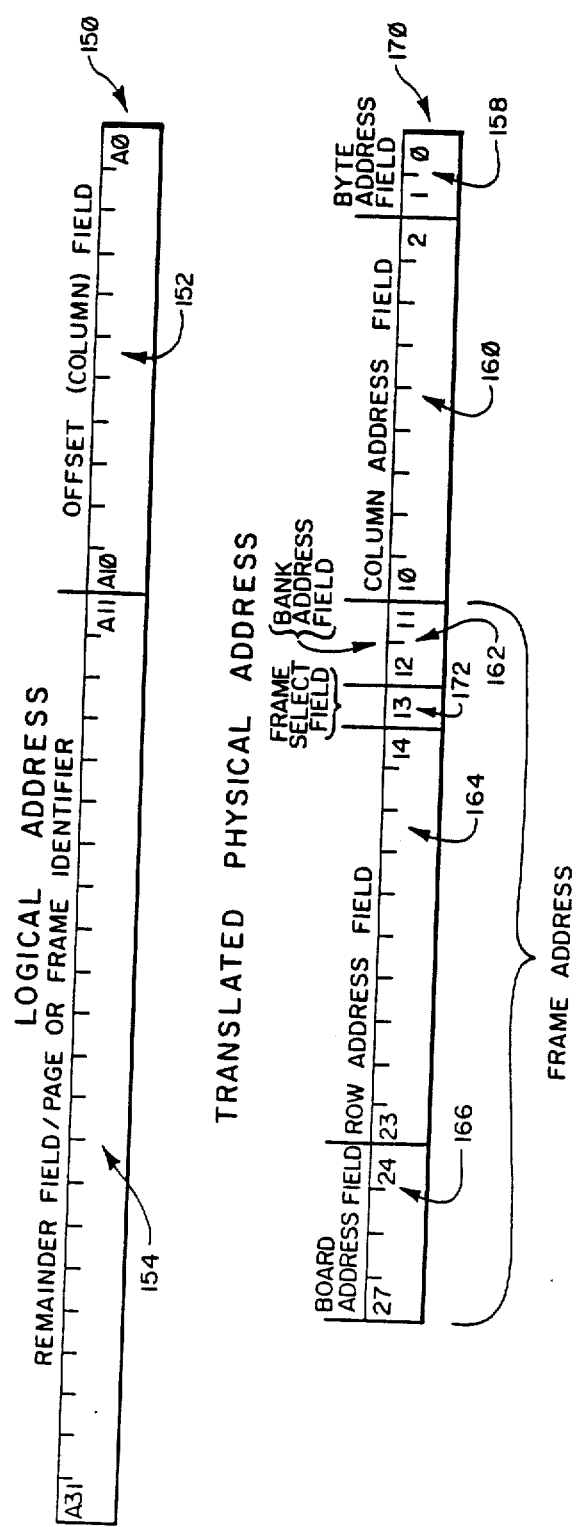
FIG. 18 is a diagram indicating the bit arrangements for the logical address and the translated physical address of the second presently preferred embodiment described herein.

The presently preferred embodiment is intended for use with a memory management system implementing a virtual memory scheme wherein virtual memory space is divided into pages consisting of 2 KBytes each and physical memory is divided into frames, each frame holding one page of data. Provided in FIGS. 5 and 18 are diagrams indicating the bit arrangements used in both logical address 150 of virtual memory and the corresponding translated physical address 156 of the physical memory.

In a computer system in which the presently preferred embodiments have been incorporated, the CPU presents a logical address to the memory management system. The memory management system then determines whether the page containing the logical address is presently in the physical memory, and, if so, then presents the translated physical address on the address bus to the physical memory, also referred to as the main memory. If the appropriate page is not presently stored in main memory, then the memory management system causes the required page of data to be moved from secondary storage (such as a magnetic disk drive) into a frame in main memory.

In the first preferred embodiment, logical address 150 (FIG. 5) is divided into an offset field 152 (bits A0–A10) and a remainder field 154 (bits A11–A31). Remainder field 154 may also be referred to as a frame identifier or a page identifier since the remainder field identifies one page or frame. The bit arrangement of the translated physical address presented to the main memory is also illustrated in FIG. 5. Translated physical address 156 is divided into a byte address field 158, a column address field 160, a bank address field 162, a row address field 164, and a board address field 166.

Bank address field 162, row address field 164, and board address field 166 together identify one frame within the memory and thus may collectively be referred to as a frame address. Similarly, column address field 160 may be referred to as a word address since it serves to identify the location of one word in memory.

With 28 bits (0–27) available for a translated physical address, 256 MBytes of memory may be addressed. ($2^{28} = 268,435,456$ or 256 MBytes). The function of each of the fields in translated physical address 156 is set forth in detail in Table B provided below.

TABLE B

| Bits in Translated Physical Address | Function |
| --- | --- |
| 0–1 | Byte Address Field. Selects one of four bytes in each 32-bit word. |
| 2–10 | Column Address Field. Selects one of 512 column addresses ($2^9 = 512$). |
| 11–12 | Bank Address Field. Selects one of four banks contained on each board ($2^2 = 4$). |
| 13–21 | Row Address Field. Selects one of 512 row addresses ($2^9 = 512$). |
| 22–27 | Board Address Field. Selects one of a maximum of 64 boards ($2^6 = 64$). |

It should be appreciated that use of the particular bit arrangement illustrated in FIG. 5 is not essential to the present invention. That is, while the bit arrangement illustrated in FIG. 5 is particularly adapted for use with the first presently preferred embodiment, digital memories incorporating the present invention may be devised using very different addressing bit arrangements. Furthermore, the present invention may be used with digital computers not utilizing a memory management system.

It should also be appreciated that the designations given the various bit fields in FIG. 5 are intended merely to describe the function of the bit field in the first presently preferred embodiment. For example, it is presently preferred to provide four banks, each bank including 32 SCRAMs arranged as illustrated in FIG. 4, on a single circuit board. Thus, bits 22–27 in translated physical address 156 are designated board address field 166. Other designations, however, may be more appropriate in different embodiments of the present invention.

Figure 6:
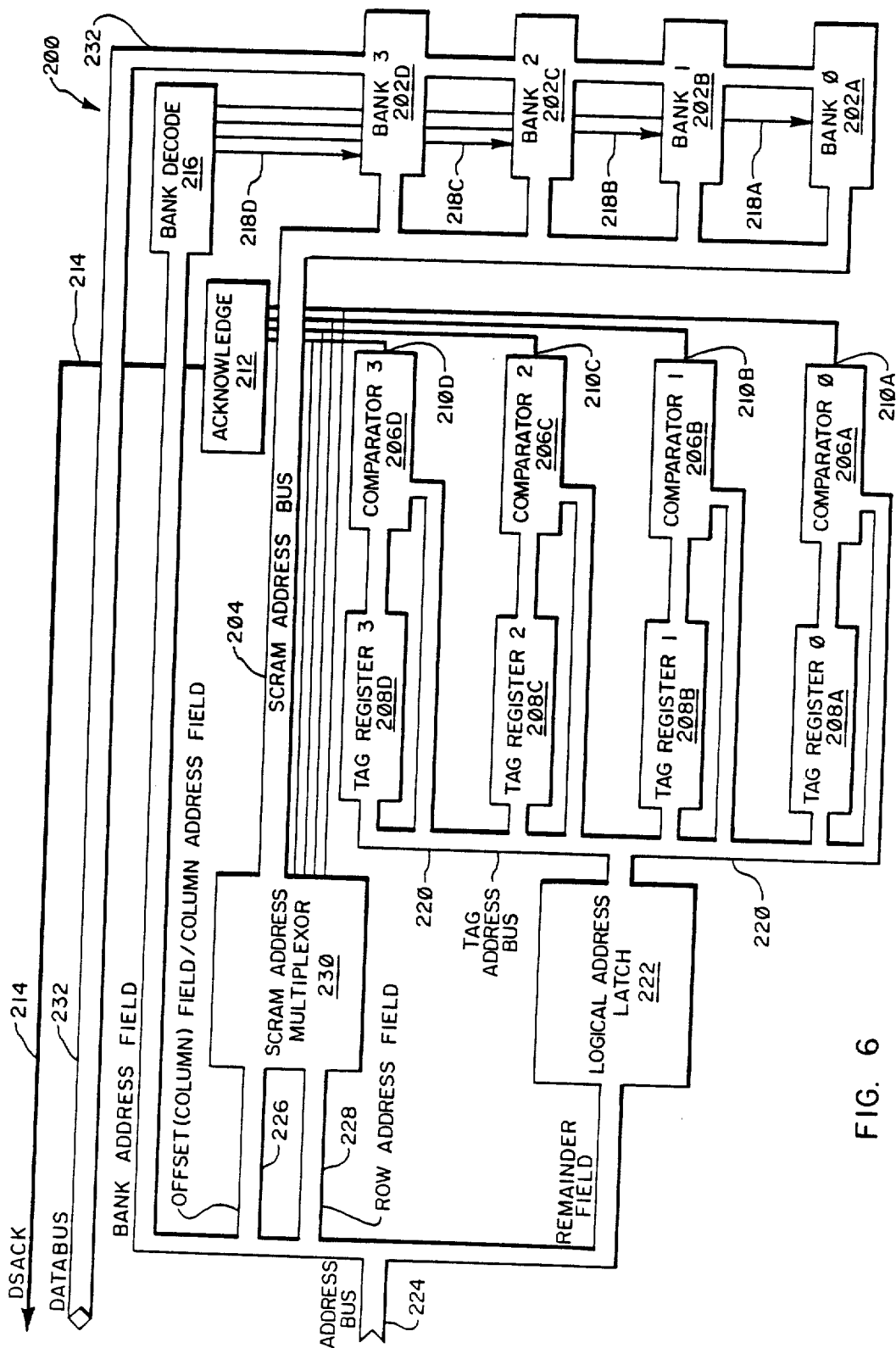
FIG. 6 is a block diagram of one presently preferred embodiment of the present invention.

It is also useful to note that in the presently preferred embodiment, offset field 152 of logical address 150 is always equivalent to bits 0–10 (comprising column address field 160) of translated physical address 156. Thus, bits A0–A10 (i.e., offset field 152) of logical address 150 do not undergo any translation. The particular advantage of the just described arrangement will become apparent shortly in connection with the further description of the presently preferred embodiment as represented in FIG. 6.

Furthermore, it will be appreciated that since the first eleven bits (0–10) of both logical address 150 and translated physical address 156 (FIG. 5) specify a byte within one page (2 KBytes) that the remaining bits (bits A1-

1-A31 in the logical address and bits 11-27 in the translated physical address) specify a page or a frame, respectively.

A particular advantage is achieved by placing the bits designated as bank address field 162 between the bit fields designated as column address field 160 and row address field 164 rather than placing the bank address field between the row address field 164 and board address field 166. To understand the advantage of this arrangement, it is necessary to understand that when the digital computer is operating in what is variously referred to as "supervisor mode" or "kernal mode" the computer system managing software (e.g., the operating system) bypasses the memory management system (not represented in the figures) and directly addresses the main memory, i.e., the SCRAM architecture of the present invention.

When the CPU is operating in "user mode" the logical addresses presented by the CPU are translated into physical addresses. Thus, the memory management system, in cooperation with the CPU and the computer system managing software, is able to generate appropriate translated physical addresses into which the corresponding logical addresses have been mapped. However, when the computer system managing software directly addresses the main memory, it will generally present sequentially generated addresses directly to the main memory.

By designating bits 11 and 12 in translated physical address 156 as bank address field 162, when the computer system begins to address the main memory starting at the first location in memory (designated by a physical address having all bits cleared), found at, row 0 bank 0 on board 0, the "first row" will be completely filled as the bits in byte address field 158 and column address field 160 are all sequentially set. As one row in a bank is "filled," the use of the bit arrangement shown in FIG. 5 will cause row 0 in another bank to be addressed next.

In this fashion, as the main memory is directly addressed by the CPU, the acessed memory locations are scattered among the various banks which may be as few as four banks or as many as 256 banks. This causes these locations, which will be directly accessed by computer system managing software, to be spread among several banks. The great advantage of this arrangement will be more fully appreciated after the discussion of the operation of the illustrated embodiments.

Reference will now be made to FIG. 6 to describe the overall configuration of the first presently preferred embodiment, generally designated 200, of the present invention. FIG. 6 is a block diagram showing the major functional elements of the presently preferred embodiment. An explanation of the preferred circuit implementation of each of the functional blocks illustrated in FIG. 6 will be provided in connection with FIGS. 9-16.

Each of the four banks 202A-202D illustrated in FIG. 6 is capable of activating one frame into static column mode. Thus, once a frame is activated into static column mode, any word contained within the one page of data stored in the frame may be accessed very rapidly.

In operation a logical address (150 in FIG. 5) is first presented on address bus 224, and if the address is not located on a row already activated into static column mode, a translated physical address (156 on FIG. 5) is presented on address bus 224. SCRAM address multiplexor is used to control the presentation of the proper portions of the logical address and the translated physical address on SCRAM address bus 204. This "activation" process generally continues until each bank contains a frame activated into static column mode, at which time each bank is said to be "hot."

As each bank becomes hot, the logical address, which was presented on address bus 224 just prior to the presentation of the translated physical address, is "transfered" from where it was stored in logical address latch 222 to the tag register 208A-208D which corresponds to the bank 202A-202D which was just accessed by the translated physical address. Upon the next presentation of a logical address on address bus 224 the logical address is allowed to pass through logical address latch 222, and presented to all four comparators 206A-206D by way of tag address bus 220.

Simultaneously, the column address field is presented to all banks 202A-202D. Before the translated physical address 156 is placed on address bus 224, each of comparators 206A-206D compares the logical address stored in its corresponding tag register 208A-208D with the logical address presented on tag address 220. The comparator which finds a match asserts a signal which instructs the corresponding bank 202A-202D to output the data located at the address identified by the offset (column) field of the logical address present on address bus 224.

In this fashion, any memory access to a frame just previously accessed may be completed by presenting only the logical address on address bus 224, which in the described embodiment is completed in about 60 nanoseconds or less. The number of banks included in the present invention may be many times the number shown in FIG. 6. Thus, there may be a large number of hot banks providing rapid static column access to many pages of data.

Each of the structures shown in FIG. 6, and their operation, will now be explained in detail.

In FIG. 6 there are the four banks of SCRAM devices designated 202A-202D. Each bank 202 contains 32 SCRAMs arranged in a fashion essentially the same as represented in, and described in connection with, FIG. 4. Thus, each bank is capable of containing 262,144 32-bit data words or 1 MByte, for a total storage capacity of 4 MBytes or 1,048,576 32-bit data words.

It is presently preferred that the components illustrated in FIG. 6 be fabricated on a single circuit board. Thus, in one presently preferred embodiment, up to 64 boards (board address field 166 represented in FIG. 5 includes 6 bits ($2^6=64$) may be included for a total system memory capacity of 256 MBytes.

Importantly, each bank 202A-202D is capable of holding one page of 2,048 bytes in static column mode, i.e., an entire frame may be activated in static column mode. Thus, if the maximum of 64 boards are incorporated into the present memory system, 256 frames may simultaneously be activated into static column mode allowing very rapid access to any memory location in any of the 256 frames. The importance of this feature will become more apparent as the operation of the embodiment illustrated in FIG. 6 is described.

By arranging the presently preferred embodiments so that all of the components carrying out the functions represented in FIG. 6 are located on a single board, it is possible to provide a digital computer which may accept only one "memory board" or may accept the maximum of 64 "memory boards." Using this arrangement allows memory expansions to be easily and routinely made.

As explained earlier in connection with FIG. 4, each of the 32 SCRAMs conained in each bank have their data ports connected in parallel to form a 32-bit data bus. As represented in FIG. 6, the data buses from each bank are connected in parallel to form data bus (DATABUS) 232 shown in FIG. 6.

The data buses of each board are connected in parallel with all other boards to form the digital computer's data bus. It will be appreciated, however, that the "board arrangement" is not critical to the operation of the present embodiment or the present invention. However, the terminology "board" will be adopted in order to most clearly explain the operation and structure of the described embodiments.

As shown in FIG. 6, each bank 202A-202D is provided with corresponding tag register 208A-208D and comparator 206A-206D, respectively. Tag registers 208A-208D serve as storage devices which selectively store the value of the remainder field 154 (which identifies a page in virtual memory) of the logical address 150 (FIG. 5) which was previously presented on address bus 224 and which caused an access to the bank corresponding to the tag register.

The purpose of the comparators 206A-206D is to compare the remainder field values stored in their associated tag registers 208A-208D with the remainder field of a currently presented logical address and determine if they are equivalent. If the remainder field of the previously presented address stored in any of the tag registers 208A-208D is equivalent to the remainder field of the currently presented address, as determined by comparators 206A-206D, then it is known that the currently presented address is located on a row which is still activated in static column mode. A full description of this operation will be provided shortly.

In the following discussion, the term "hit" will be adopted to refer to the condition which occurs when the value contained in a tag register 208A-208D is equivalent to the remainder field of the currently presented logical address. Thus, if the value contained in tag register 208A is equivalent to the remainder field present on tag address bus 220 then a "hit" is said to have occurred in bank 202A, the bank corresponding to tag register 208A and comparator 206A. When a hit occurs, the appropriate comparator 206A-206D asserts an acknowledge signal, represented by lines 210A-210D, respectively, which is received by acknowledge circuit 212 and SCRAM address multiplexor 230 in FIG. 6.

If one of the four bank acknowledge signals 210A-210B from comparators 206A-206D is asserted, then acknowledge circuit 212 asserts the DSACK signal (data stable acknowledge) as represented by line 214. The DSACK signal is then presented to the CPU indicating that stable data is present on data bus 232.

Also represented in FIG. 6 is SCRAM address multiplexor 230. One function of SCRAM address multiplexor is to selectively place the bits of the column address field (160 in FIG. 5) or the bits of row address field (164 in FIG. 5) on SCRAM address bus 204. As will be recalled from the previous description of each bank 202A-202D (and as explained in connection with FIGS. 1 and 2), in the embodiment illustrated in FIG. 6 nine address lines are provided for each bank 202A-202D. The row address and the column address are sequentially presented to the same nine address lines. Thus, in this preferred embodiment, SCRAM address bus 204 comprises nine address lines. However, embodiments may be fabricated incorporating a SCRAM address bus 204 with a lesser or greater number of address lines, as will be made clear later in connection with another embodiment described herein.

In FIG. 6, SCRAM address multiplexor 230 is shown with two inputs, column field 226 and row field 228. It should be appreciated that while column field 226 and row field 228 are shown as separate inputs to SCRAM address multiplexor 230, both the column field and the row field are presented in sequence on the address bus 224. However, illustrating SCRAM address multiplexor 230 as having two independent inputs (one for colunn field 226 and one for row field 228) most clearly conveys the function of placing either the column field bits or the row field bits on SCRAM address bus 204, this being one of the primary functions of SCRAM address multiplexor 230.

Also represented in FIG. 6 by block 216 is a bank decode circuit. The function of bank decode circuit 216 is to utilize a portion of the physical translated address to determine in which bank the desired row and column is located.

The bank decode function is carried out by asserting the proper RAS/ signal. All of the RAS/ inputs of the SCRAM devices in a bank are connected in parallel. Thus, when a row device address is presented on SCRAM address bus, the proper row (frame) may be activated into static column mode by asserting the RAS/ signal associated with the proper bank.

As shown in FIG. 5, bits 11 and 12 of translated physical address 156 comprise bank address field 162. With two address bits, it is possible to designate one of four banks. The RAS/ signals applied to banks 202A-202D from bank decode circuit 216 are represented by lines 218A-218D, respectively.

In operation, the embodiment illustrated in FIG. 6 performs most efficiently when all four of the banks are hot, i.e., have one frame activated into static column mode. Thus, the circuitry carrying out the function of SCRAM address multiplexor also receives information from comparators (206A-206D) as represented by lines 210A-210D to determine in which bank a hit has occurred so that the proper chip select (C/S) signal may be asserted. In this fashion, only the proper memory locations output to data bus 232 even though a frame in each bank is activated into static column mode.

As will be appreciated by those skilled in the art, address bus 224 may be connected to a CPU (not shown), a memory management system (such as the one hereinbefore described), or any number of other address generating devices attached to the address bus. The operation of the SCRAM address multiplexor will be explained in more detail shortly.

Also illustrated in FIG. 6 is a logical address latch circuit represented by block 222. In the presently preferred embodiments logical address latch 222 is a "transparent latch." Thus, logical address latch 222 presents at its output whatever bit pattern appears at its input until the asseration of a proper control signal at which time the bit pattern then present at the input is latched onto the outputs.

As indicated in FIG. 6, the remainder field (134 in FIG. 5) of the logical address is presented to the input of logical address latch 222. The output of logical address latch 222 is presented to tag registers 208A-208D and comparators 206A-206D by way of tag address bus 220.

With an entire page of data being held in static column mode, it is possible to very rapidly access data anywhere within the 2 KByte page of data. Due to the usual structure of program code and data (that is, most processes access sequential or nearby memory locations) very rapid access to any location within a 2 KByte page of data is possible.

Figure 8:
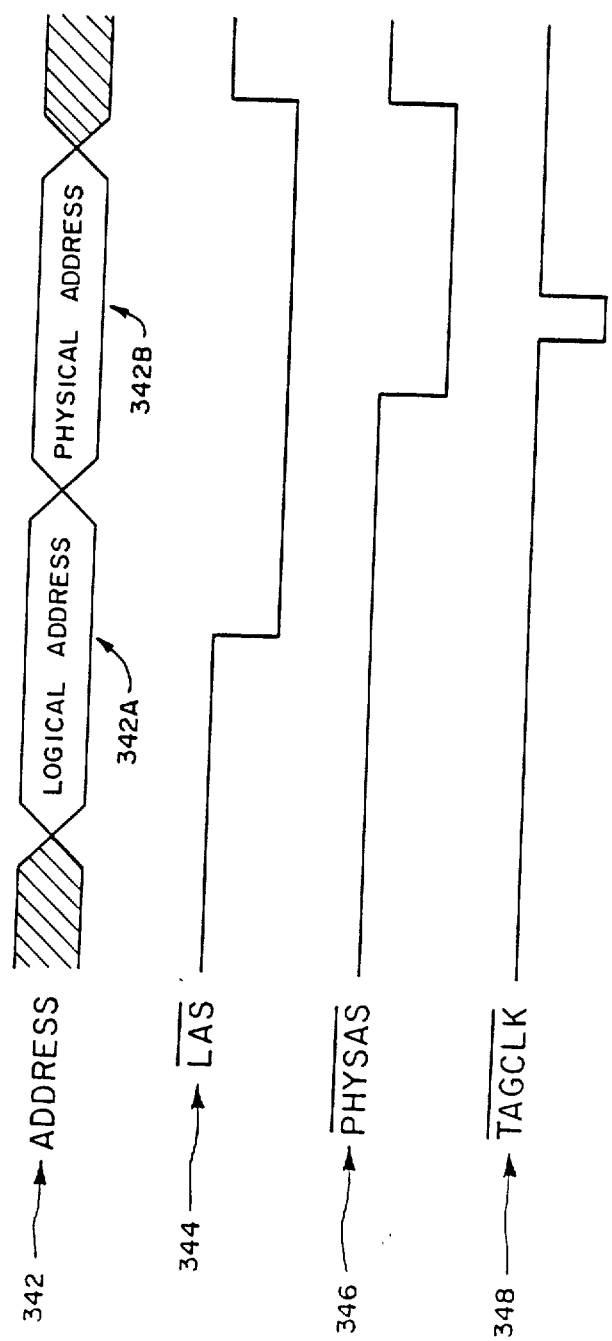
FIG. 8 is a timing diagram schematically illustrating how various control signals are used by the embodiments shown in FIGS. 6 and 17.

FIGS. 7 and 8 will now be used to explain in detail the method of the present invention. In the following explanation, two complete "runs" through the flow chart illustrated in FIG. 7 will be provided. The first "run" will choose the "no" alternative, generally indicated at 316 in FIG. 7. The "no" alternative represents the situation wherein the embodiment illustrated in FIG. 6 is unable to make a static column mode memory access. For example, when the embodiment is first "powered up" and no memory locations have yet been loaded. The second "run" through flow chart 300 will take the route indicated by the "yes" alternative, generally designated 316.

The first step to be carried out is to present a logical address, as represented by symbol 304, on address bus 224 (FIG. 6). The address may be presented by the CPU by way of a direct access, a memory management system, or another address generating device which may be connected to address bus 224. Those skilled in the art will appreciate that it is possible, and in many cases desirable, to modify the embodiment illustrated in FIG. 6 to incorporate two address buses. Such a "dual port" memory in many cases is more efficient since it allows several logical devices in a digital computer more than one route through which to access a main memory such as the present invention.

As shown in FIG. 7 the next step, represented at 306, is to define a column field of the logical address and present a column address to banks 202A-202D. As shown in FIG. 5, bits A0-A10 in the first presently preferred embodiment comprise the offset (column) field. This offset (column) field 152 includes 11 bits and specifies a one byte location in a 2 KByte page. The function of defining a column field of the logical address is carried out by the circuit elements represented by SCRAM address multiplexor 230.

As mentioned previously in connection with FIG. 5, the presently preferred embodiment illustrated in FIG. 6 is adapted for use with a memory management system wherein the offset (column) field 152 of logical address 150 is always equivalent to column address field 160 (bits 2-10) and byte address field (bits 0-1) in translated physical address 156.

In the described arrangement offset (column) field 152 and column address field 160 and byte address field 158 identify either a 32-bit word or one of four bytes within the 32-bit word, respectively, within a page. Since only complete pages are moved into and out of main memory in the embodiment of FIG. 6, it is unnecessary to translate the offset column field 152 since once the location of the proper page is identified, offset (column) field 152 may be directly used to identify a 32-bit word or a byte in that page.

Since all of the banks are capable of holding a page of data in static column mode, it is most efficient to allow the CPU directly address the bank by using offset field 152 of the logical address to designate the column within a selected row. It should be appreciated that in a digital computer incorporating the MC68020 CPU it is also possible to access individual bytes in a 32 bit word.

As shown in FIG. 7, the next step, represented at 308, is to define a remainder field of the logical address and present the remainder field to all the tag registers 208A-208D and comparators 206A-206D (FIG. 6). In the embodiment illustrated in FIG. 6, and as shown in FIG. 5, remainder field 154 comprises those bits of logical address 150 not defined as offset (column) field 152.

The next step 310 in FIG. 7 is to latch the value of the remainder field of the logical address so that the value of the remainder field will remain on the tag address bus 220 (see FIG. 6). The latching function is carried out by logical address latch 222.

The value of the remainder field is latched upon the assertion of the logical address stable (LAS/) signal, generally designated 334 in FIG. 8, which is provided by the CPU under the control of computer system managing software. FIG. 8 is a timing diagram which will be used to further explain the method of the present invention.

As is indicated generally at 342A in FIG. 8, a logical address is presented on address bus 224 as explained above. Shortly after the logical address becomes stable, LAS/ is asserted and the value of remainder field 154 is latched onto tag address bus 220 (FIG. 6). Thus, the value of the remainder field is available to all tag registers 208A-208D and comparators 206A-206D.

At step 312 (FIG. 7) the value of remainder field 154 is compared with the contents of all tag registers 208A-208D. Next a determination is made at step 314 as to whether the remainder field latched onto tag address bus 220 matches the contents of any tag registers 208A-208D which contain the remainder fields of previously presented logical addresses.

If no match occurs, as represented by the "no" alternative designated 316, then the next step 320 is to present a translated physical address such as 156 in FIG. 5. Translated physical address 156 is provided by a memory management system as described earlier. It will be appreciated that the memory management system may be performing the translation of the logical address to a physical address during the time that the steps represented by the symbols marked 304-312 in FIG. 7 are being carried out.

Returning now to the step represented at 320 in FIG. 7, the translated address is presented on address bus 224 (FIG. 6). A row address field 164 (FIG. 5) is then defined at step 222. The circuit elements of SCRAM address multiplexor 230 (FIG. 6) determine which bits of translated physical address 156 (FIG. 5) will be used as a row address field 164 (FIG. 5).

FIG. 8 indicates the relative timing for presenting a logical address (342A), a translated physical address (342B) and asserting the physical address stable (PHYSAS/) signal, generally designated 346 in FIG. 8. The PHYSAS/ signal 346 is asserted shortly after the translated physical address (342B) presented on address bus 224 in FIG. 6 has become stable.

The next step is to select one of banks 202A-202D and a corresponding tag registers 208A-208B as indicated at step 324. From the explanation already provided, it will be appreciated that a particular bank 202A-202D is selected according to the value of bank address field 162 as shown in FIG. 5. When a bank 202A-202D is selected, a corresponding tag registers is also selected. For example, if bank 202D were selected, tag register 208D would also be selected.

Once a bank has been selected, the next step 326 is to activate a row, which in the present embodiment, is equivalent to a frame. A row is activated into static column mode by the presentation of a row address and the assertion of the rwo address strobe (RAS/) signal associated with the proper bank. Once this step has been carried out, the "row/frame" in a particular bank is activated into static column mode and will remain in this mode until RAS/ is disasserted.

The next step 328 is to store the remainder field of the logical address into the selected tag register. This step may be carried out after, or simultaneously with, step 326 of activating a row in the selected bank of SCRAM. Thus, this step is carried out by the assertion of the tag clock (TAGCLK/) signal, generally indicated at 348 in FIG. 8.

As will be recalled, the remainder field of the logical address has been latched onto tag address bus 220 by logical address latch 222 (FIG. 6) and the remainder field has been presented to tag registers 208A-208D. Thus, it is a simple matter to store the value of the remainder field in the selected tag register 208A, 208B, 208C, or 208D. The purpose of storing the remainder field of the logical address into the selected tag register 208 will be more fully understood in the explanation of the present method with the second run through the flow chart of FIG. 7.

As represented at 330, the next step is to perform a static column mode access on the selected bank of SCRAM using the column address field. Performing a static column mode access on the selected bank is carried out by asserting the chip select (CS/) signals associated with the proper bank. The assertion of the proper CS/ signals is carried out by the circuit elements represented by the SCRAM address multiplexor block in FIG. 6.

As represented in FIG. 6, SCRAM address multiplexor 230 receives the output signals (represented by lines 210A-210D) from comparators 206A-206D which will be asserted when the value of the remainder field latched onto tag address bus 220 is stored into the selected tag register as at 328 in FIG. 7. In this way, the proper locations in memory are placed in communication with the data bus.

As shown in FIG. 7, after step 330 has been completed, the current memory access is concluded at step marked 334. Furthermore, as illustrated in FIG. 8, the physical address 342B is removed from address bus 224 (FIG. 6) and LAS/ signal 344 and PHYSAS/ signal 346 are disasserted.

Performing the steps represented at 302-330 (i.e., when no "hit" occurs) and properly asserting all of the signals represented in the timing chart 340 of FIG. 8, will generally require a period of time longer than 95 nanoseconds, i.e., the minimum period during which the MC68020 CPU can perform a memory access. However, the advantage of the present invention is fully realized when a "hit" occurs.

As mentioned previously, it is generally the case that a process requires sequential access to memory locations within one or more pages of memory. In other words, once a particular frame has been activated into static column mode it is generally the case that, due to the nature of computer programs, the process will sequentially access many of the memory locations in that frame in the memory before requiring access to another page of memory. The following explanation of the flow chart shown in FIG. 7 will assume that the desired memory access occurs in a frame (row) which has been previously activated into, and still is in, static column mode.

Starting again at the symbol marked 302 and labeled "start," the first step, as represented by the symbol marked 304, is to present a logical address on address bus 224 (FIG. 6). As indicated previously, the next steps are to defined an offset (column) field of the logical address and present a column address to all banks 202A-202D (step 306 in FIG. 7). The next step 308 is to define a remainder field of the logical address and present the remainder field to all tag registers and comparators.

The next step 310 is to latch the remainder field of the logical address. Next, as represented at 312, comparators 206A-206D compare the latched remainder field with the contents of all tag registers 208A-208D.

Those skilled in the art will appreciate that the steps represented by symbols 304 -312 may be carried out sequentially (and were explained in this fashion for reasons of clarity) but for fastest possible operation, all of these steps may be carried out simultaneously upon the assertion of LAS/ signal 344 shown in FIG. 8.

Having completed steps 304-312 a determination is made whether any match, i.e., a hit, has occurred. At this juncture, it is useful to recall that remainder field 154 is a logical address and in the presently preferred embodiments is contained in virtual, rather than physical, memory space. Thus, the value of remainder field 154 (comprising bits A11-A31) of virtual addrsss 150 in FIG. 5, identifies a single page in virtual memory space. In other words, for every page in logical memory, remainder field 154 will have a unique value.

It is the value of remainder field 154 of the previously presented logical address which caused an access to a particular bank 202A-202D which is stored in that bank's corresponding tag register 208A-208D. Thus, if the currently presented logical address, whose remainder field is latched onto tag address bus 220 by logical address latch 222 (FIG. 6) matches the value contained in any tag register 208A-208D, then it is assured that the currently presented logical address corresponds to the frame which was previously accessed.

Importantly, in the previously provided example wherein it was necessary to activate a row in static column mode, the selected row was never deactivated out of static column mode after the memory access was completed. Thus, since the currently presented logical address is contained in a frame already activated into static column mode, all that is required in order to access the desired memory location is to present a column address and assert the proper CS/ signal.

As represented at step 332, if a match occurs, the next step is to perform a static column mode access on the bank of SCRAM associated with the matching tag register using the column address field.

Importantly, column address field 160 in FIG. 5 is equivalent to offset (column) field 152 also shown in FIG. 5. It will be recalled that the offset (column) field was previously defined and a column address was presented to all banks of SCRAM at step 306. Thus, the static column mode access is effected merely by asserting the CS/ signals to the bank associated with the "matching" tag register.

The assertion of the proper CS/ signals in the present embodiment is assigned to the circuit elements represented by the SCRAM address multiplexor block 230 (FIG. 6) as will become evident by an examination of the detailed circuit schematics provided in FIGS. 9-16. Most importantly, if a hit occurs during step 314 then the appropriate data is very rapidly placed on data bus 232 (FIG. 6) by immediately asserting the proper CS/ signals.

As represented in FIG. 6, the function of indicating the presence of data on the data bus to the CPU is carried out by comparators 206A-206D in cooperation with acknowledge circuit 212, which generates the data stable acknowledge (DSACK) signal 214. If a match is determined by any of comparators 206A-206D, the comparator asserts a signal, represented by lines 210A-210D in FIG. 6, to acknowledge circuit 212 which then will assert DSACK signal 214 regardless of which comparator found a match.

The present invention allows successive accesses to memory locations contained on the same frame of memory to be made very rapidly. In fact, in the present embodiment successive memory accesses to two addresses located in the same frame of memory may be made in less than 60 nanoseconds. Furthermore, since up to 256 frames in memory may be simultaneously activated in static column mode, random memory accesses may be accomplished to any memory location within those 256 frames of memory (having a total capacity sufficient to hold 256 pages or 512 KBytes) within 60 nanoseconds.

This very short access time allows modern CPU's such as the MC68020 to run at maximum speed without "waiting" for data to be presented after presentation of a logical address. It will also be appreciated that such fast access times allow memory magnagement systems sufficient time to translate a logical address to a physical address within the 95 nanosecond time period.

It is not necessary to incorporate all 256 banks of SCRAM in order to realize the advantages of the present invention. In fact, depending upon the pattern of memory accesses by a given process, as few as 4 banks provides very efficient operation.

It will also be appreciated that arrangements other than the one illustrated in FIG. 6 may be used to carry out the present invention. Provided below in Table C is a summary of the signals and buses which appear in FIG. 6.

TABLE C

| Bus/Signal | (FIG. 6) Function |
|---|---|
| DSACK | Data stable acknowledge. The DSACK signal is asserted and presented to the CPU when the data presented on the data bus is stable. |
| Address Bus | This 32 bit bus alternately carries the logical address and the translated physical address and is connected to SCRAM address multiplexor 230 and logical address latch 222. |
| SCRAM Address Bus | This bus carries either the column address or the row address to all the banks. |
| Tag Address Bus | This bus carries the remainder field of the logical address to each of the tag registers and comparators. |
| Data Bus | This 32 bit bus carries data to and from the banks and the CPU. |
| Bank Address Bus | This bus carries the bank address field to the bank |

TABLE C-continued

| Bus/Signal | (FIG. 6) Function |
|---|---|
| | decode circuit. |

3. Description of the Circuit Implementation of the Locial Address Latch, Tag Registers, and Comparators of the Preferred Embodiment of FIG. 6—FIGS. 9A-9B.

In FIGS. 9-16 and the discussion which accompanies these figures, the reference numeral designations which are commonly used in the art on schematic diagrams of digital circuits has been retained in order to make these figures most understandable. Furthermore, the customary indications of integrated circuit device pinouts, device input/output functions, device type designations, and bus and signal conductor paths and connections have also been retained in order to provide maximum clarity.

Regarding the device type designations, the prefix "74" often associated with the components used herein has been omitted. However, those skilled in the art will readily recognize the device designations as shown in the figures. Furthermore, the slash symbol ("/") following a signal name indicates that the signal is "low asserted." The "slash" symbol may be considered equivalent to the "bar" symbol customarily used to indicate a "low asserted" signal.

The software necessary to operate the presently preferred embodiments may be readily devices by one of skill in the art using this disclosure. For example, the operating system known in the art as UNIX ® may be adapted to implement the present invention.

Figures 1, 9A:
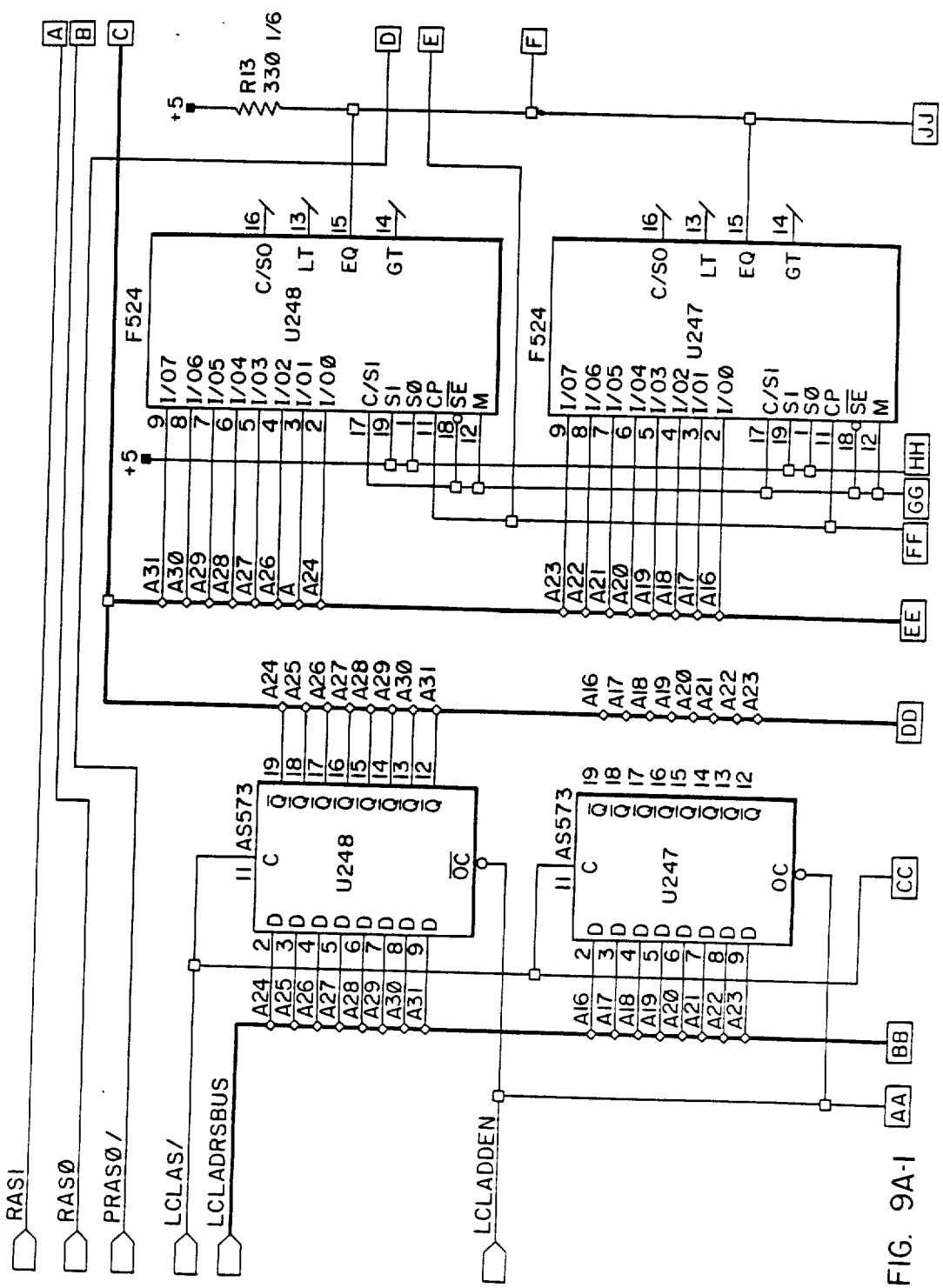
Figures 2, 9A:
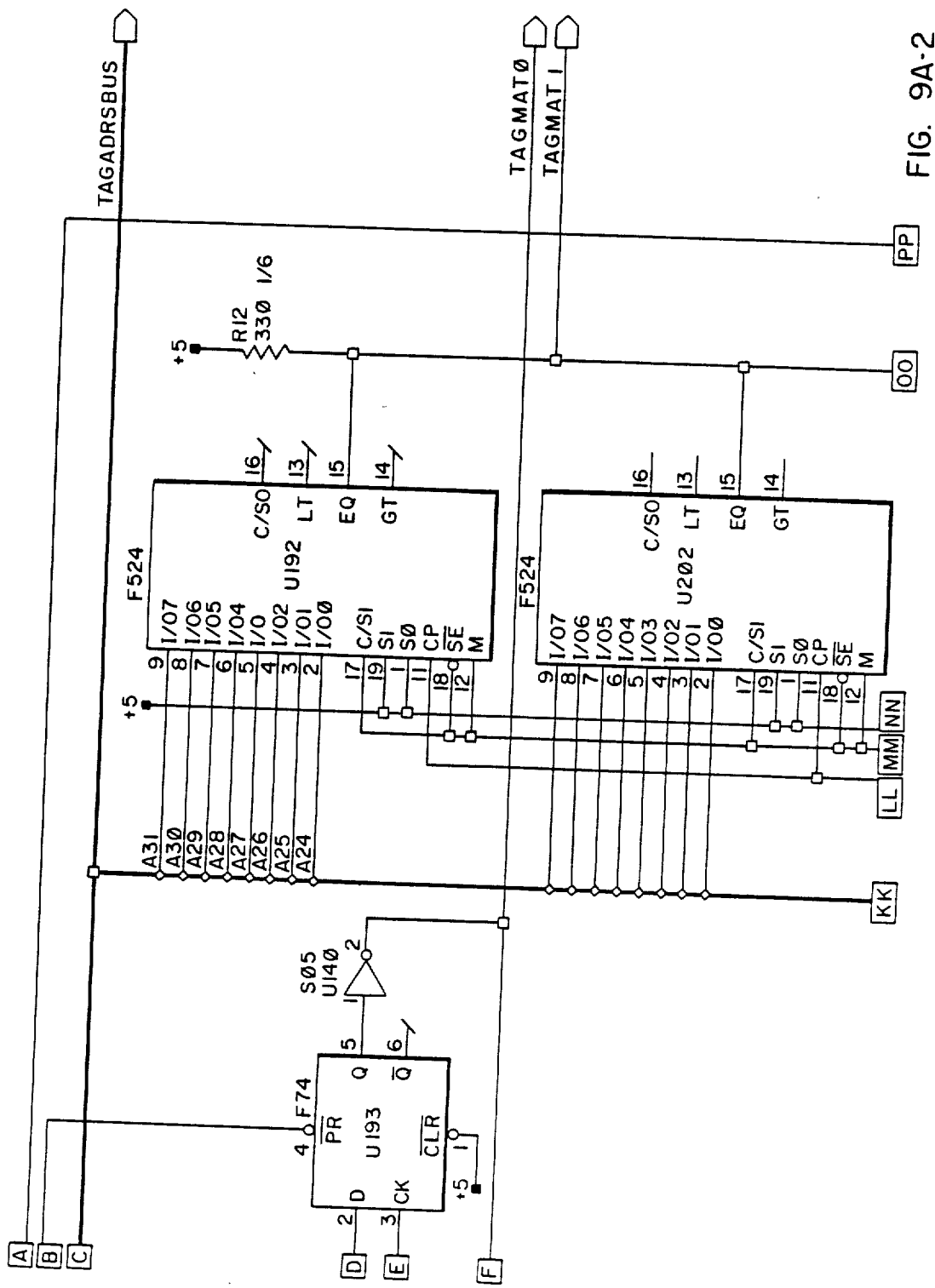
Figures 3, 9A:
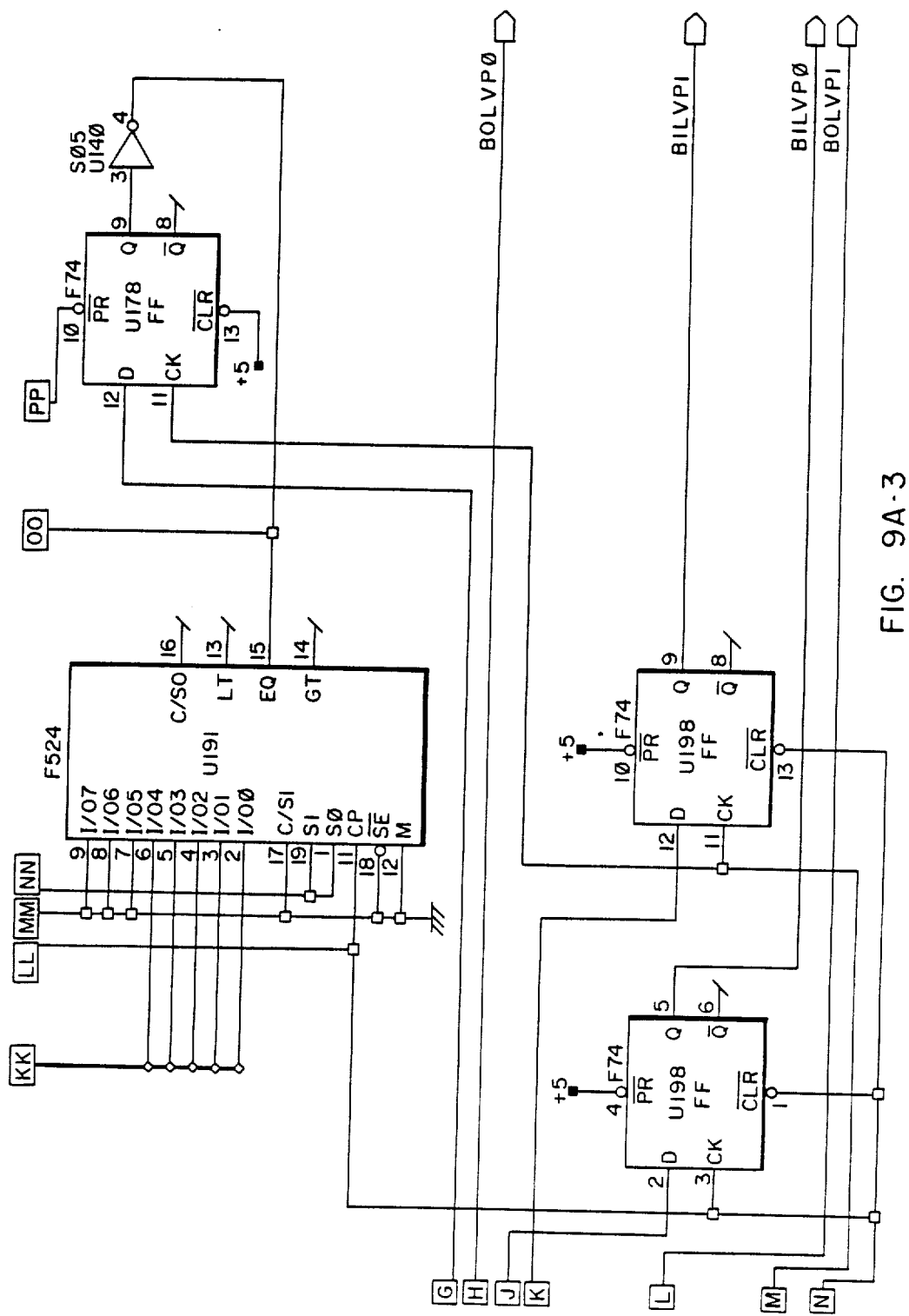
Figures 4, 9A:
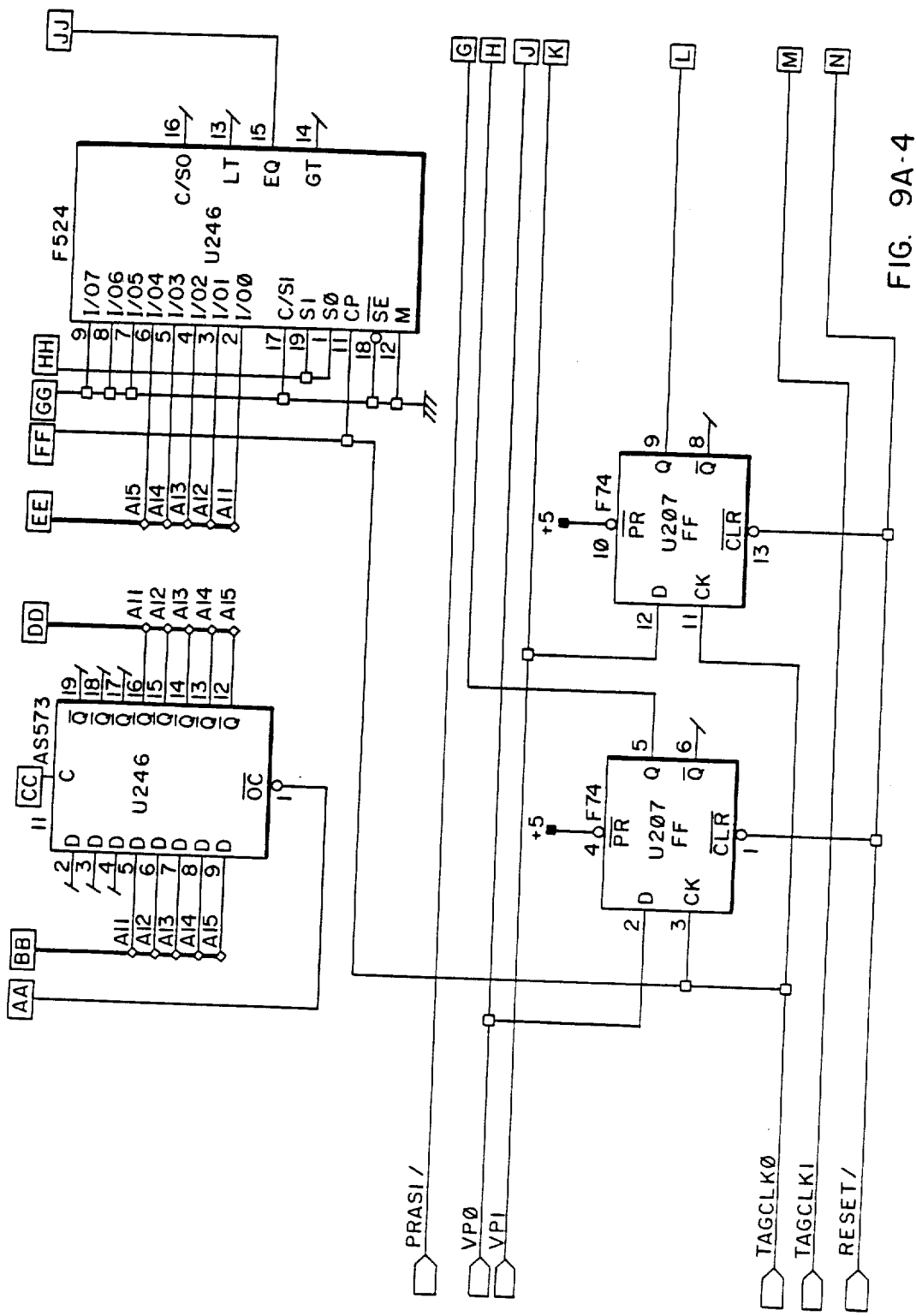
Figures 1, 9B:
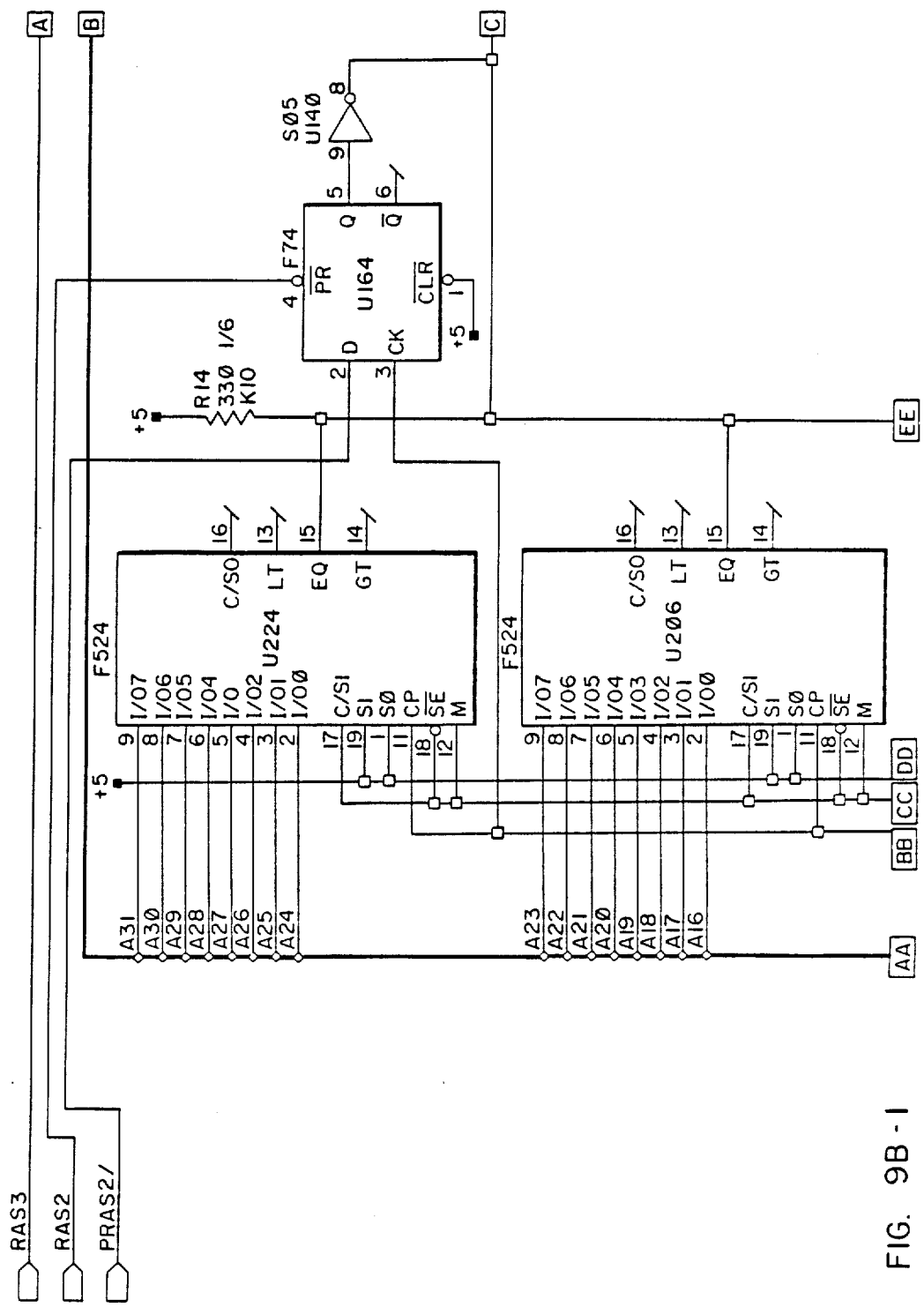
Figures 2, 9B:
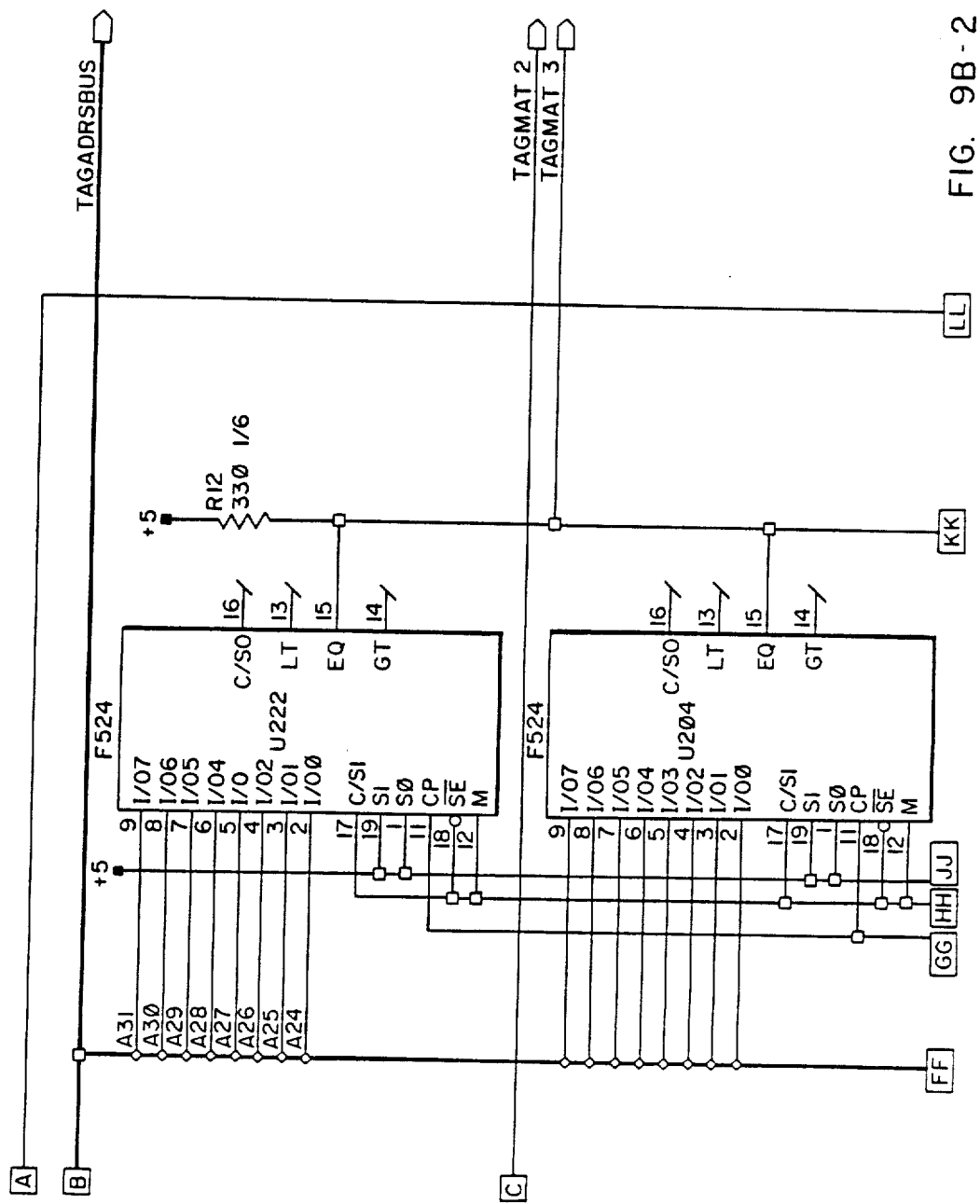
Figures 3, 9B:
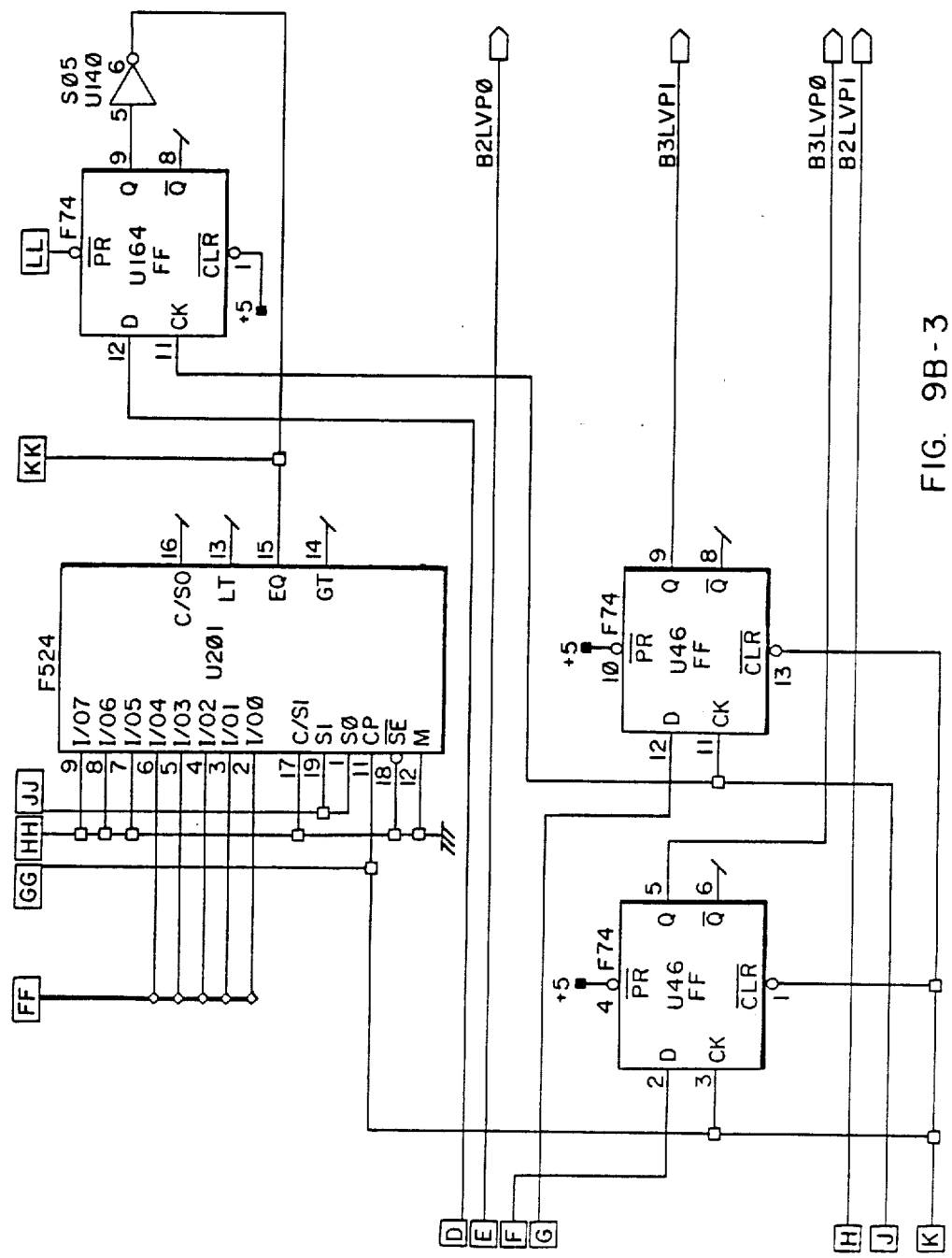
Figures 4, 9B:
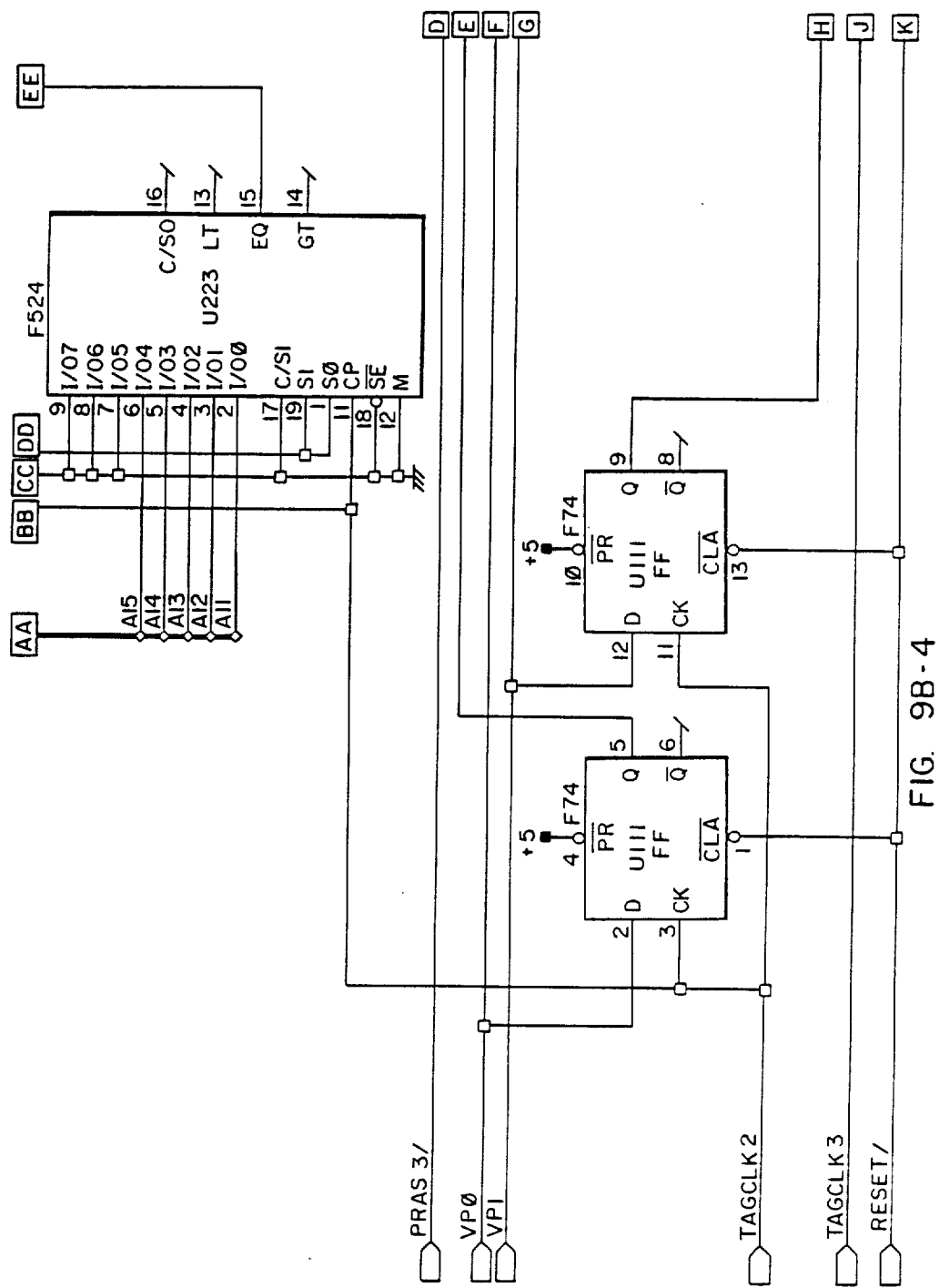

As mentioned earlier, the presently preferred embodiments are adapted for use with a dual bus digital computing system. FIGS. 9A and 9B contain a detailed schematic drawing of the presently preferred circuit implementation of the logical address latch (222 in FIG. 6), tag registers 208A-208B, and comparators 206A-206D.

The devices designated U246, U247, and U248 in FIG. 9A function as logical address latch 222 represented in FIG. 6. Devices U246, U247, and U248 are commonly known in the art as AS573 and are described as octal D-type transparent latches with three-state outputs.

Also shown in FIGS. 9A and 9B are the devices which serve as tag registers 208A-208D and comparators 206A-206D in FIG. 6. In the embodiment illustrated in FIGS. 9A and 9B, the functions of the tag registers and comparators are combined into one device. These devices are known in the art as F524. The F524 device is described as an 8-bit registered comparator. Also associated with each tag register and comparator device is an F74 device that acts as a flip-flop which latches the output of each tag register/comparator device.

Table D below indicates which devices in FIGS. 9A and 9B function as tag registers and comparators. Table D also shows which tag registers/comparator latch flip-flop device is associated with each individual tag register/comparator device.

TABLE D

| FIG. 6 Tag Register/ Comparator | FIG. 9A-9B Tag Register/Comparator Devices | Latch Flip-Flop | VP Flip-Flop |
| --- | --- | --- | --- |
| 0 | U190, U193, and U205 | U178 | U207 |
| 1 | U191, U192, and U202 | U178 | U198 |
| 2 | U206, U223, and U224 | U164 | U111 |
| 3 | U201, U204, and U222 | U164 | U46 |

Also shown in FIGS. 9A and 9B are four F74 flip-flop devices which are used to indicate the validity and write protection state of the address latched into tag registers 208A-208D. Table D also shows which of the VP flip-flop devices are associated with each tag register/comparator.

As is customary in the art, the function of each signal or bus indicated in FIGS. 9-16 is provided below in a glossary for each figure. For the convenience of the reader, the definition of the signals and/or buses which appear in more than one figure will be repeated in later glossaries even though the same function is served by the signal and/or bus. Also, as is customary in the art, a signal which is "low asserted" has associated with it a slash symbol ("/") in the following glossaries, tables, and the figures.

GLOSSARY A
(FIGS. 9A and 9B)

| Signal/Bus | Function |
| --- | --- |
| RAS1 | Row Address Strobe Bank 1. Causes a selected row in Bank 1 to be activated into static column mode. |
| RAS0 | Row Address Strobe Bank 0. Causes a selected row in Bank 0 to be activated into static column mode. |
| PRAS0/ | Pre-Row Address Strobe Bank 0 (low asserted). Same function as RAS0. |
| LCLAS/ | Local Address Strobe (low asserted). Indicates when a logical address from the CPU is valid. |
| LCLADRSBUS | Local Address Bus. Size is 32 bits. Carries both logical addresses and translated physical addresses from the CPU to memory. Each bit is low asserted. |
| LCLADDEN/ | Local Address Enable (low asserted). Enables Local Address Bus onto the TAGADRSBUS. |
| PRAS1/ | Pre-Row Address Strobe Bank 1 (low asserted). Same functon as RAS1. |
| VP0 | Valid Protect Bit 0. Carries Valid and Protect information about the currently selected logical page for storage in the Static Frame Memory. |
| VP1 | Valid Protect Bit 1. Carries Valid and Protect information about the currently selected logical page for storage in the Static Frame Memory. |
| TAGCLK0 | Tag Clock 0. Samples data on the TAGADRSBUS into the tag register for bank 0. |
| TAGCLK1 | Tag Clock 1. Samples data on the TAGADRSBUS into the tag register for Bank 1. |
| RESET/ | System Reset. Occurs on power-on or reboot. |
| TAGADRSBUS | Tag Address Bus. Carries logical addresses to the tag registers/comparators for determination of a match and for storage of new static column mode logical pages. |
| TAGMAT0 | Tag Match 0. Indicates that a match has been detected between the TAGADRSBUS and the tag register for bank 0. |
| TAGMAT1 | Tag Match 1. Indicates that a match has been detected between the TAGADRSBUS and the tag register for bank 1. |
| B0LVP0 | Bank 0 Latched Valid Protect Bit 0. Sampled VP0 signal for logical page currently in static column mode in bank 0. |
| B1LVP1 | Bank 1 Latched Valid Protect Bit 1. Sampled VP1 signal for logical page currently in static column mode in bank 1. |
| B1LVP0 | Bank 1 Latched Valid Protect Bit 0. Sampled VP0 signal for logical page currently in static column mode in bank 1. |
| B0LVP1 | Bank 0 Latched Valid Protect Bit 1. Sampled VP1 signal for logical page currently in static column mode in bank 0. |
| RAS3 | Row Address Strobe Bank 3. Causes a selected row in Bank 3 to be activated into static column mode. |
| RAS2 | Row Address Strobe Bank 2. Causes a selected row in Bank 2 to be activated into a static column mode. |
| PRAS2/ | Pre-Row Address Strobe Bank 2 (low asserted). Same function as RAS2. |
| PRAS3/ | Pre-Row Address Strobe Bank 3 (low asserted). Same function as RAS3. |
| TAGCLK2 | Tag Clock 2. Samples data on the TAGADRSBUS into the tag register for bank 2. |
| TAGCLK3 | Tag Clock 3. Samples data on the TAGADRSBUS into the tag register for bank 3. |
| TAGMAT2 | Tag Match 2. Indicates that a match has been detected between the TAGADRSBUS and the tag register for bank 2. |
| TAGMAT3 | Tag Match 3. Indicates that a match has been detected between the TAGADRSBUS and the tag register for bank 3. |
| B2LVP0 | Bank 2 Latched Valid Protect Bit 0. Sampled VP0 signal for logical page currently in static column mode in bank 2. |
| B3LVP1 | Bank 3 Latched Valid Protect Bit 1. Sampled VP1 signal for logical page currently in static column mode in bank 3. |
| B3LVP0 | Bank 3 Latched Valid Protect Bit 0. Sampled VP0 signal for logical page currently in static column mode in bank 3. |
| B2LVP1 | Bank 2 Latched Valid Protect Bit 1. Sampled VP1 signal for logical page currently in static column mode in bank 2. |

It should be appreciated that the embodiment illustrated in FIGS. 9A and 9B is just one possible arrangement for implementation of the logical address latch, tag registers, comparators, and other associated circuits of the present invention.

4. Description of the Circuit Implementation of the Acknowledge Circuit of the Presently Preferred Embodiments—FIG. 10.

Figure 10:
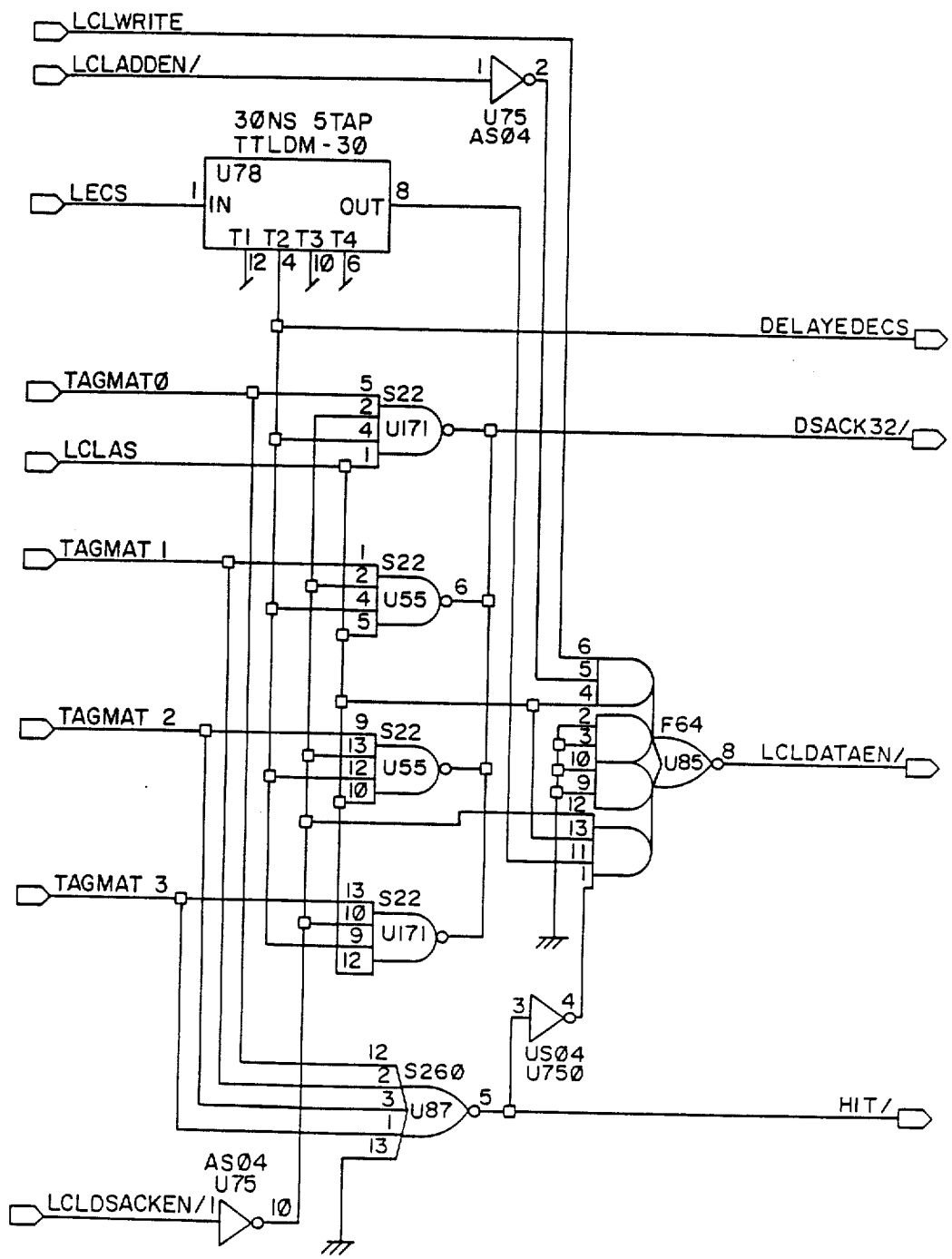
FIG. 10 is a detailed schematic diagram showing the circuit implementation of the acknowledge circuit represented in FIGS. 6 and 17.
Figure 17:
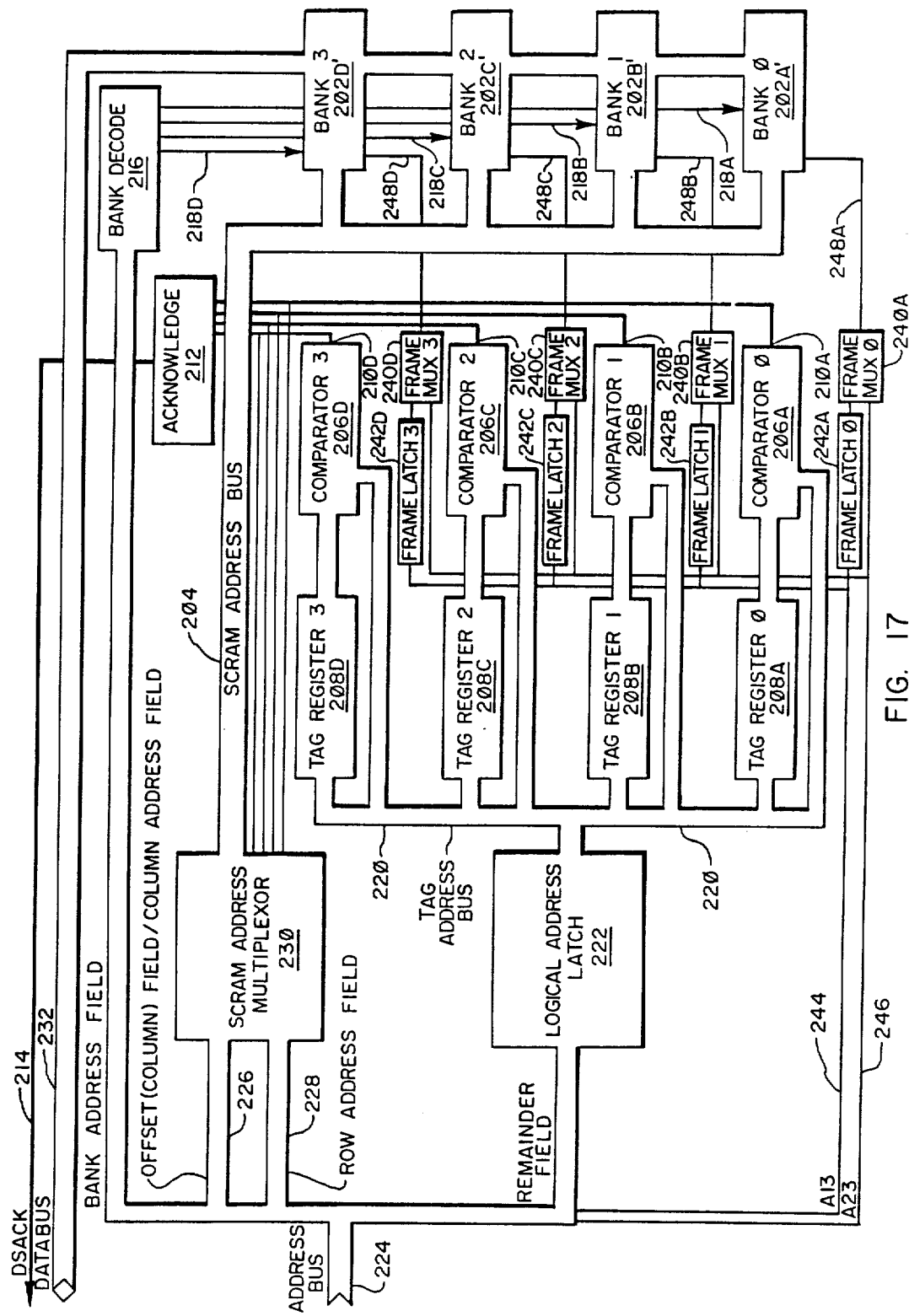
FIG. 17 is a block diagram of a second presently preferred embodiment of the present invention described herein.

FIG. 10 contains a detailed schematic drawing of one presently preferred circuit implementation of the acknowledge circuit represented at 212 in FIGS. 6 and 17. The acknowledge circuit shown in FIG. 10 receives the tag match signals (TAGMAT0–TAGMAT3) and provides, when appropriate, the DSACK signal (DSACK32/).

In FIG. 10, the devices designated U55 and U171 are of the type commonly known in the art as S22 which are described as dual 4-input positive NAND gates with open collector outputs. It can be seen that the outputs of these four NAND gates are "wired or" to assert the data stable acknowledge (DSACK) signal when appropriate.

Also shown in FIG. 10 is device U85. Device U85 is of the type commonly known in the art as 4-2-3-2-input AND/OR invert gate. Device U85 generates the local data enable (LCLDATAEN/) signal when appropriate.

Also shown in FIG. 10 is a device designated U87 which is of the type commonly known in the art as S260 which is described as a 5-input NOR gate. Furthermore, FIG. 10 shows a delay device commonly known in the art as a TTLDM-30 and described as a 30-nanosecond 5 tap delay line. Also shown in FIG. 10 are U75 and U750 both of which are hex inverting drivers.

Provided below in Glossary B is a summary of the signal and/or buses, and their corresponding functions, which appear in FIG. 10.

| GLOSSARY B (FIG. 10) | |
|---|---|
| Signal/Bus | Function |
| LCLWRITE | Local Bus Write. Generated by the CPU during memory write operations. |
| LCLADDEN/ | Local Address Enable (low asserted). Enables the local address bus onto the TAGADRSBUS. |
| LECS | Latched Early Cycle Start. Sampled signal from the CPU which indicates a memory access is about to begin. |
| TAGMAT0 | Tag Match 0. Indicates that a match has been detected between the TAGADRSBUS and the tag register for bank 0. |
| LCLAS/ | Local Address Strobe (low asserted). Indicates when a logical address from the CPU is valid. |
| TAGMAT1 | Tag Match 1. Indicates that a match has been detected between the TAGADRSBUS and the tag register for bank 1. |
| TAGMAT2 | Tag Match 2. Indicates that a match has been detected between the TAGADRSBUS and the tag register for bank 2. |
| TAGMAT3 | Tag Match 3. Indicates that a match has been detected between the TAGADRSBUS and the tag register for bank 3. |
| LCLDSACKEN/ | Local Data Transfer and Size Acknowledge Enable (low asserted). Enables the return of a transfer acknowledge back to the CPU for memory access. |
| DELAYEDECS | Delayed Early Cycle Start. A timing signal used to indicate when Tag Match signals are valid. |
| DSACK32/ | Data Transfer and Size Acknowledge for 32-bit (low asserted). Indicates to the CPU that a memory access has been acknowledged. |
| LCLDATAEN/ | Local Data Enable (low asserted). Enables data transfers between the CPU and memory. |
| HIT/ | Hit (low asserted). Indicates that one of the tag registers matches the current logical address. |

It should be appreciated that the circuit implementation shown in FIG. 10 is just one possible arrangement which could be used. Alternative embodiments are also possible for implementing the acknowledge function of the present invention.

5. Description of the Circuit Implementation of the Bank Decode Circuit (RAS Control Circuit) of the Presently Preferred Embodiments—FIG. 11.

Figures 1, 11:
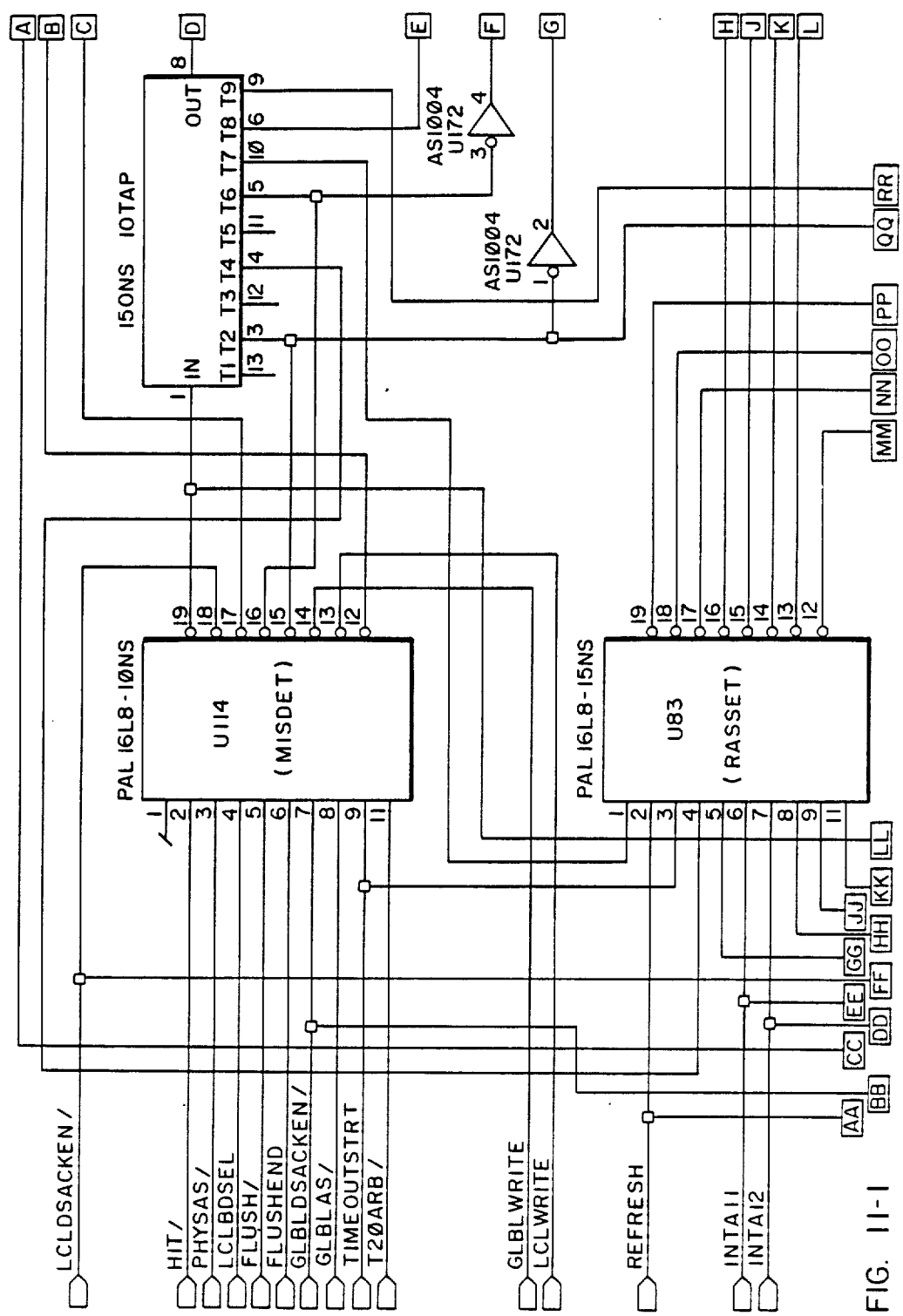
Figures 2, 11:
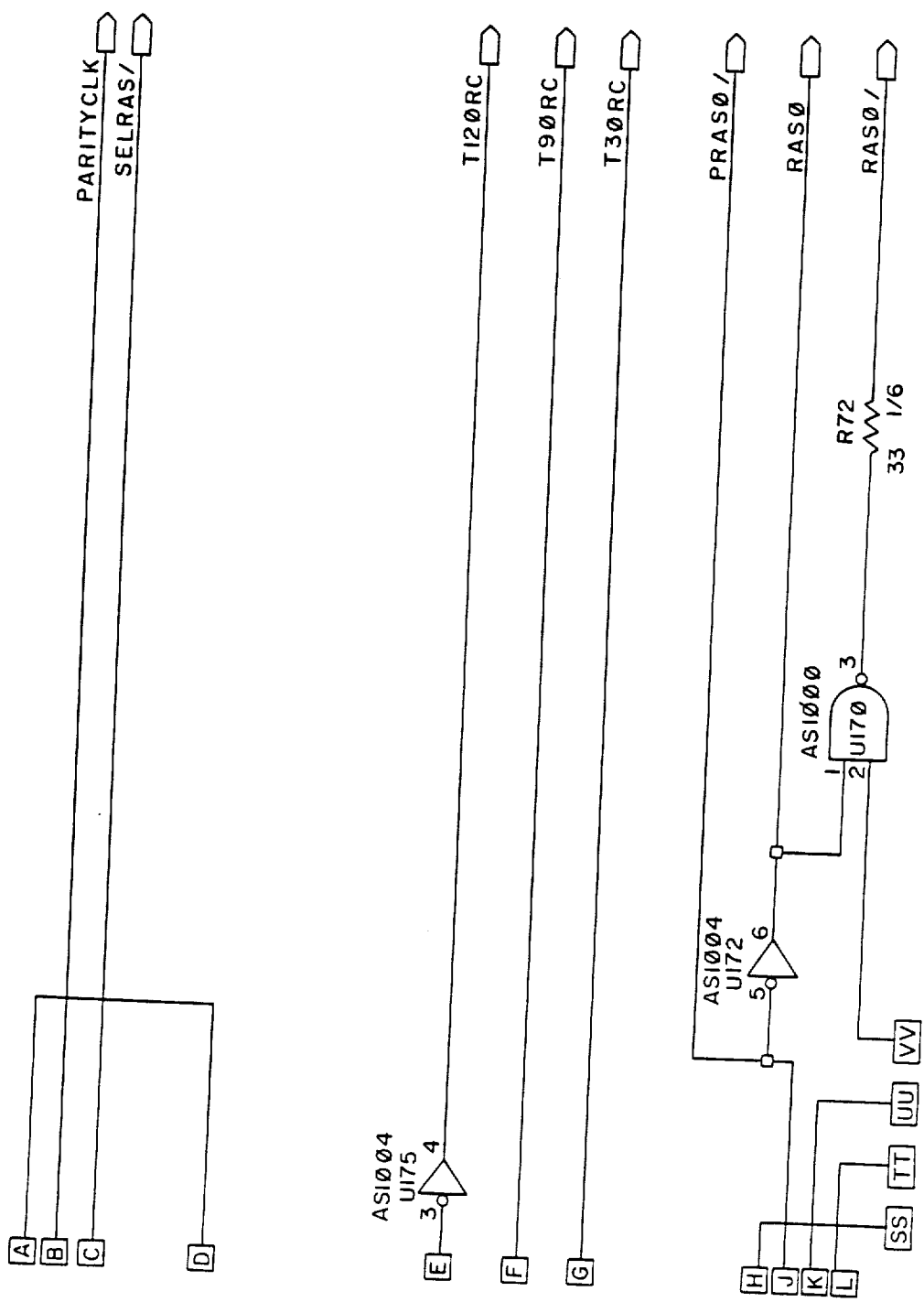
Figures 3, 11:
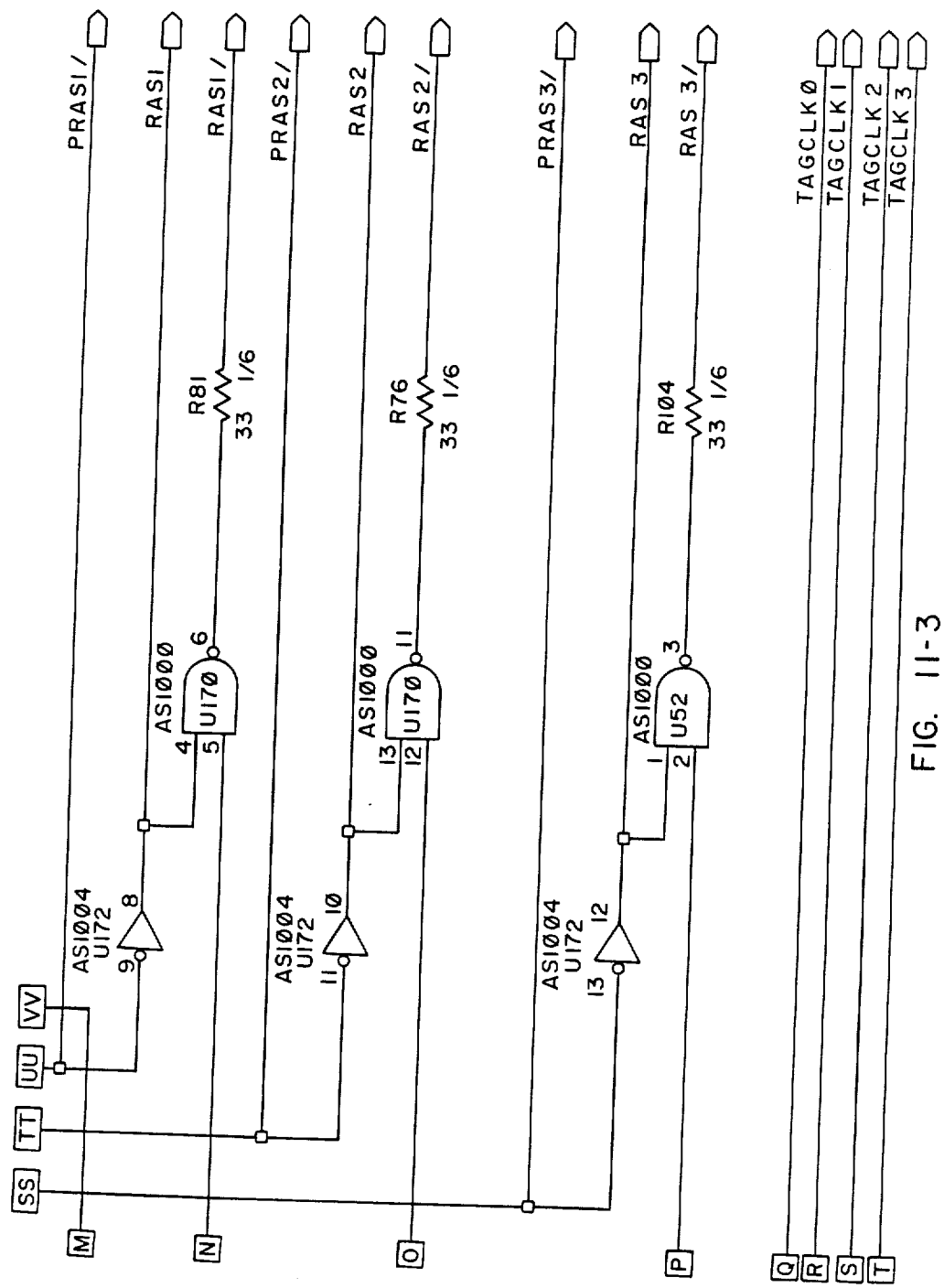
Figures 4, 11:
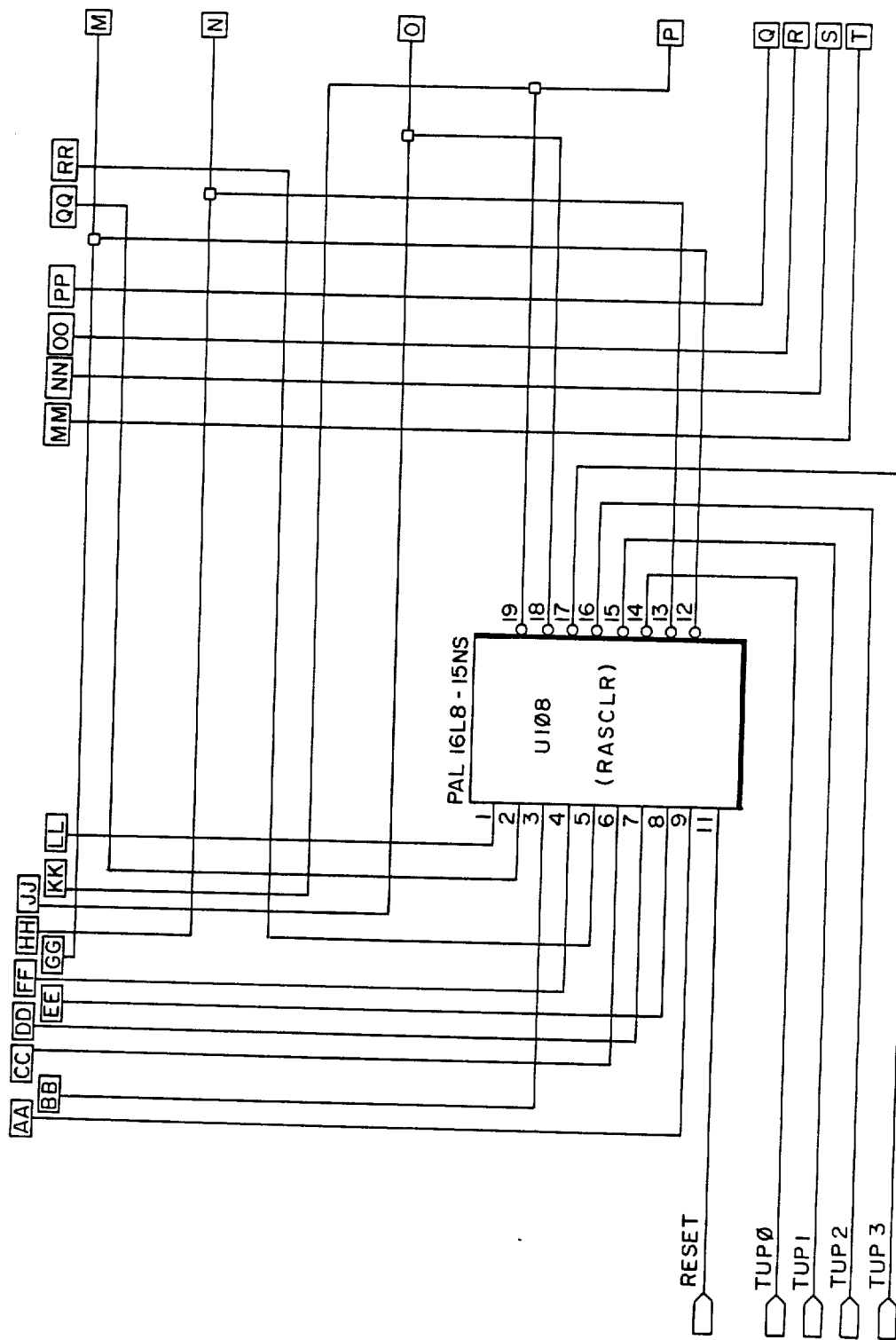

FIG. 11 contains a detailed schematic diagram of the bank decode circuit used in the presently preferred embodiments. This circuit is also referred to as the RAS (row address strobe) control circuit. Since the RAS inputs of all the SCRAMs in a bank are connected in parallel, the assertion of one RAS signal (as shown in FIG. 11) causes the selection of a bank and thus carries out the bank decode function.

Prominent in FIG. 11 are devices U114 (MISDET), U83 (RASSET), and U108 (RASCLR). Each of these three devices are programmable array logic (PAL) devices.

PAL U114 is referred to as the misdetect (MISDET) PAL and is of the type commonly designated in the art as PAL 16L8-10NS. PAL U114 (MISDET) determines when an attempted memory access does not have a matching tag in any tag register and starts a timing sequence to activate a new row into static column mode in the appropriate bank.

PAL U83 is commonly referred to as the row address strobe set (RASSET) PAL and is of the type commonly designated in the art as PAL 16L8-15NS. PAL U83 (RASSET) performs the function of latching the RAS/ signal for each bank. The latches are set and cleared according to the timing and control signals provided as inputs to PAL U83 (RASSET). PAL U83 (RASSET) also generates the tag clock (TAGCLK) signals (0–3) for each bank which allows the logical address of a memory access to be sampled into the appropriate tag register.

PAL U108 is commonly referred to as the row address strobe clear (RASCLR) PAL and also is of the type generally designated in the art as PAL 16L8-15NS. PAL U108 (RASCLR) generates timing signals to clear the RAS/ latches according to timing and control signals which are input to PAL U108 (RASCLR) as shown in FIG. 11.

The designations of each of these PALs generally describes the function which each PAL performs. Those skilled in the art will appreciate that PAL devices can be programmed so that a particular bit pattern present on its inputs will produce a predetermined bit pattern at its outputs.

PAL devices U114, U83, and U108, as well as all other PAL devices described herein, may be programmed using techniques well known in the art. Programming of the PAL devices may be greatly aided by use of a programming language such as PALASM available from Monolithic Memories, Incorporated, located at Santa Clara, Calif.

The PALASM code for programming PAL U114 (MISDET) in the presently preferred embodiments is shown in Table E. The code for programming PAL U83 (RASSET) is shown in Table F. Still further, the code for programming PAL U108 (RASCLR) is shown in Table G. Those familiar with the PALASM language will appreciate that in the code provided below the pinouts are each assigned a label and the outputs are each provided with an equation, which if true, the output is asserted.

as hex inverters. Devices U170 and U152 are of the type commonly known as AS1000 and described as quad 2-input NAND gates. Also shown are several 33 ohm 1/6 watt resistors (R72, R81, R76, R104).

Provided below in Glossary C is a summary of the signals and/or buses, and their corresponding functions, which appear in FIG. 11.

TABLE E

```
NC /HIT/ /PHYSAS /LCLBDSEL /FLUSH FLUSHEND /GLBLDSACKEN /GLBLAS
TIMEOUTSTRT GND /T20ARB /PARITYCKL LCLWRITE GLBLWRITE /T30RC /T75RC /SELRAS
/LCLDSACKEN /STRTPULSE VCC
IF (VCC) PARITYCLK   = LCLDSACKEN * HIT * /LCLWRITE * PHYSAS * LCLBDSEL
                     + GLBLDSACKEN * HIT * /GLBLWRITE * GLBLAS
IF (VCC) STRTPULSE   = LCLDSACKEN * /HIT * LCLBDSEL * PHYSAS
                     + FLUSH * LCLDSACKEN * /FLUSHEND
                     + GLBLDSACKEN * /HIT * GLBLAS
                     + TIMEOUTSTRT * T20ARB
IF (VCC) SELRAS      = /FLUSH * T30RC */T75RC * /TIMEOUTSTRT * LCLDSACKEN
                     + GLBLDSACKEN * T30RC * /T75RC
```

TABLE F

```
/T105RC REFRESH TIMEOUTSTRT /T60RC /RASCLR0 INTA11 INTA12 /RASCLR1 /RASCLR2 GND
/RASCLR3 /TAGCLK3 /PRAS2 /PRAS1 /PRAS0 /PRAS3 /TAGCLK2 /TAGCLK1 /TAGCLK0 VCC
IF (VCC) PRAS0 = /INTA12 * /INTA11 * T60RC * /T105RC * /TIMEOUTSTRT
       + REFRESH * T60RC * /T105RC
       + PRAS0 * /RASCLR0
IF (VCC) PRAS1 = /INTA12 * INTA11 * T60RC * /T105RC * /TIMEOUTSTRT
       + REFRESH * T60RC * /T105RC
       + PRAS1 * /RASCLR1
IF (VCC) PRAS2 = INTA12 * /INTA11 * T60RC * /T105RC * /TIMEOUTSTRT
       + REFRESH * T60RC * /T105RC
       + PRAS2 * /RASCLR2
IF (VCC) PRAS3 = INTA12 * INTA11 * T60RC * /T105RC * /TIMEOUTSTRT
       + REFRESH * T60RC * /T105RC
       + PRAS3 * /RASCLR3
IF (VCC) TAGCLK0 = /INTA12 * /INTA11 * /REFRESH * T60RC * /T105RC * /TIMEOUTSTRT
IF (VCC) TAGCLK1 = /INTA12 * INTA11 * /REFRESH * T60RC * /T105RC * /TIMEOUTSTRT
IF (VCC) TAGCLK2 = INTA12 * /INTA11 * /REFRESH * T60RC * /T105RC * /TIMEOUTSTRT
IF (VCC) TAGCLK3 = INTA12 * INTA11 * /REFRESH * T60RC * /T105RC * /TIMEOUTSTRT
```

TABLE G

```
/STRTPLSE /T30RC /GLBLDSACKEN /LCLDSACKEN /T120RC /T150RC INTA12
INTA11 REFRESH GND
RESET /RASCLR0 /RASCLR1 TUP0 TUP1 TUP2 TUP3 /RASCLR2 /RASCLR3 VCC
IF (VCC) RASCLR0  = /INTA12 * /INTA11 * STRTPLSE * /T30RC * GLBLDSACKEN
       + /INTA12 * /INTA11 * STRTPLSE * /T30RC * LCLDSACKEN
       + REFRESH * STRTPLSE * /T30RC
       + REFRESH * T120RC * /T150RC
       + TUP0 * STRTPLSE * /T30RC
       + RESET
IF (VCC) RASCLR1  = /INTA12 * INTA11 * STRTPLSE * /T30RC * GLBLDSACKEN
       + /INTA12 * INTA11 * STRTPLSE * /T30RC * LCLDSACKEN
       + REFRESH * STRTPLSE * /T30RC
       + REFRESH * T120RC * /T150RC
       + TUP1 * STRTPLSE * /T30RC
       + RESET
IF (VCC) RASCLR2  = INTAL12 * /INTA11 * STRTPLSE * /T30RC * GLBLDSACKEN
       + INTA12 * /INTA11 * STRTPLSE * /T30RC * LCLDSACKEN
       + REFRESH * STRTPLSE * /T30RC
       + REFRESH * T120RC * /T150RC
       + TUP2 * STRTPLSE * /T30RC
       + RESET
IF (VCC) RASCLR3  = INTA12 * INTA11 * STRTPLSE * /T30RC * GLBLDSACKEN
       + INTA12 * INTA11 * STRTPLSE * /T30RC * LCLDSACKEN
       + REFRESH * STRTPLSE * /T30RC
       + REFRESH * T120RC * /T150RC
       + TUP3 * STRTPLSE * /T30RC
       + RESET
```

Also shown in FIG. 11 is a 150 nanosecond 10 tap delay device well known in the art. Also shown are devices designated U172 and U175 which are of the type commonly known as AS1004 which are described

GLOSSARY C
(FIG. 11)

| Signal/Bus | Function |
|---|---|
| LCLDSACKEN/ | Local Data Transfer and Size Acknowledge |

GLOSSARY C
(FIG. 11)

| Signal/Bus | Function |
|---|---|
| | Enable (low asserted). Enables the return of a transfer acknowledge back to the CPU for memory accesses. |
| HIT/ | Hit (low asserted). Indicates that one of the tag registers matches the current logical address. |
| PHYSAS/ | Physical Address Strobe (low asserted). Indicates that a translated physical address from the Memory Management Unit is valid. |
| LCLBDSEL/ | Local Board Select (low asserted). Decoded from a combination of physical address bits to determine board selection. |
| FLUSH/ | Flush (low asserted). Generated by the CPU under control of the computer system managing software to invalidate all tag registers and perform a refresh operation on all banks. |
| FLUSHEND | Flush End. A timing signal which indicates the end of a flush operation. |
| GLBLDSACKEN/ | Global Data Transfer and Size Acknowledge Enable (low asserted). Enables data transfer acknowledge to the device making a memory access on the global bus connection to the static frame memory. |
| GLBLAS/ | Global Address Strobe (low asserted). Indicates that the address from the device on the Global Bus connection is valid. |
| TIMEOUTSTRT | Timeout Start. A timing signal which indicates the beginning of a timeout cycle. |
| T20ARB/ | Time 20 ns in Arbitration (low asserted). A timing signal occurring during arbitration between Local (CPU) and Global connections to the Static Frame memory. |
| GLBLWRITE | Global Write. Indicates that the device on the Global Bus connection to the Static Frame Memory is performing a memory write operation. |
| LCLWRITE | Local Bus Write. Generated by the CPU during memory write operations. |
| REFRESH | Refresh. Generated from FLUSH and LCLDSACKEN. |
| INTA11 | Internal Address bit 11. Used with INTA12 to select a bank from the translated physical address. |
| INTA12 | Internal Address Bit 12. Used with INTA11 to select a bank from the translated physical address. |
| RESET/ | System Reset. Occurs on power-on or reboot. |
| TUP0 | Time's Up Bank 0. Indicates that the timer for Row Address Strobe has expired on bank 0. |
| TUP1 | Time's Up Bank 1. Indicates that the timer for Row Address Strobe has expired on bank 1. |
| TUP2 | Time's Up Bank 2. Indicates that the timer for Row Address Strobe has expired on bank 2. |
| TUP3 | Time's Up Bank 3. Indicates that the timer for Row Address Strobe has expired on bank 3. |
| PARITYCLK | Parity Clock. A timing signal to sample the outputs of the parity checkers on memory read operations. |
| SELRAS/ | Select Row Address (low asserted). Controls the Address Multiplexor for the memory banks. When asserted, Row Addresses are gated to the address inputs of the memory ICs. When disasserted, Column Addresses are gated to the memory ICs. |
| T120RC | Time 120 ns Row Address Cycle. A timing pulse that appears 120 nanoseconds after the beginning of a new row selection. |
| T90RC | Time 90 ns Row Address Cycle. A timing pulse that appears 90 nanoseconds after the beginning of a new row section. |
| T30RC | Time 30 ns Row Address Cycle. A timing pulse that appears 30 nanoseconds after the beginning of a new row selection. |
| PRAS0/ | Pre-Row Address Strobe Bank 0 (low asserted). Same function as RAS0. |
| RAS0 | Row Address Strobe Bank 0. Selects a row address in Bank 0. |
| PRAS1/ | Pre-Row Address Strobe Bank 1 (low asserted). Same function as RAS1. |
| RAS1 | Row Address Strobe Bank 1. Selects a row address in Bank 1. |
| PRAS2/ | Pre-Row Address Strobe Bank 2 (low asserted). Same function as RAS2. |
| RAS2 | Row Address Strobe Bank 2. Selects a row address in Bank 2. |
| PRAS3/ | Pre-Row Address Strobe Bank 3 (low asserted). Same function as RAS3. |
| RAS3 | Row Address Strobe Bank 3. Selects a row address in Bank 3. |
| TAGCLK0 | Tag Clock 0. Samples data on the TAGADRSBUS into the tag register for bank 0. |
| TAGCLK1 | Tag Clock 1. Samples data on the TAGADRSBUS into the tag register for bank 1. |
| TAGCLK2 | Tag Clock 2. Samples data on the TAGADRSBUS into the tag register for bank 2. |
| TAGCLK3 | Tag Clock 3. Samples data on the TAGADRSBUS into the tag register for bank 3. |

It should be appreciated that the presently preferred embodiment illustrated in FIG. 11 is representative only and not limiting of other implementations for the bank decode circuit (RAS control circuit) of the present invention. It is expected that different devices presently available, and which may become available in the future, could be used to carry out the functions of these portions of the presently preferred embodiments.

6. Description of the Circuit Implementation of the Chip Select Circuit of the Presently Preferred Embodiments—FIGS. 12A-12B.

Figures 1, 12A:
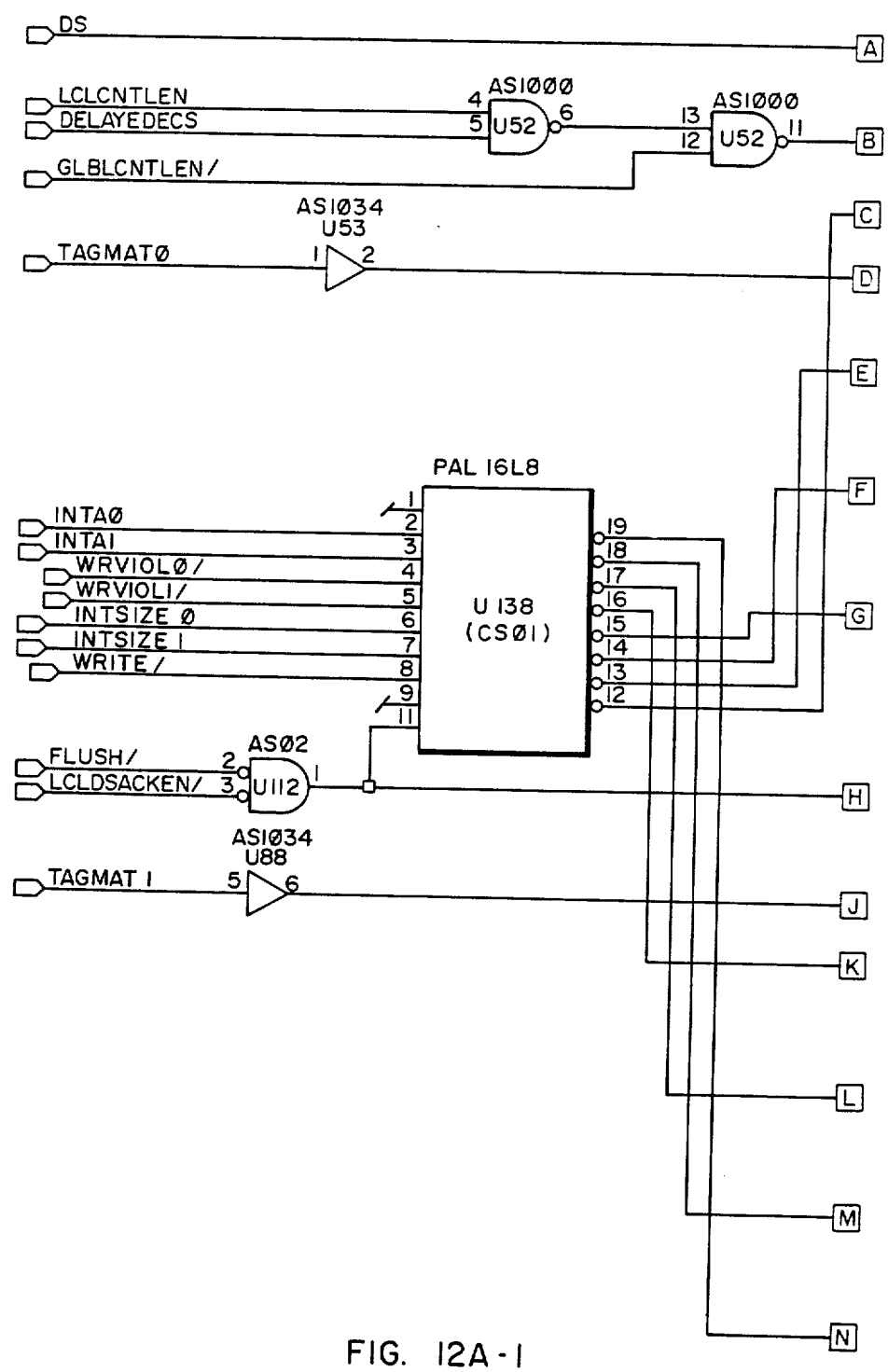
Figures 2, 12A:
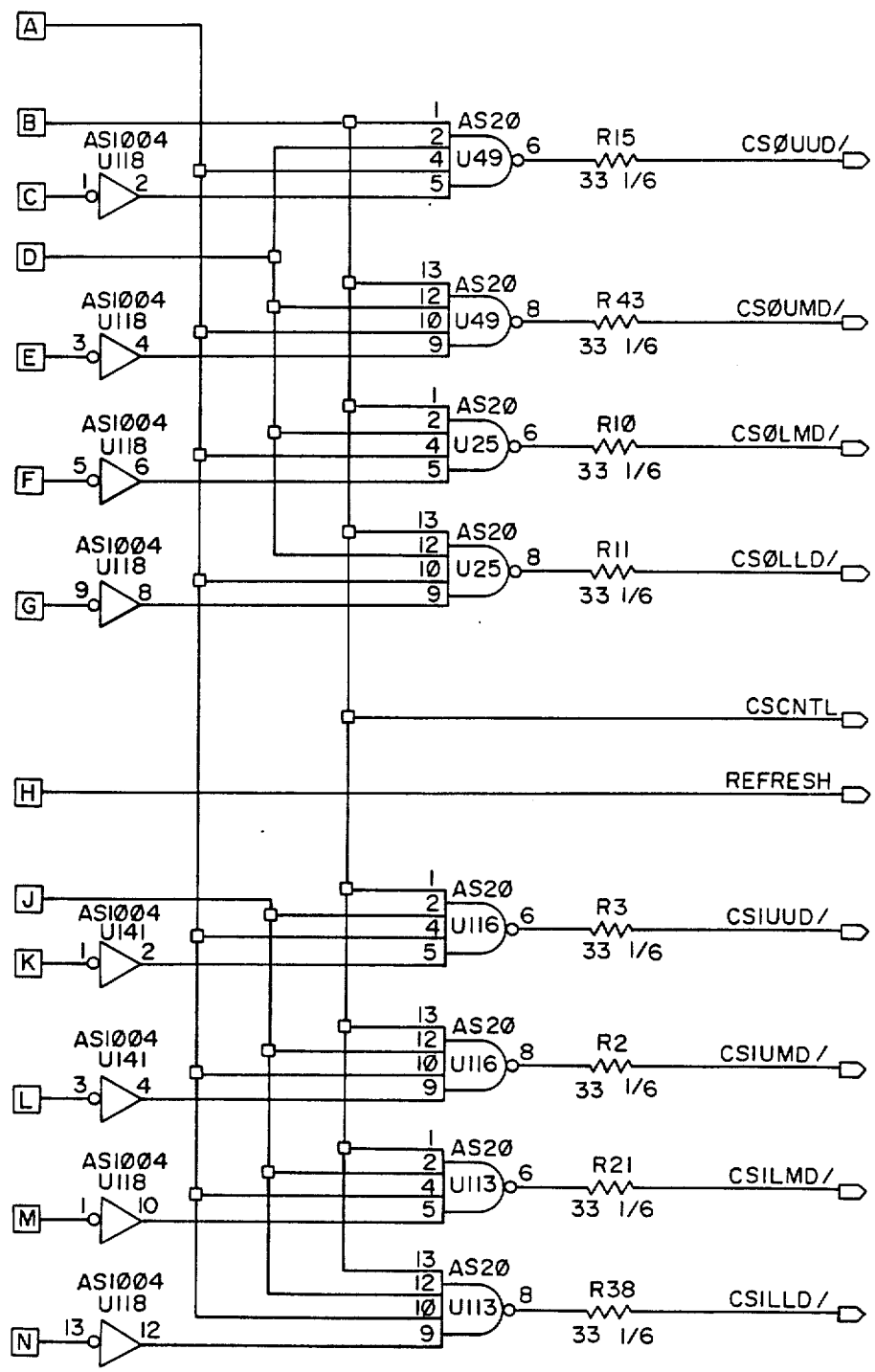
Figures 1, 12B:
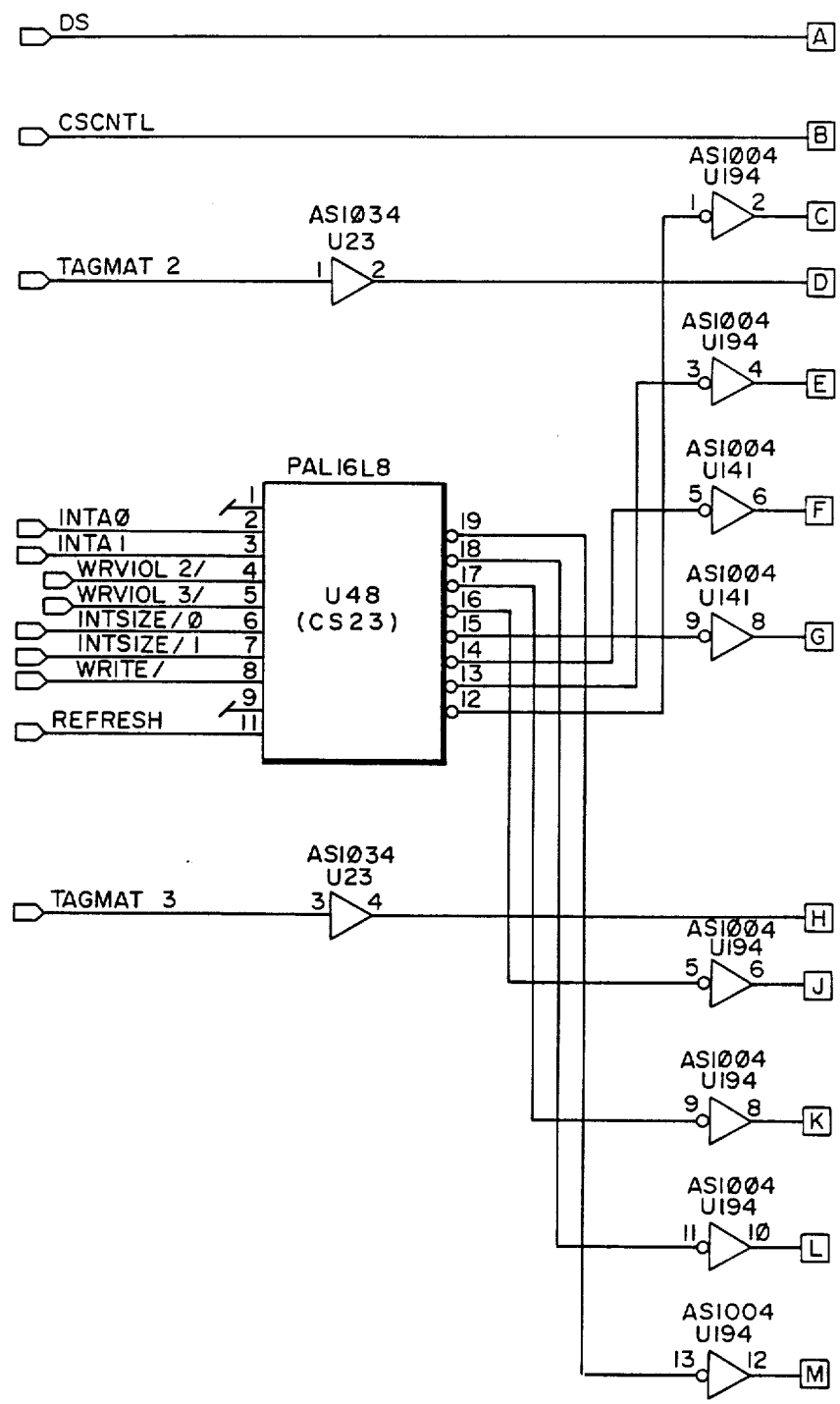
Figures 2, 12B:
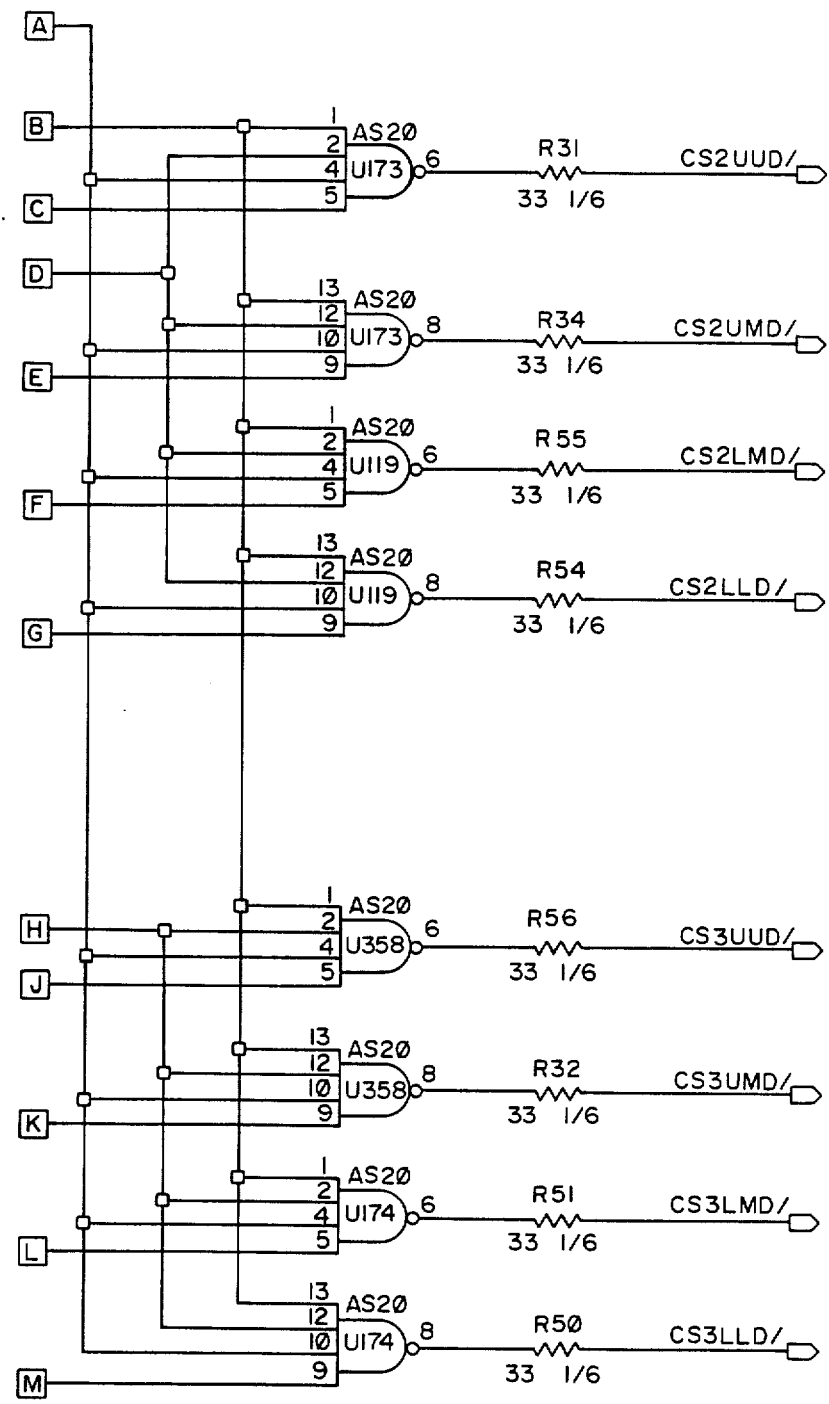

FIGS. 12A and 12B contain detailed schematic drawings of the presently preferred circuit implementation of the chip select circuits of the embodiment illustrated in FIG. 6. The chip select circuit associated with banks 202A and 202B is illustrated in FIG. 12A. The chip select circuit associated with banks 202C and 202D is illustrated in FIG. 12B. The chip select circuits provide the chip select (CS) control signal to the SCRAMs in each bank. The circuits shown in FIGS. 12A and 12B, while not explicitly represented in FIG. 6, are functionally equivalent to a portion of the SCRAM address multiplexor 230.

In the schematic diagrams illustrating the chip select circuits PAL U138 (designated CS01 in FIG. 12A) and PAL U48 (designated CS23 in FIG. 12B) are programmable array logic devices which are generally designated in the art as PAL 16L8. The function of PAL U138 and PAL U48 is to generate four chip select signls for each bank of SCRAM.

The four chip select signals for each bank of SCRAM correspond to the four bytes addressable within each bank of SCRAM. In this fashion, each byte in a 32-bit word may be addressed. This feature complements the features of the MC68020 CPU which is able to addres individual bytes in the 32-bit word.

The "UUD", "UMD", "LMD", and "LLD" designations in FIGS. 12A and 12B refer to upper upper data, upper middle data, lower middle data, and lower lower data, respectively. These designations are used to indicate the relative position of each of the four bytes contained within each 32-bit word.

The PALASM code for programming U138 (CS01) is provided below in Table H. The code for programming U48 (CS23) is provided below in Table I.

TABLE H

```
NC INTA0 INTA1 /WRVIOL0 /WRVIOL1 INTSIZ0 INTSIZ1 /WRITE NC GND
REFRESH /0UUD /0UMD /0LMD /0LLD /1UUD /1UMD /1LMD /1LLD VCC
IF (VCC) 0UUD = /WRITE * /REFRESH
    + /INTA1 * /INTA0 + WRITE * /WRVIOL0 * /REFRESH
IF (VCC) 0UMD = /WRITE * /REFRESH
    + /INTA1 * /INTSIZ0 * WRITE * /WRVIOL0 * /REFRESH
    + /INTA1 * INTA0 * WRITE * /WRVIOL0 * /REFRESH
    + /INTA1 * INTSIZ1 * WRITE * /WRVIOL0 * /REFRESH
IF (VCC) 0LMD = /WRITE * /REFRESH
    + /INTA0 * INTA1 * WRITE * /WRVIOL0 * /REFRESH
    + /INTA1 * /INSTSIZ0 * /INTSIZ1 * WRITE * /WRIVIOL0 * /REFRESH
    + INTSIZ1 * INTSIZ0 * /INTA1 * WRITE */WRVIOL0 * /REFRESH
    + /INTSIZ0 * /INTA1 * INTA0 * WRITE * /WRVIOL0 * /REFRESH
IF (VCC) 0LLD = /WRITE * /REFRESH
    + INTA0 * INTSIZ0 * INTSIZ1 * WRITE * /WRVIOL0 * /REFRESH
    + /INTSIZ0 * /INTSIZ1 * WRITE * /WRIVIOL0 * /REFRESH
    + INTA0 * INTA1 * WRITE * /WRVIOL0 * /REFRESH
    + INTA1 * INTSIZ1 * WRITE * /WRVIOL0 * /REFRESH
IF (VCC) 1UUD = /WRITE * /REFRESH
    + /INTA1 * /INTA0 * WRITE * /WRVIOL1 * /REFRESH
IF (VCC) 1UMD = /WRITE * /REFRESH
    + /INTA1 * /INTSIZ0 * WRITE * /WRVIOL1 * /REFRESH
    + /INTA1 * INTA0 * WRITE * /WRVIOL1 * /REFRESH
    + /INTA1 * INTSIZ1 * WRITE * /WRVIOL1 * /REFRESH
IF (VCC) 1LMD = /WRITE * /REFRESH
    + /INTA0 * INTA1 * WRITE * /WRVIOL1 * /REFRESH
    + /INTA1 * /INTSIZ0 * /INTSIZ1 * WRITE * /WRVIOL1 * /REFRESH
    + INTSIZ1 * INTSIZ0 * /INTA1 * WRITE */WRVIOL1 * /REFRESH
    + /INTSIZ0 * /INTA1 * INTA0 * WRITE * /WRVIOL1 * /REFRESH
IF (VCC) 1LLD = /WRITE * /REFRESH
    + INTA0 * INTSIZ0 * INTSIZ1 * WRITE * /WRVIOL1 * /REFRESH
    + /INTSIZ0 * /INTSIZ1 * WRITE * /WRVIOL1 * /REFRESH
    + INTA0 * INTA1 * WRITE * /WRVIOL1 * /REFRESH
    + INTA1 * INTSIZ1 * WRITE * /WRVIOL1 * /REFRESH
```

TABLE I

```
NC INTA0 INTA1 /WRVIOL2 /WRVIOL3 INTSIZ0 INTSIZ1 /WRITE NC GND
REFRESH /2UUD /2UMD /2LMD /2LLD /3UUD /3UMD /3LMD /3LLD VCC
IF (VCC) 2UUD = /WRITE * /REFRESH
    + /INTA1 * /INTA0 * WRITE * /WRVIOL2 * /REFRESH
IF (VCC) 2UMD = /WRITE * /REFRESH
    + /INTA1 * /INTSIZ0 * WRITE * /WRVIOL2 * /REFRESH
    + /INTA1 * INTA0 * WRITE * /WRVIOL2 * /REFRESH
    + /INTA1 * INTSIZ1 * WRITE * /WRVIOL2 * /REFRESH
IF (VCC) 2LMD = /WRITE * /REFRESH
    + /INTA0 * INTA1 * WRITE * /WRVIOL2 * /REFRESH
    + /INTA1 * /INTSIZ0 * /INTSIZ1 * WRITE * /WRVIOL2 * /REFRESH
    + INTSIZ1 * INTSIZ0 * /INTA1 * WRITE */WRVIOL2 * /REFRESH
    + /INTSIZ0 * /INTA1 * INTA0 * WRITE * /WRVIOL2 * /REFRESH
IF (VCC) 2LLD = /WRITE * /REFRESH
    + INTA0 * INTSIZ0 * INTSIZ1 * WRITE * /WRVIOL2 * /REFRESH
    + /INTSIZ0 * /INTSIZ1 * WRITE * /WRVIOL2 * /REFRESH
    + INTA0 * INTA1 * WRITE * /WRVIOL2 * /REFRESH
    + INTA1 * INTSIZ1 * WRITE * /WRVIOL2 * /REFRESH
IF (VCC) 3UUD = /WRITE * /REFRESH
    + /INTA1 * /INTA0 * WRITE * /WRVIOL3 * /REFRESH
IF (VCC) 3UMD = /WRITE * /REFRESH
    + /INTA1 * /INTSIZ0 * WRITE * /WRVIOL3 * /REFRESH
    + /INTA1 * INTA0 * WRITE * /WRVIOL3 * /REFRESH
    + /INTA1 * INTSIZ1 * WRITE * /WRVIOL3 * /REFRESH
IF (VCC) 3LMD = /WRITE * /REFRESH
    + /INTA0 * INTA1 * WRITE * /WRVIOL3 * /REFRESH
    + /INTA1 * /INTSIZ0 * /INTSIZ1 * WRITE * /WRVIOL3 * /REFRESH
    + INTSIZ1 * INTSIZ0 /INTA1 * WRITE * /WRVIOL3 * /REFRESH
    + /INTSIZ0 * /INTA1 * INTA0 * WRITE * /WRVIOL3 * /REFRESH
```

TABLE I-continued

```
IF (VCC) 3LLD = /WRITE * /REFRESH
    + INTA0 * INTSIZ0 * INTSIZ1 * WRITE * /WRVIOL3 * /REFRESH
    + /INTSIZ0 * /INTSIZ1 * WRITE * /WRVIOL3 * / REFRESH
    + INTA0 * INTA1 * WRITE * /WRVIOL3 * /REFRESH
    + INTA1 * INTSIZ1 * WRITE * /WRVIOL3 * /REFRESH
```

Also shown in FIG. 12A is device U52 which is generally designated in the art as AS1000. The AS1000 device is a quad 2-input positive NAND buffers/drivers.

The remaining devices of the chip select circuit associated with banks 202A and 202B (FIG. 12A) and the chip select circuit associated with banks 202C and 202D (FIG. 12B) are essentially the same. The AS1004 devices are hex inverting drivers. In FIG. 12A U 118 and U141, and in FIG. 12B, U194 and U141, are AS1004 hex inverting drivers.

The AS20 devices are generally described as dual 4-input positive NAND gates. In FIG. 12A U49, U25, U116, and U113 are AS20 NAND gates. In FIG. 12B U173, U119, U358, and U147 are also AS20 NAND gates.

Also shown in FIG. 12A are eight resistors R15, R43, R10, R11, R3, R2, R21, and R38 each having a value of 33 ohms. Similarly, in FIG. 12B eight resistors R31, R34, R55, R54, R56, R32, R51, and R50 are provided each having a value of 33 ohms.

Device U112 (FIG. 12A) is an AS02 two input NOR gate. Also shown in FIGS. 12A and 12B are devices designated U53, U88, and U23 all of which are devices generally designated in the art as AS1034 and generally described as hex drivers.

Provided below in Glossary D is a summary of the signals and/or buses which are represented in FIG. 12A. Also, provided below in Glossary E is a summary of the signals and/or buses which are represented in FIG. 12B.

GLOSSARY D
(FIG. 12A)

| Signal/Bus | Function |
|---|---|
| DS | Data Strobe. Indicates that data is valid from the CPU during write operations and that data is requested during read operations. |
| LCLCNTLEN | Local Control Enable. Enables control signals from the CPU. |
| DELAYEDECS | Delayed Early Cycle Start. A timing signal used to indicate when tag match signals are valid. |
| GLBLCNTLEN/ | Global Control Enable (low asserted). Enables control signals from the device on the global bus connection to the static frame memory. |
| TAGMAT0 | Tag Match 0. Indicates that a match has been detected between the tag address bus (TAGADRSBUS) and the tag register for bank 0. |
| INTA0 | Internal Address Bit 0. Used to determine byte addressing within each memory bank. |
| INTA1 | Internal Address Bit 1. Used to determine byte addressing within each memory bank. |
| WRVIOL0/ | Write Violation Bank 0 (low asserted). Indicates that an unpermitted write operation is being attempted to a page in static column mode in bank 0. |
| WRVIOL1 | Write Violation Bank 1 (low asserted). Indicates that an unpermitted write operation is being attempted to a page in static column mode in bank 1. |
| INTSIZE0 | Internal Size Bit 0. Used to determine number of bytes to be accessed within each memory bank. |
| INTSIZE1 | Internal Size Bit 1. Used to determine number of bytes to be accessed within each memory bank. |
| WRITE/ | Write (low asserted). Indicates a memory write operation. |
| LCLDSACKEN/ | Local Data Transfer and Size Acknowledge Enable (low asserted). Enables the return of a transfer acknowledge back to the CPU for memory accesses. |
| TAGMAT1 | Tag Match 1. Indicates that a match has been detected between the tag address bus (TAGADRSBUS) and the tag register for bank 1. |
| CS0UUD/ | Chip Select Bank 0, Upper-Upper Data (low asserted). Performs column selection of bits 24-31 of bank 0. |
| CS0UMD/ | Chip Select Bank 0, Upper-Middle Data (low asserted). Performs column selection of bits 16-23 of bank 0. |
| CS0LMD/ | Chip Select Bank 0, Lower-Middle Data (low asserted). Performs column selection of bits 8-15 of bank 0. |
| CS0LLD/ | Chip Select Bank 0, Lower-Lower Data (low asserted). Performs column selection of bits 0-7 of bank 0. |
| CSCNTL | Chip Select Control. Enables all chip select signals |
| REFRESH | Refresh. Generated from FLUSH and LCLDSACKEN. |
| CS1UUD/ | Chip Select Bank 1, Upper-Upper Data (low asserted). Performs column selection of bits 24-31 of bank 1. |
| CS1UMD/ | Chip Select Bank 1, Upper-Middle Data (low asserted). Performs column selection of bits 16-23 of bank 1. |
| CS1LMD/ | Chip Select Bank 1, Lower-Middle Data (low asserted). Performs column selection of bits 8-15 of bank 1. |
| CS1LLD/ | Chip Select Bank 1, Lower-Lower Data (low asserted). Performs column selection of bits 0-7 of bank 1. |

GLOSSARY E
(FIG. 12B)

| Signal/Bus | Function |
|---|---|
| DS | Data Strobe. Indicates that data is valid from the CPU during write operations and that data is requested during read operations. |
| TAGMAT2 | Tag Match 2. |

-continued

GLOSSARY E
(FIG. 12B)

| Signal/Bus | Function |
|---|---|
|  | Indicates that a match has been detected between the tag address bus (TAGADRSBUS) and the tag register for bank 2. |
| CSCNTL | Chip Select Control. Enables all chip select signals. |
| INTA0 | Internal Address Bit 0. Used to determine byte addressing within each memory bank. |
| INTA1 | Internal Address Bit 1. Used to determine byte addressing within each memory bank. |
| WRVIOL2/ | Write Violation Bank 2 (low asserted). Indicates that an unpermitted write operation is being attempted to a page in static column mode in bank 2. |
| WRVIOL3/ | Write Violation Bank 3 (low asserted). Indicates that an unpermitted write operation is being attempted to a page in static column mode in bank 3. |
| INTSIZE0 | Internal Size Bit 0. Used to determine number of bytes to be accessed within each memory bank. |
| INTSIZE1 | Internal Size Bit 1. Used to determine number of bytes to be accessed within each memory bank. |
| WRITE/ | Write (low asserted). Indicates a memory write operation. |
| REFRESH | Refresh. Generated from FLUSH and LCLDSACKEN. |
| TAGMAT3 | Tag Match 3. Indicates that a match has been detected between the tag address bus (TAGADRSBUS) and the tag register for bank 3. |
| CS2UUD/ | Chip Select Bank 2, Upper-Upper Data (low asserted). Performs column selection of bits 24-31 of bank 2. |
| CS2UMD/ | Chip Select Bank 2, Upper-Middle Data (low asserted). Performs column selection of bits 16-23 of bank 2. |
| CS2LMD/ | Chip Select Bank 2, Lower-Middle Data (low asserted). Performs column selection of bits 8-15 of bank 2. |
| CS2LLD/ | Chip Select Bank 2, Lower-Lower Data (low asserted). Performs column selection of bits 0-7 of bank 2. |
| CS3UUD/ | Chip Select Bank 3, Upper-Upper Data (low asserted). Performs column selection of bits 24-31 of bank 3. |
| CS3UMD/ | Chip Select Bank 3, Upper-Middle Data (low asserted). Performs column selection of bits 16-23 of bank 3. |
| CS3LMD/ | Chip Select Bank 3, Lower-Middle Data (low asserted). Performs column selection of bits 8-15 of bank 3. |
| CS3LLD/ | Chip Select Bank 3, Lower-Lower Data (low asserted). Performs column selection of bits 0-7 of bank 3. |

It should be appreciated that the circuits represented in FIGS. 12A and 12B are just one possible arrangement for implementation of the chip select circuit. Other architectures, whether using the same or different devices, could be designed to perform the functions required of this circuit.

7. Description of the Circuit Implementation of the SCRAM Address Selector and Board Decode Circuits of the First Presently Preferred Embodiment—FIG. 13.

Figures 1, 13:
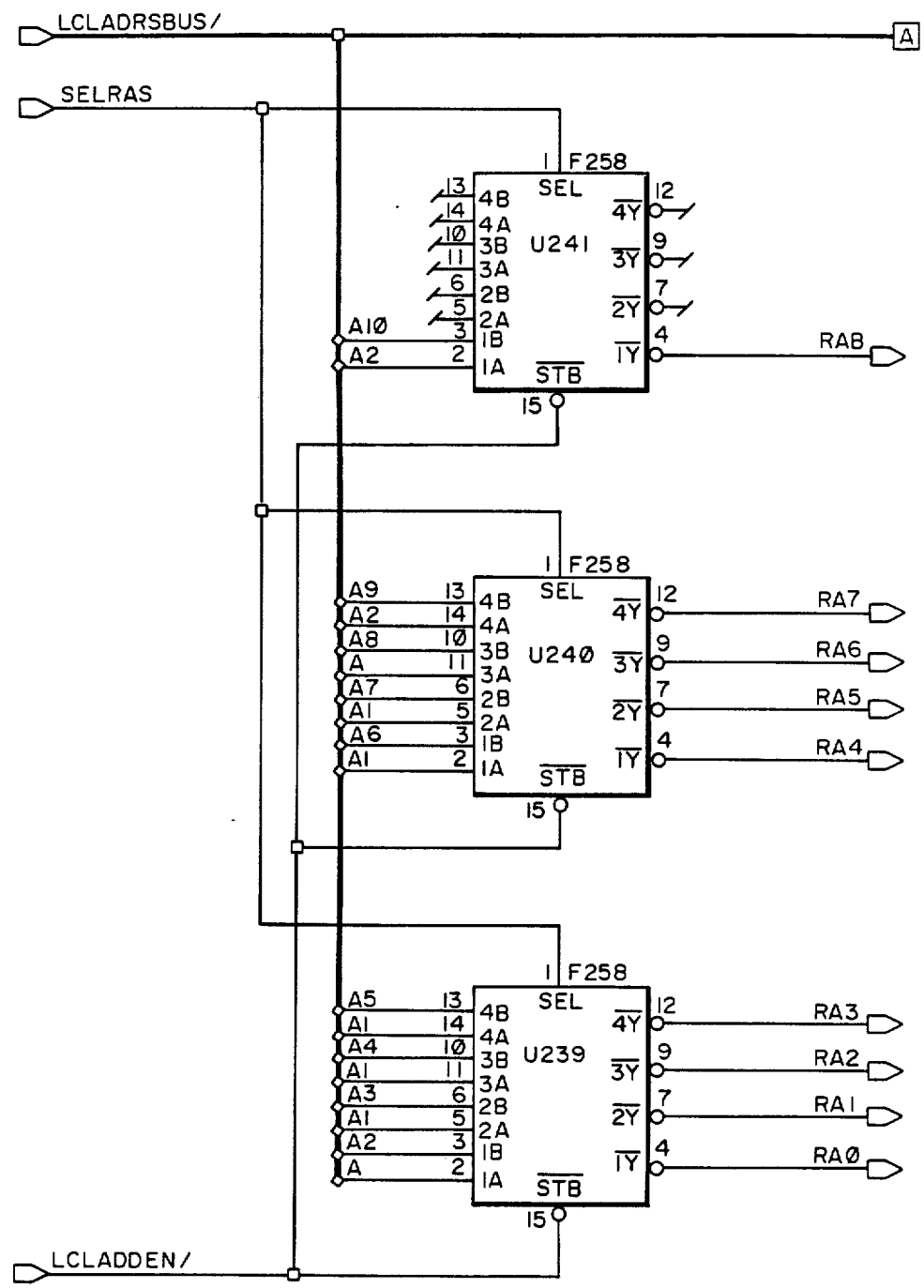
Figures 2, 13:
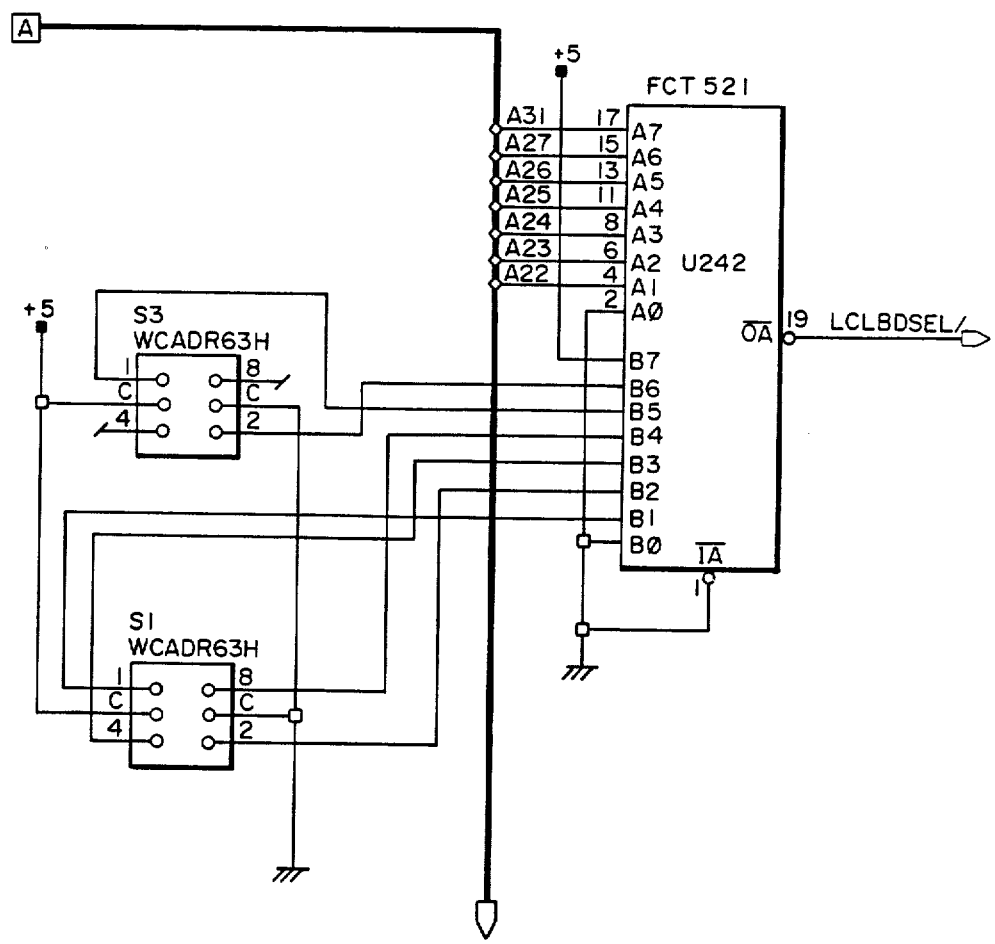

FIG. 13 contains a detailed schematic drawing of the circuit implementation of the SCRAM address selector and the board decode circuit which carry out functions which are associated with SCRAM address multiplexor 230 represented in FIG. 6.

In FIG. 13, the devices designated U241, U240, and U239 are F258 quad 2-input multiplexors with three-state outputs. The function of U241, U240 and U239 is to selectively present either the column address field or the row address field to banks 202A-202D as received from the local address bus (LCLADRSBUS).

Also shown in FIG. 13 are encoding switches S3 and S1 and the device designated U242. Switches S3 and S1 and device U242 comprise the board select circuit mentioned previously. The address of the board is determined by the position of switches S3 and S1 at the time that the board is installed in the digital computer.

Device U242 is an FCT521 8-bit identity comparator. Device U242 compares the value contained in the board address field (as shown at 166 in FIG. 5) to the values set by the switches S3 and S1. If the two values are equivalent, the local board select (LCLBDSEL/) signal is asserted.

Provided below in Glossary F is a summary of the signal and/or buses which are represented in FIG. 13.

GLOSSARY F
(FIG. 13)

| Signal/Bus | Function |
|---|---|
| LCLADRSBUS | Local Address Bus. Size is 32 bits. Carries both logical addresses and translated physical addresses from the CPU to memory. Each bit is low asserted. |
| SELRAS/ | Select Row Address (low asserted). Controls the SCRAM address multiplexor. When asserted, row addresses are gated to the address inputs of the SCRAMs. When disasserted, column addresses are gated to the SCRAMs. |
| LCLADDEN/ | Local Address Enable (low asserted). Enables the local address bus onto the TAGADRSBUS. |
| RA0-RA8 | SCRAM Address bits 0 through 8. Carries both row and column address information to all banks. |
| LCLBDSEL/ | Local Board Select (low asserted). Indicates that a translated physical address from the CPU has selected the board. |

It should be appreciated that circuits other than that shown in FIG. 13 could be used to provide the described functions.

8. Description of the Circuit Implementation of the SCRAM Buffer Circuit and the SCRAM Write Enable Buffer Circuit of the Presently Preferred Embodiments—FIGS. 14-15.

Figure 14:
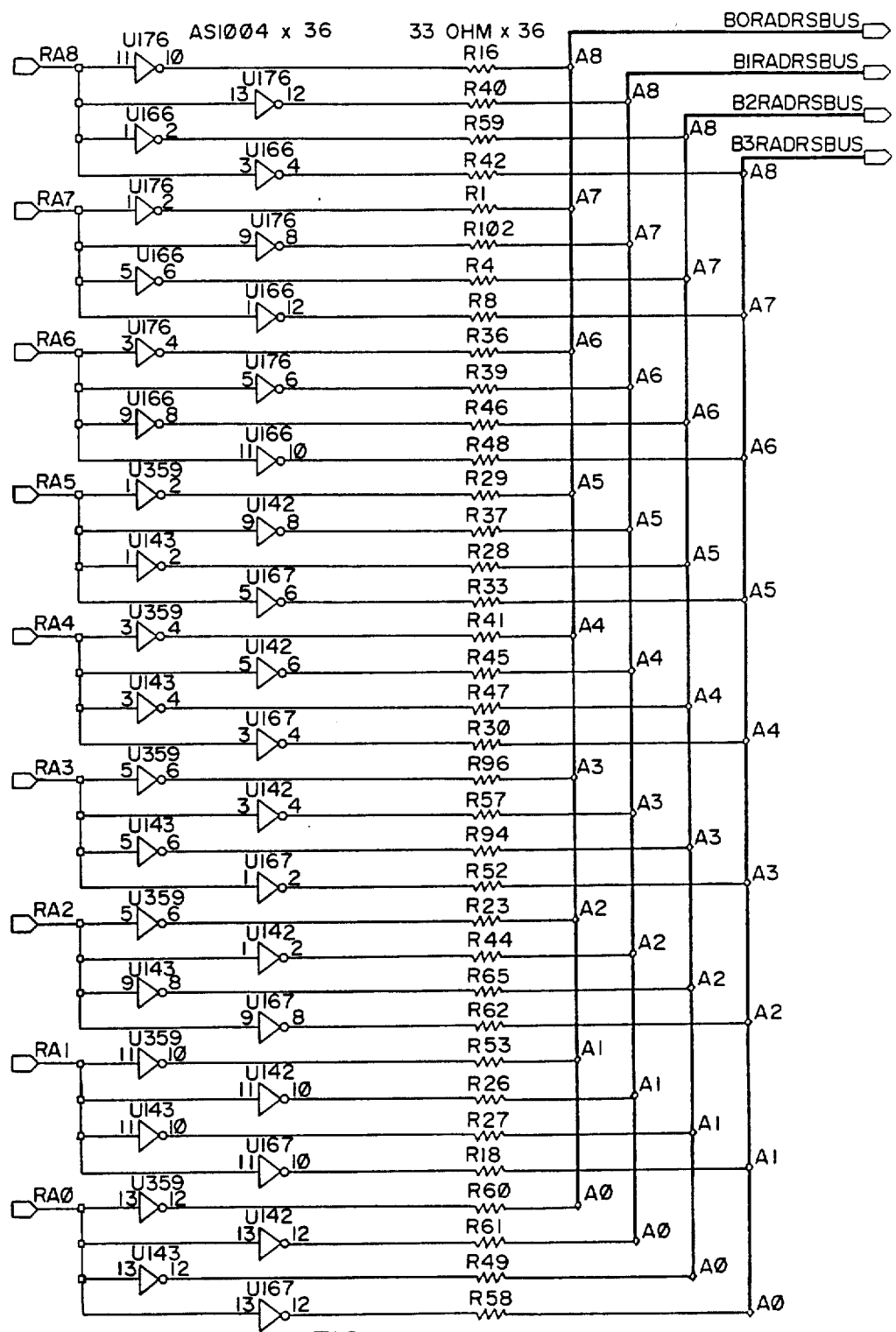
FIG. 14 is a detailed schematic diagram showing the circuit implementation of the SCRAM address driver circuit (not represented in FIGS. 6 and 17) associated with each bank.
Figure 15:
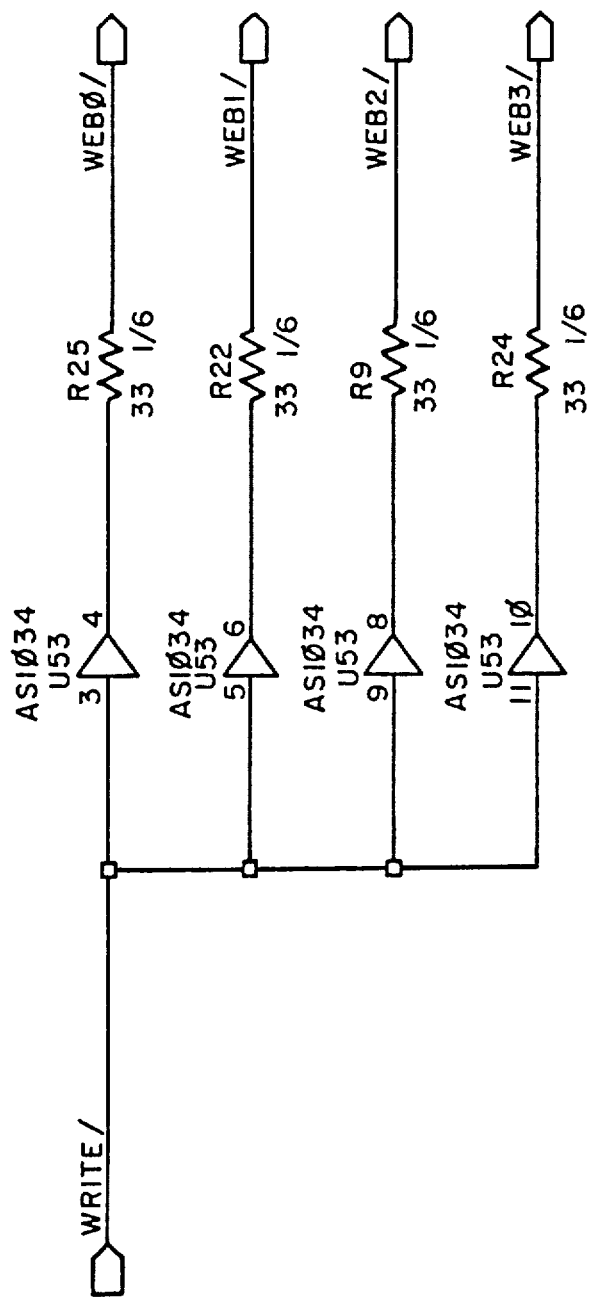
FIG. 15 is a detailed schematic diagram showing the circuit implementation of the write enable driver circuit (not explicitly represented in FIGS. 6 and 17) associated with each bank of the presently preferred embodiments.

Appropriate buffering circuits are necessary to properly drive all of the inputs to the number of SCRAM devices which are to be used in the presently preferred embodiments of the memory architecture of the present invention. FIG. 14 contains a detailed schematic diagram of the buffer circuit for the address inputs of the SCRAM devices. FIG. 15 provides a detailed schematic diagram of the buffer circuit used to drive the write enable signals to the SCRAM devices.

In FIG. 14, the device used as a buffer is an AS1004 hex inverting driver. The following devices designated in FIG. 14 are AS1004 hex inverting drivers: U176, U166, U359, U143, U142, U167. Also shown in FIG. 14 are Thirty-six 33 ohm resistors designated at R16, R40, R59, R42, R1, R102, R4, R8, R36, R39, R46, R48, R29, R37, R28, R33, R41, R45, R47, R30, R96, R57, R94, R52, R23, R44, R65, R62, R53, R26, R27, R18, R60, R61, R49, and R58.

In FIG. 15 the device designated U53 is used as a buffer to drive the write enable inputs to the SCRAMs. Device U53 is of the type generally designated in the art as AS1034, and is a hex driver. Also shown in FIG. 15 are four 33 ohm resistors (R25, R22, R9 and R24).

Provided below in Glossary G is a summar of the signals and/or buses which are shown in FIGS. 14 and 15.

| GLOSSARY G (FIGS. 14 and 15) | |
|---|---|
| Signal/Bus | Function |
| RA0-RA8 | SCRAM Address bits 0 through 8. Carries both row and column address information to all banks. |
| B0RADRSBUS | Bank 0 SCRAM Address Bus. Drives address inputs of bank 0. |
| B1RADRSBUS | Bank 1 SCRAM Address Bus. Drives address inputs of bank 1. |
| B2RADRSBUS | Bank 2 SCRAM Address Bus. Drives address inputs of bank 2. |
| B3RADRSBUS | Bank 3 SCRAM Address Bus. Drives address inputs of bank 3. |
| WRITE/ | Write (low asserted). Indicates a memory write operation. |
| WEB0/ | Write Enable Bank 0. Drives the write enable inputs of bank 0. |
| WEB1/ | Write Enable Bank 1. Drives the write enable inputs of bank 1. |
| WEB2/ | Write Enable Bank 2. Drives the write enable inputs of bank 2. |
| WEB3/ | Write Enable Bank 3. Drives the write enable inputs of bank 3. |

It should be appreciated that many different circuits can be devised by those skilled in the art to serve the function of the SCRAM buffer circuit and the SCRAM write enable buffer circuit. Alternatively, in some embodiments of the present invention it may not be necessary to incorporate these circuits or their equivalent.

9. Description of the Circuit Implementation of the SCRAM Banks of the Preferred Embodiment of FIG. 6–FIGS. 16A–16B.

Figures 1, 16A:
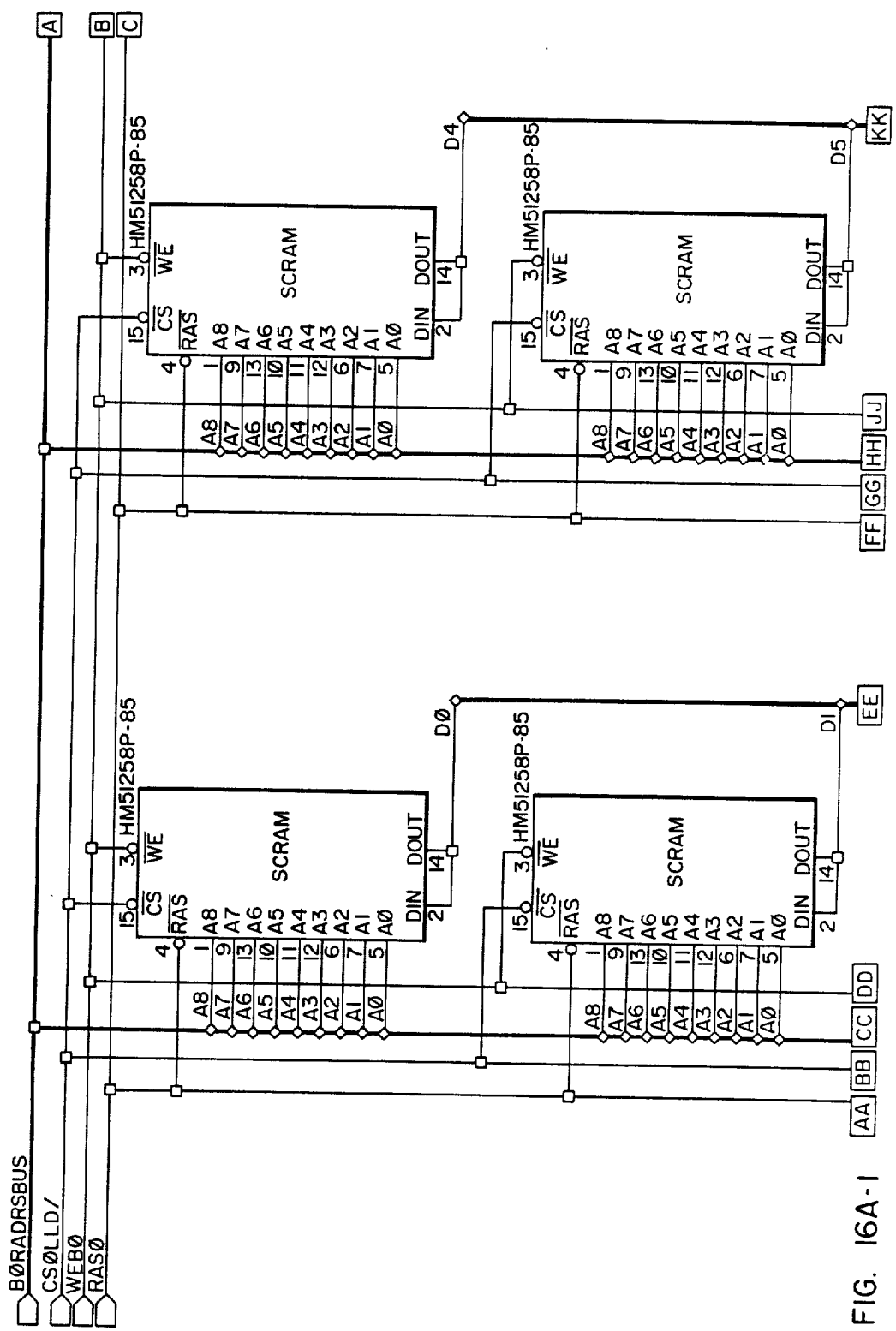
Figures 2, 16A:
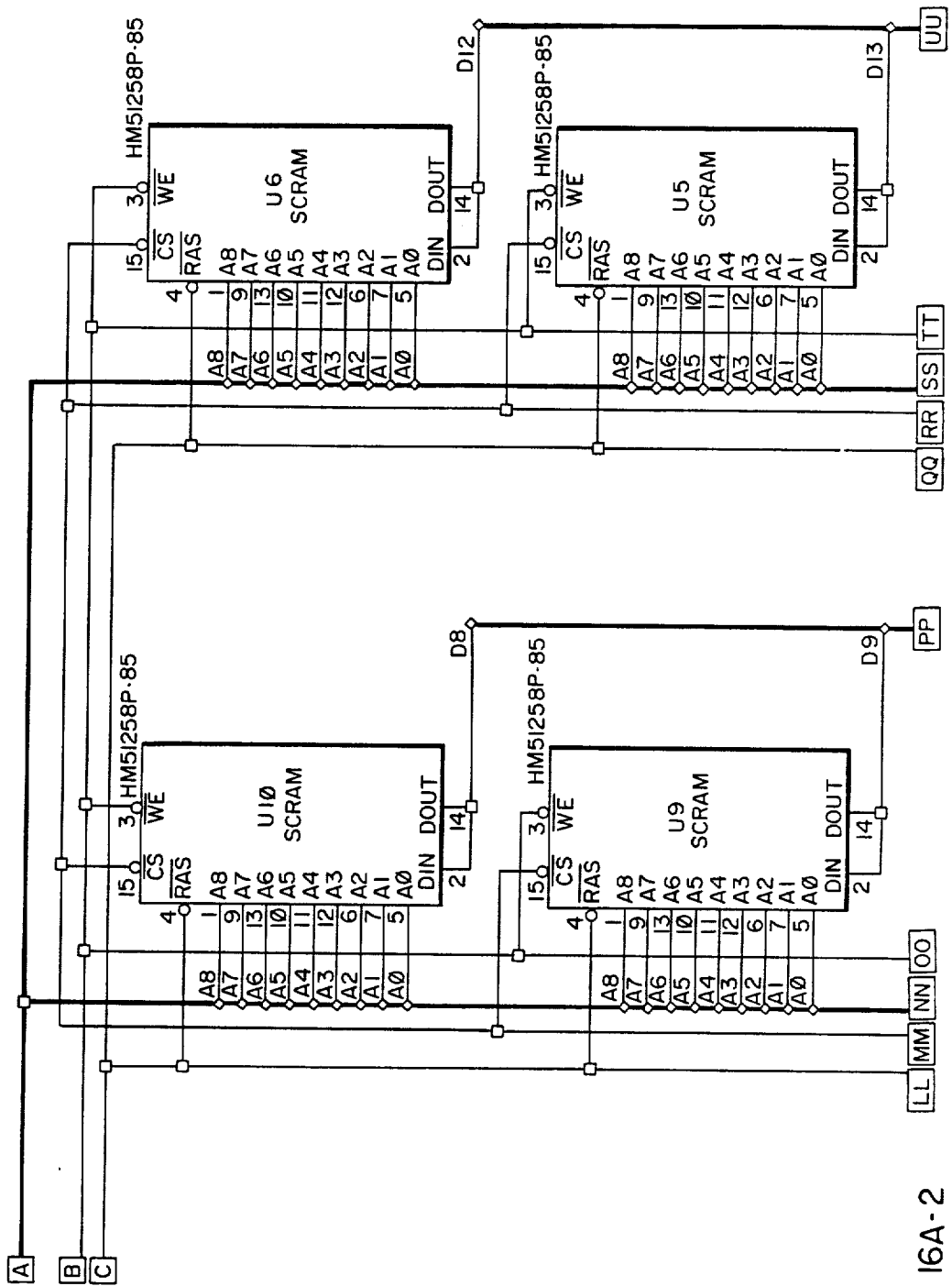
Figures 3, 16A:
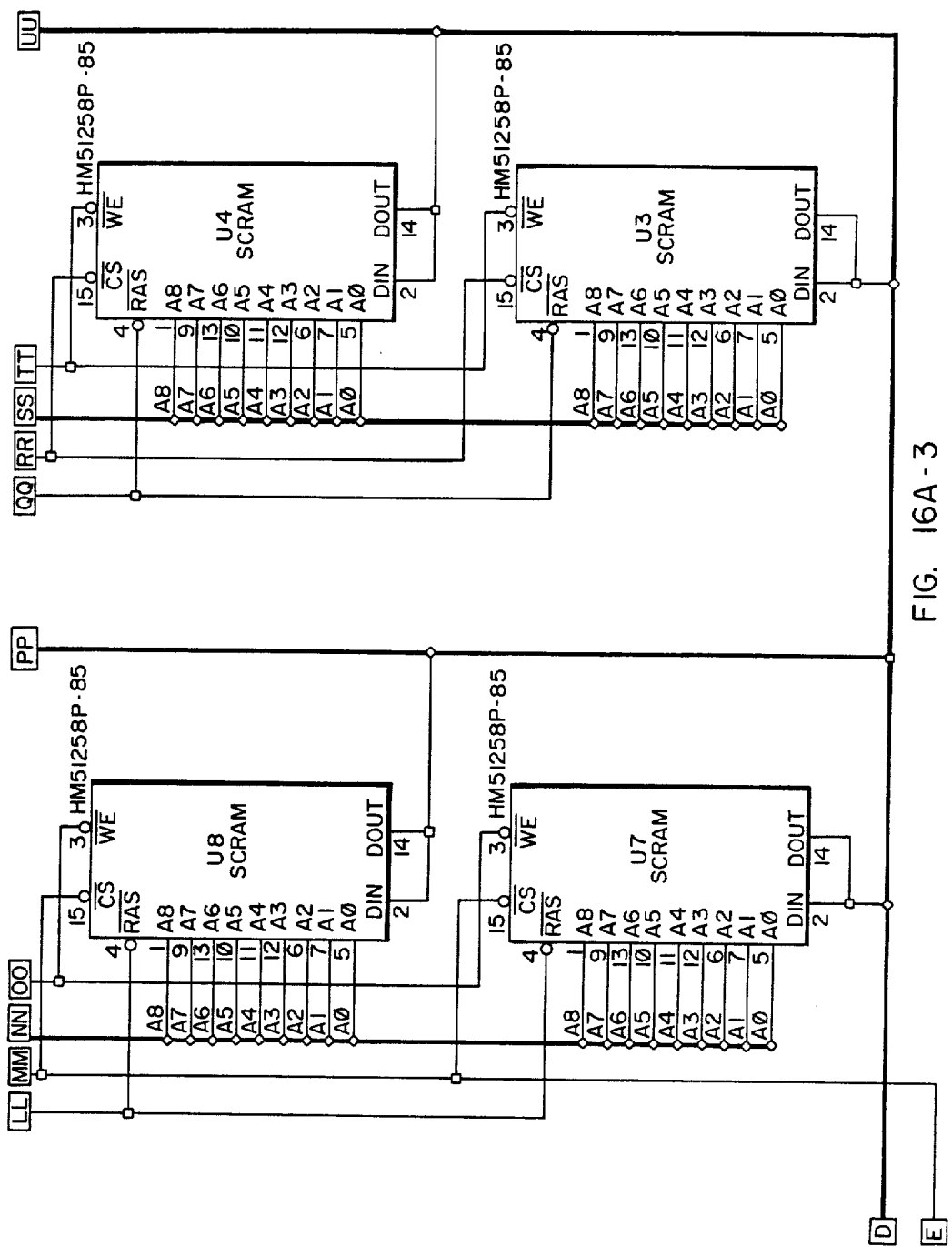
Figures 4, 16A:
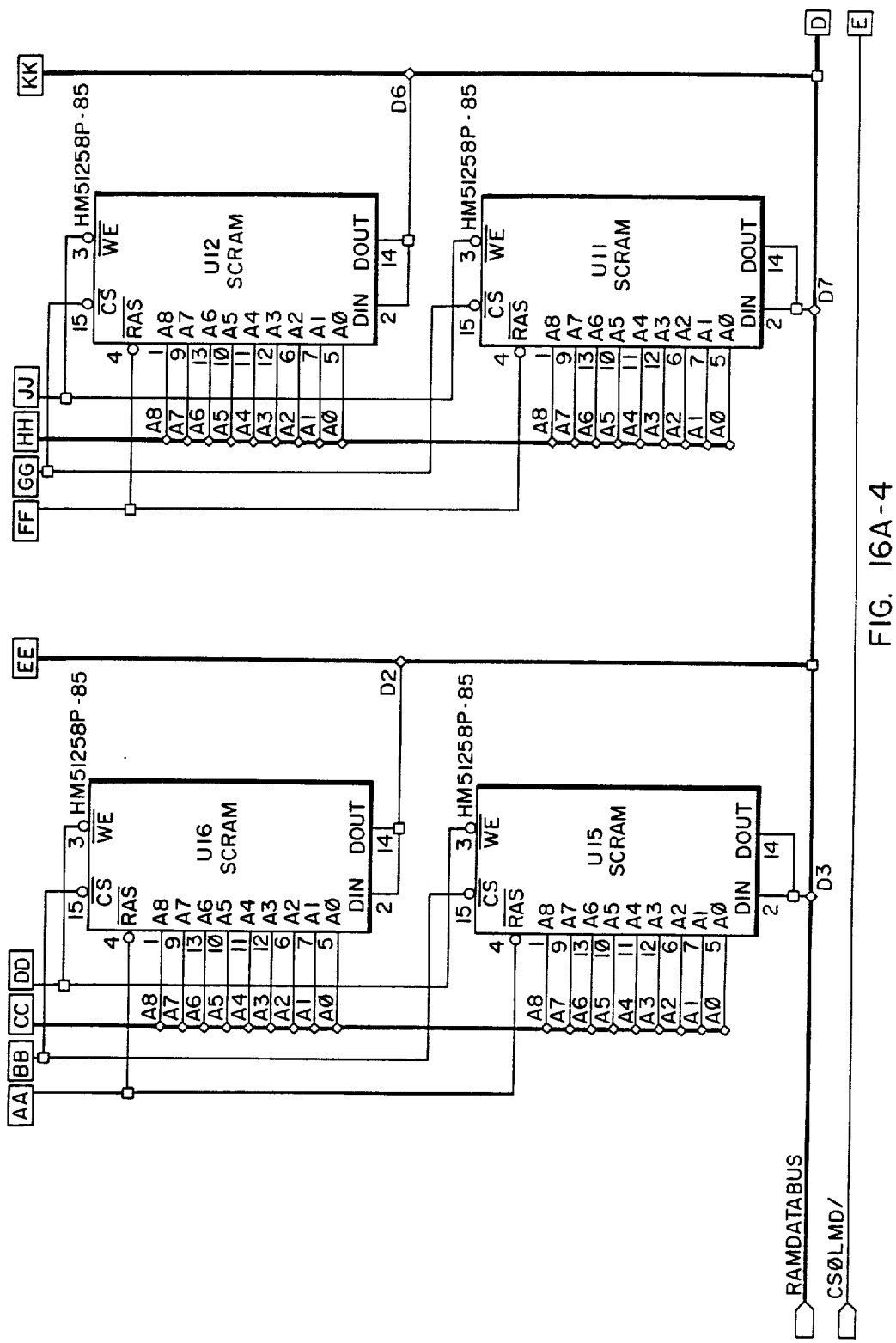
Figures 1, 16B:
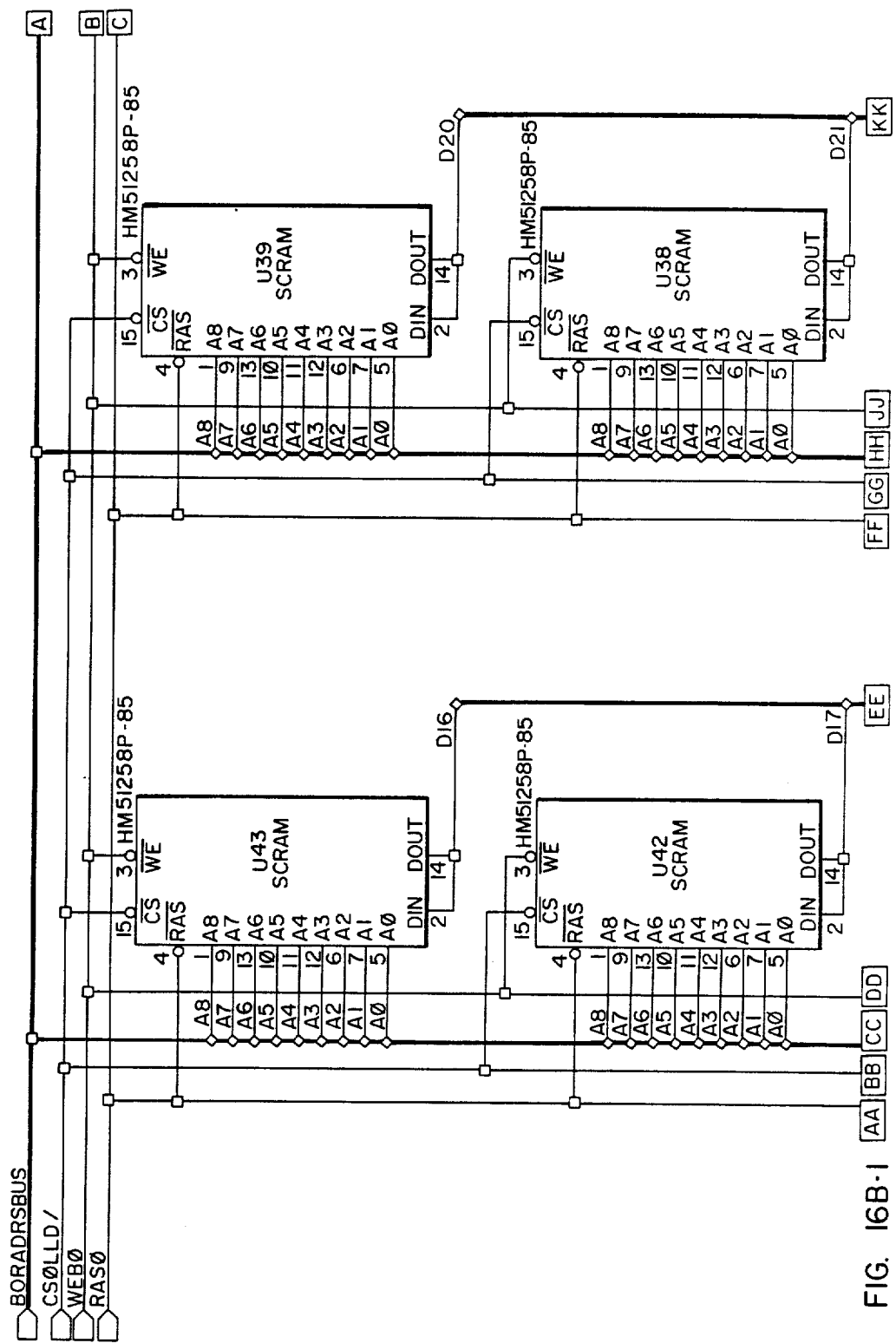
Figures 2, 16B:
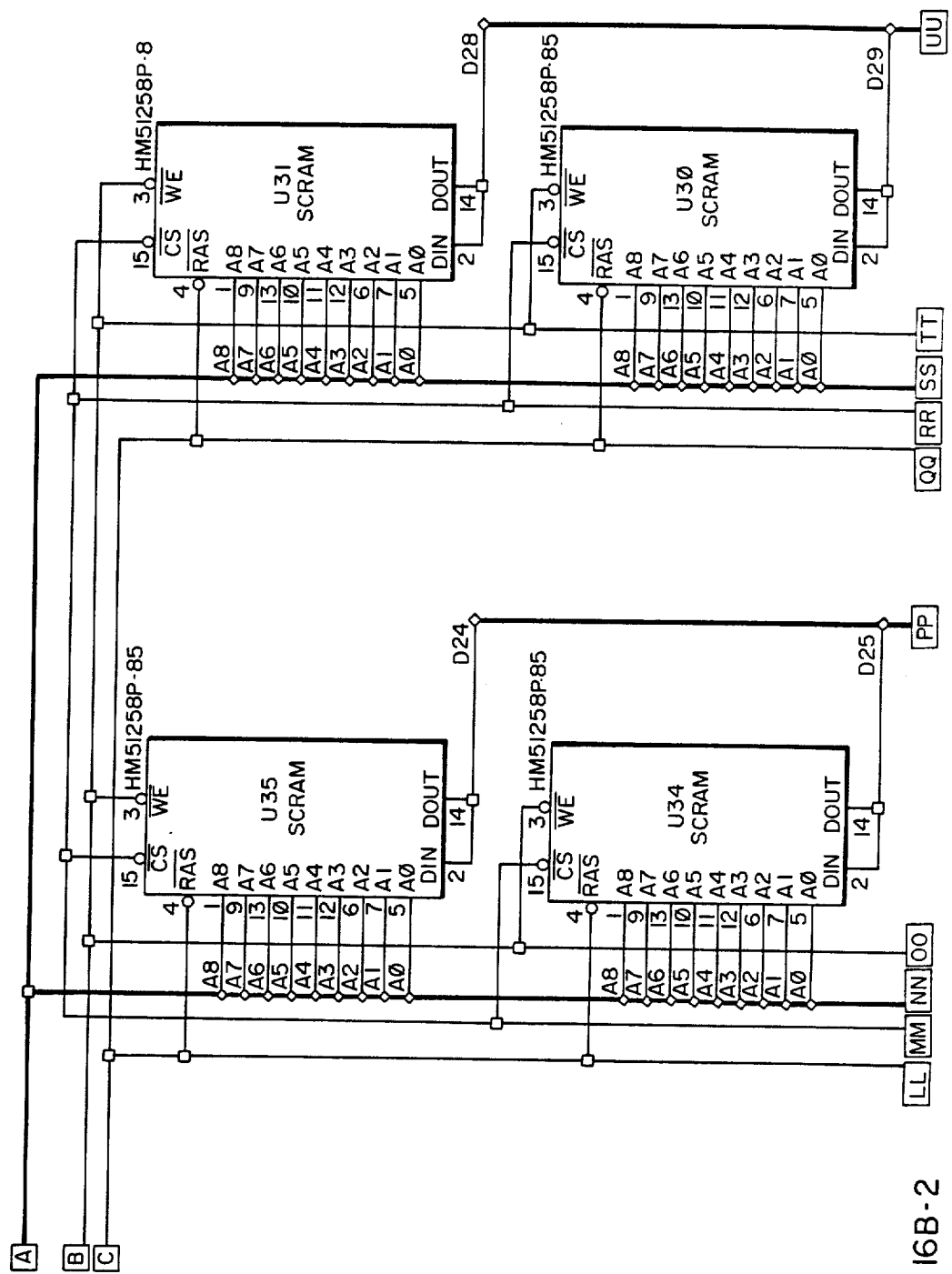
Figures 3, 16B:
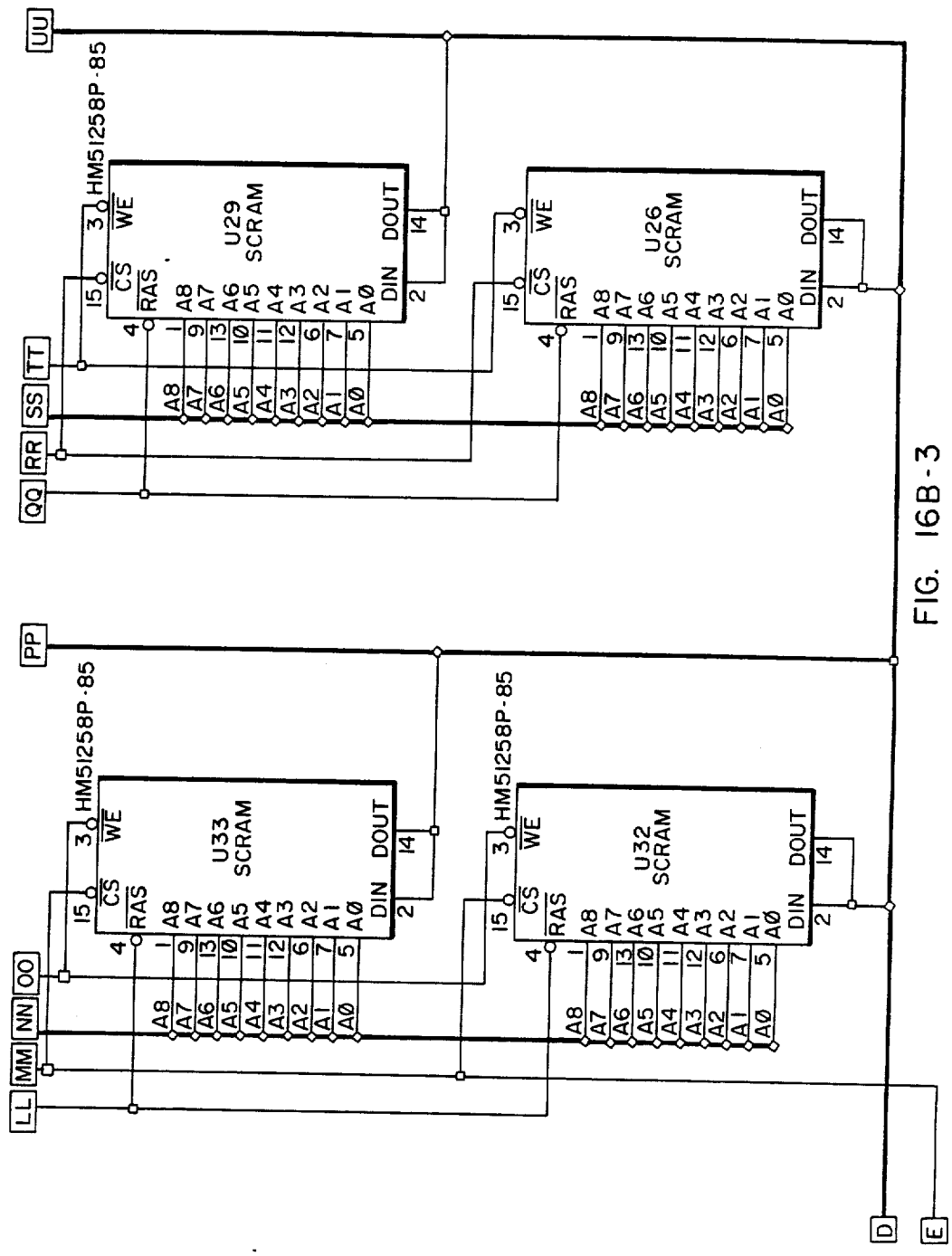
Figures 4, 16B:
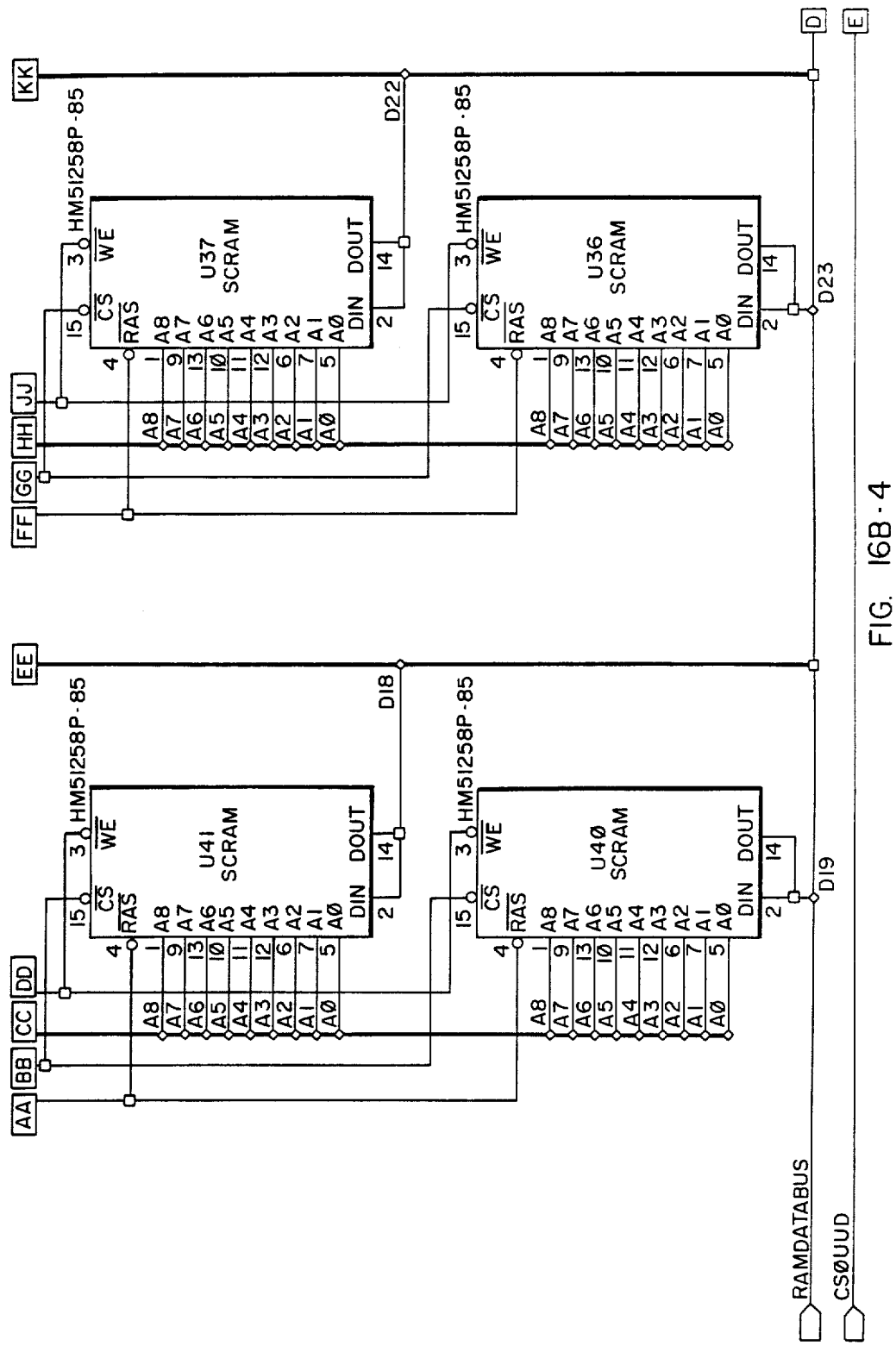

FIGS. 16A and 16B contain a detailed schematic drawing of one presently preferred embodiment of the SCRAM banks represented by blocks 202A through 202D in FIG. 6. Each of banks 202A-202D are identical in their structure. Thus, only the SCRAM devices comprising bank 202A in FIG. 6 are provided in FIGS. 16A and 16B, with the understanding that all other banks are of identical structure with appropriate alterations concerning the signals applied thereto. Furthermore, only the buses and control signals associated with bank 202A are shown. The embodiment illustrated by way of example in FIGS. 16A and 16B includes 32 SCRAM devices. These SCRAM devices are arranged in the manner described in connection with FIGS. 3 and 4 above.

As indicated earlier, in the presently preferred embodiment, the SCRAM devices may be, for example, HM51258P-85 devices manufactured by Hitachi and generally described as 262,144×1-bit static column dynamic random access memory.

In FIG. 16A the following devices provide data bits D0 through D15: U18, U17, U16, U15, U14, U13, U12, U11, U10, U9, U8, U7, U6, U5, U4, and U3, respectively. As shown in FIG. 16B, the following devices provide data bits D16 through D31: U43, U42, U41, U40, U39, U38, U37, U36, U35, U34, U33, U32, U31, U30, U29, and U28, respectively.

Provided below in Glossary H is a summary of the signals and/or buses which appear in FIG. 16A. Provided below in Glossary I is a summary of the signals and/or buses which appear in FIG. 16B.

| GLOSSARY H (FIG. 16A) | |
|---|---|
| Signal/Bus | Function |
| B0RADRSBUS | Bank 0 SCRAM Address Bus. Drives address inputs of bank 0. |
| CS0UMD/ | Chip Select Bank 0, Upper-Middle Data (low asserted). Performs column selection of bits 16-23 of bank 0. |
| WEB0/ | Write Enable Bank 0. Drives the write enable inputs of bank 0. |
| RAS0 | Row Address Strobe Bank 0. Selects a row address in bank 0. |
| RAMDATABUS | SCRAM Data Bus. Carries data from the banks to either local or global bus. Size is 32 bits. |
| CS0UUD/ | Chip Select Bank 0, Upper-Upper Data (low asserted). Performs column selection of bits 24-31 of bank 0. |

| GLOSSARY I (FIG. 16B) | |
|---|---|
| Signal/Bus | Function |
| B0RADRSBUS | Bank 0 RAM Address Bus. Drives address inputs of bank 0. |
| CS0LLD/ | Chip Select Bank 0, Lower-Lower Data (low asserted). Performs column selection of bits 0-7 of bank 0. |
| WEB0/ | Write Enable Bank 0. Drives the write enable inputs of bank 0. |
| RAS0 | Row Address Strobe Bank 0. Selects a row address in bank 0. |
| RAMDATABUS | SCRAM Data Bus. Carries data from the memory banks to either local or global bus. Size is 32 bits. |
| CS0LMD/ | Chip Select Bank 0, Lower-Middle Data (low asserted). Performs column selection of bits 8-15 of bank 0. |

The maximum time which RAS/ may be continuously asserted using the HM51258P-85 SCRAM devices is approximately 75 microseconds. Furthermore, when using the HM51258P-85 SCRAM devices it is necessary to refresh every row in the devices every four milliseconds. The expiration of the RAS/ time out period invalidates the bank holding the row which has been activated into static column mode. The expiration of the refresh period invalidates all banks on all boards.

Furthermore, because tag registers 208A-208D (FIG. 6) contain the remainder field from the logical address 150, when the information contained within the memory management used to translate the logical addresses represented in tag registers 208A-208D is altered, all banks on all boards must be invalidated.

10. Detailed Description of Another Presently Preferred 32-bit Embodiment of the Present Invention—FIGS. 17-22.

A second presently preferred embodiment of the present invention is illustrated in FIGS. 17-22. The second embodiment is of essentially the same architecture, and operates using the same method, as the embodiment of FIGS. 6-16 except that some changes have been made in order to allow a different SCRAM device to be used.

The architecture illustrated in FIGS. 17-22 is intended to incorporate the SCRAM devices designated in the art as HM511002-100 and generally referred to as a 1,048,576 × 1 bit static column dynamic random access memory manufactured by Hitachi Semiconductor and Integrated Circuits Division. By incorporating these "1 megabit" SCRAMs into the second emboiment, a bank of 32 SCRAM devices is able to hold two 2 KByte pages in static column mode and also provide a total memory capacity of 4,194,304 bytes (4 MBytes) for each bank.

The 1 megabit SCRAM devices are structured similarly and operated identically as the 256 kilobit SCRAM devices described earlier. With the increased size of the memory array (see FIG. 1) ten address lines (0 through 9), rather than nine, are necessary. Thus, the 1 megabit SCRAMs can be conceptualized as having 1024 rows ($2^{10}=1024$) rather than 512 ($2^9=512$) rows.

Thus, when 32 of the 1 megabit SCRAM devices are arranged in a fashion similar to that shown in FIG. 4, one of 1024 rows may be activated into static column mode, the equivalent of 2 frames. Also, the number of columns in each SCRAM device is 1024 so each row in the 32 SCRAM devices contains 32,768 bits or 4096 bytes, i.e., 4 KBytes. In other words, two 2 KByte pages may be held in static column mode in each bank of SCRAM.

The second embodiment takes advantage of this increased memory capacity by utilizing the same architecture as the first embodiment with some additions and modifications. In the following description only the additional or different structures in the architecture will be described. The similarities between the architecture of the first and the second embodiments are readily apparent and no further explanation will be provided for these similarities.

FIG. 17 is a block diagram showing the functional blocks of the second embodiment. A comparison of FIG. 17 and FIG. 6 shows the similarity between the two embodiments.

In addition to having a tag register and a comparator corresponding to each bank, the 1 megabit embodiment also has four frame latches 242A-242D, and four frame multiplexors 240A-240D. Frame latches 242D-242D are all connected to bit A13 of address bus 224 by way of line 244. Frame multiplexors 240A-240D are connected to the output of a corresponding frame latch and also are connected to bit A23 of address bus 224 by line 246.

FIG. 18 shows the bit arrangement of both the logical and translated physical address used with the second embodiment. In FIG. 18, logical address 150 is identical to logical address 150 in FIG. 5. Translated physical address 170 in FIG. 18, however, has been altered to provide a frame select field (bit 13) generally designated 172, and row address field 164 has been expanded to include bits 14 through 23 (ten bits). Correspondingly, board address field 24-27 has been reduced to four bits.

Since each bank in the 1 megabit embodiment now has a total memory capacity of 4 MBytes and four banks are provided on each board, the number of boards required to provide the maximum possible addressable memory using 28 bits (256 MBytes) may be obtained by using only 4 bits to select one of 16 boards rather than 6 bits required to select one of 64 boards as in the first embodiment.

The second embodiment illustrated in FIG. 17, using the translated physical address arrangement illustrated in FIG. 18, operates in the same manner as the first embodiment illustrated in FIGS. 6 and 7 with the below described differences. Since each 1 megabit SCRAM device includes a 1024 × 1024 memory array, 10 address lines (0 through 9) must be provided for both the column and row device addresses. Since the architecture of the first embodiment was arranged to provide 9 bits of SCRAM addressing, the addition of frame latches 242A through 242D and frame multiplexors 240A through 240D allows the tenth SCRAM address bit to be gated to the banks.

As represented in FIGS. 17 and 18, bit A13 indicates which "half" of a row, i.e., which frame, the desired address is found in. Frame select field 172 (FIG. 18) is used as the most significant bit of the SCRAM column device address. Bit 23 in row address field 164 is used as the most significant bit of the SCRAM row device address.

Frame multiplexors 240A through 240D gate the frame select bit to the appropriate bank 202A-202D when the column address is present on the SCRAM address bus. Frame latches 242A-242D latch the frame select field bit such that if a hit occurs in a bank, the appropriate "tenth SCRAM address bit" is already asserted and the memory access may be made.

If a miss occurs during a memory access then the appropriate frame mutiplexor 240A-240D gates bit 23 of the translated physical address to its associated bank while row address field is present on the SCRAM address bus. In this fashion, the row designated by the nine address bits present on the SCRAM address bus and the single most significant bit of the row address field are presented to the appropriate bank and that row is activated into static column mode. Once a row is activated into static column mode, column accesses may occur as explained earlier.

Figures 1, 19A:
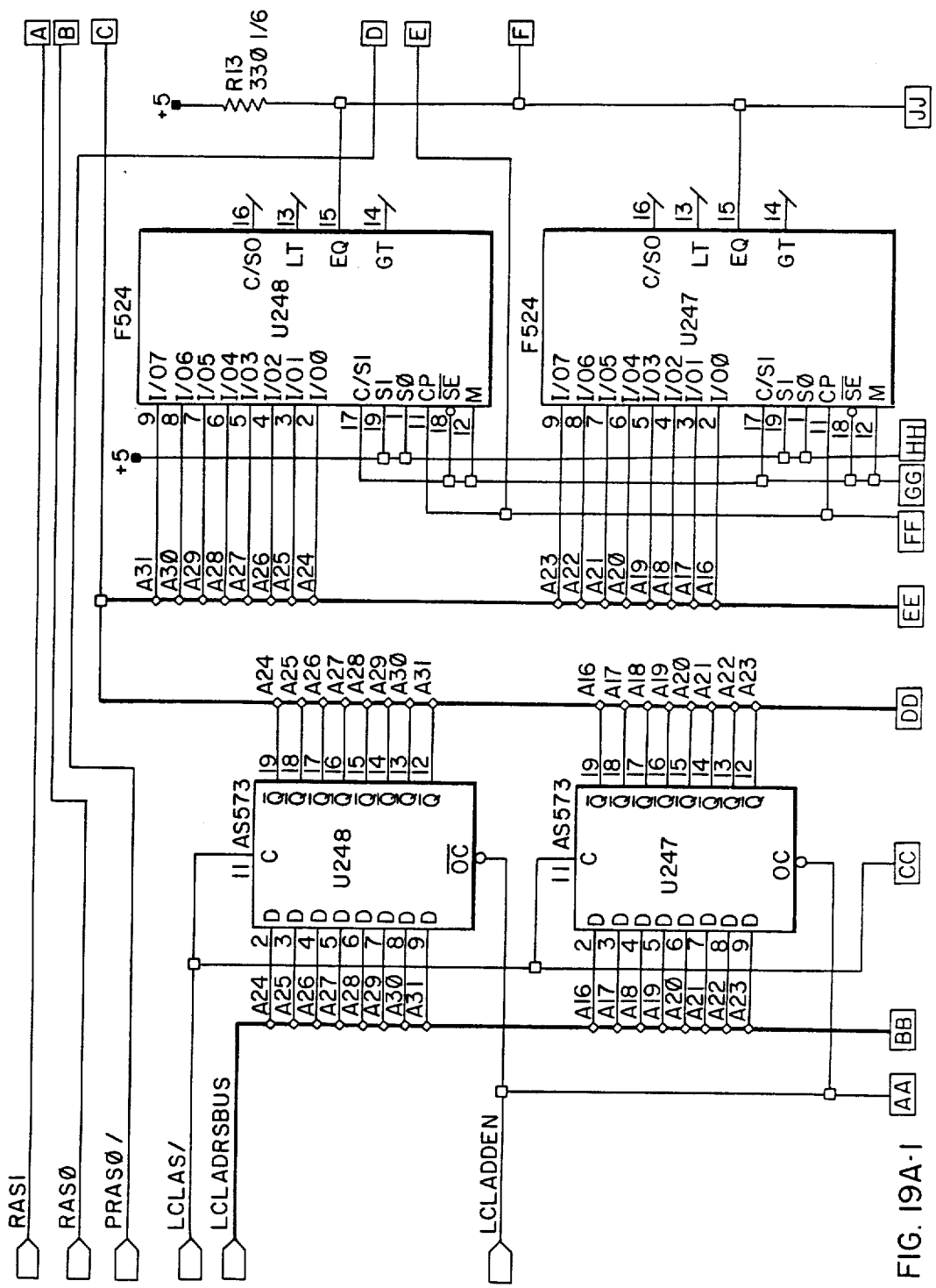
Figures 2, 19A:
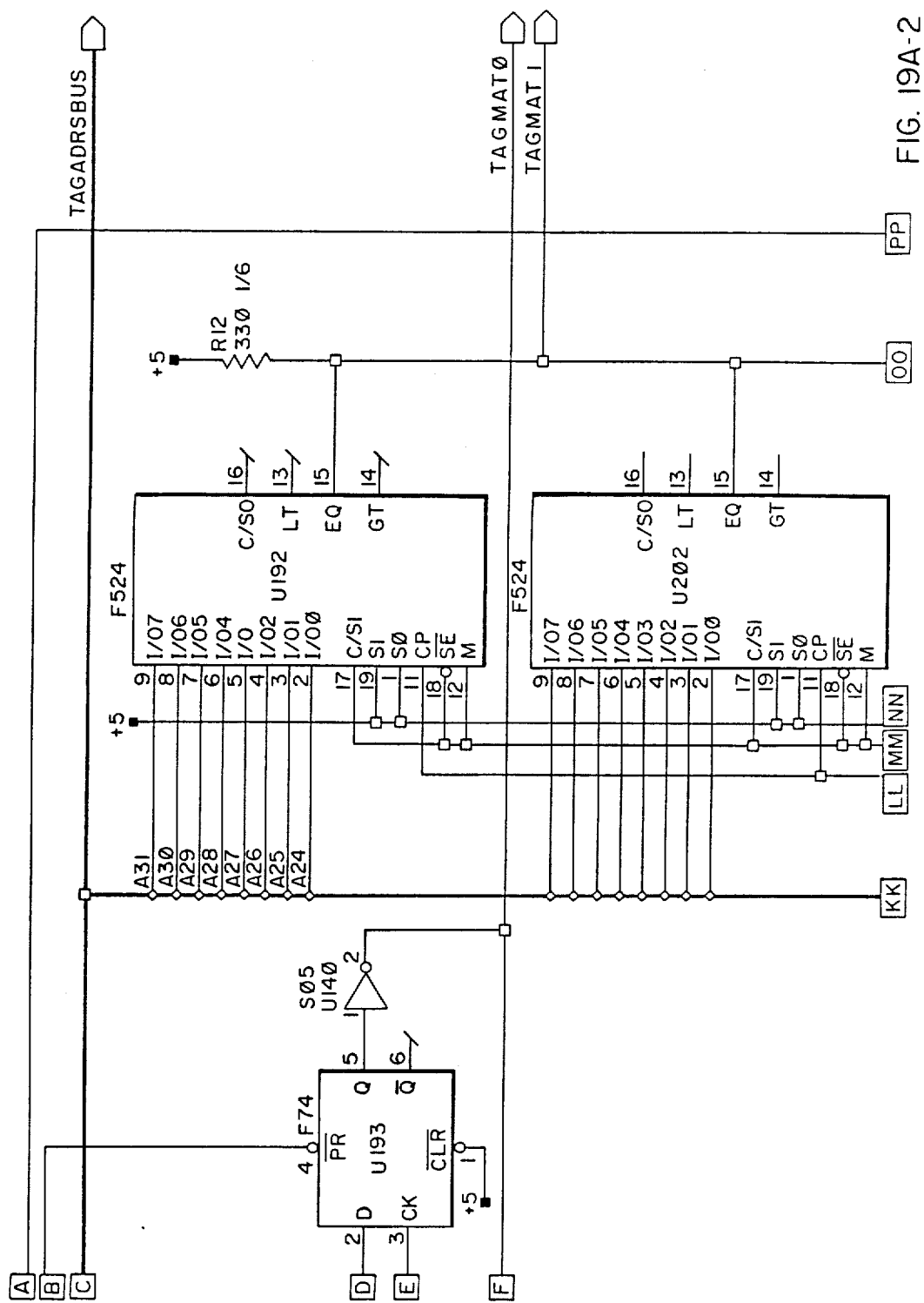
Figures 3, 19A:
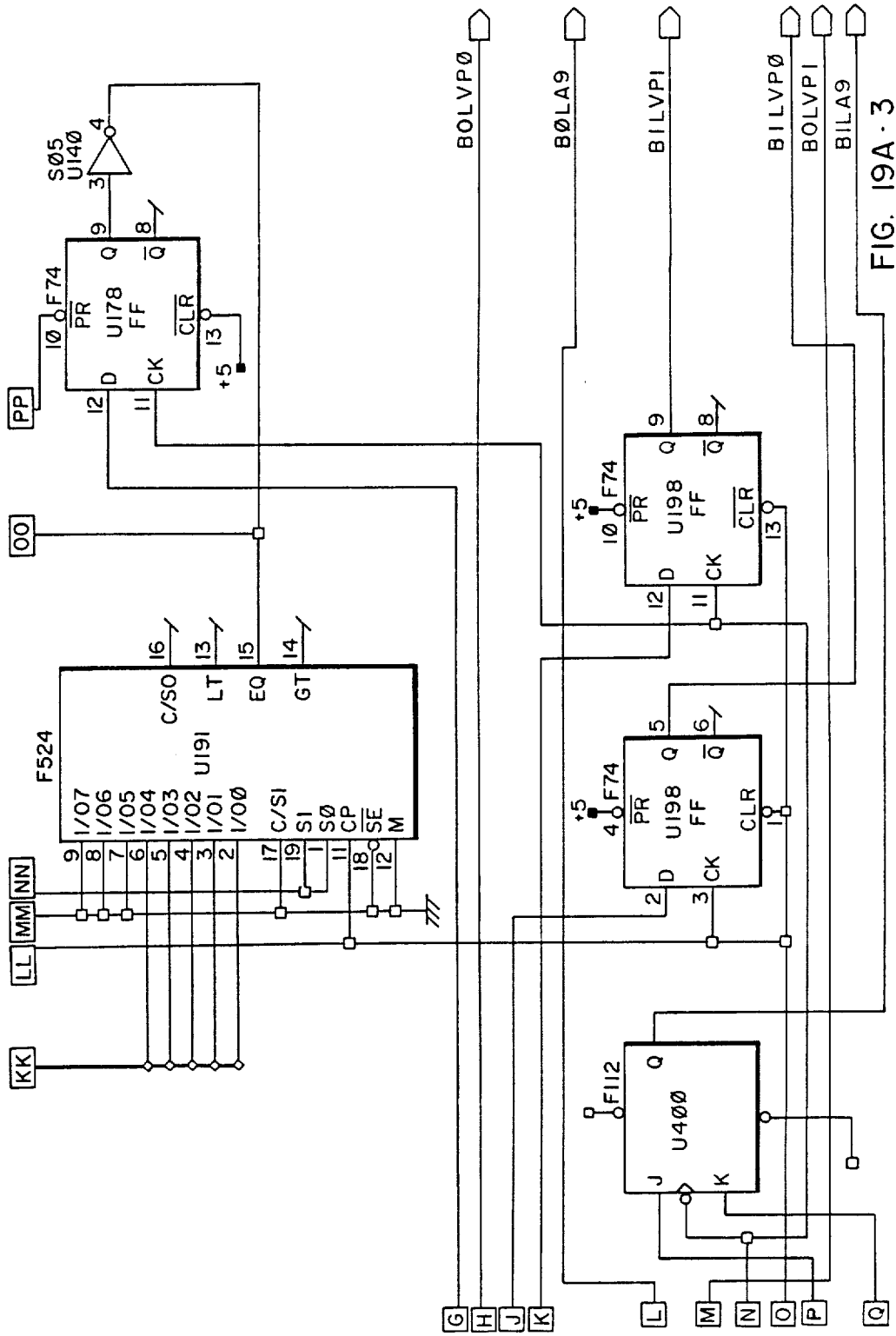
Figures 1, 19B:
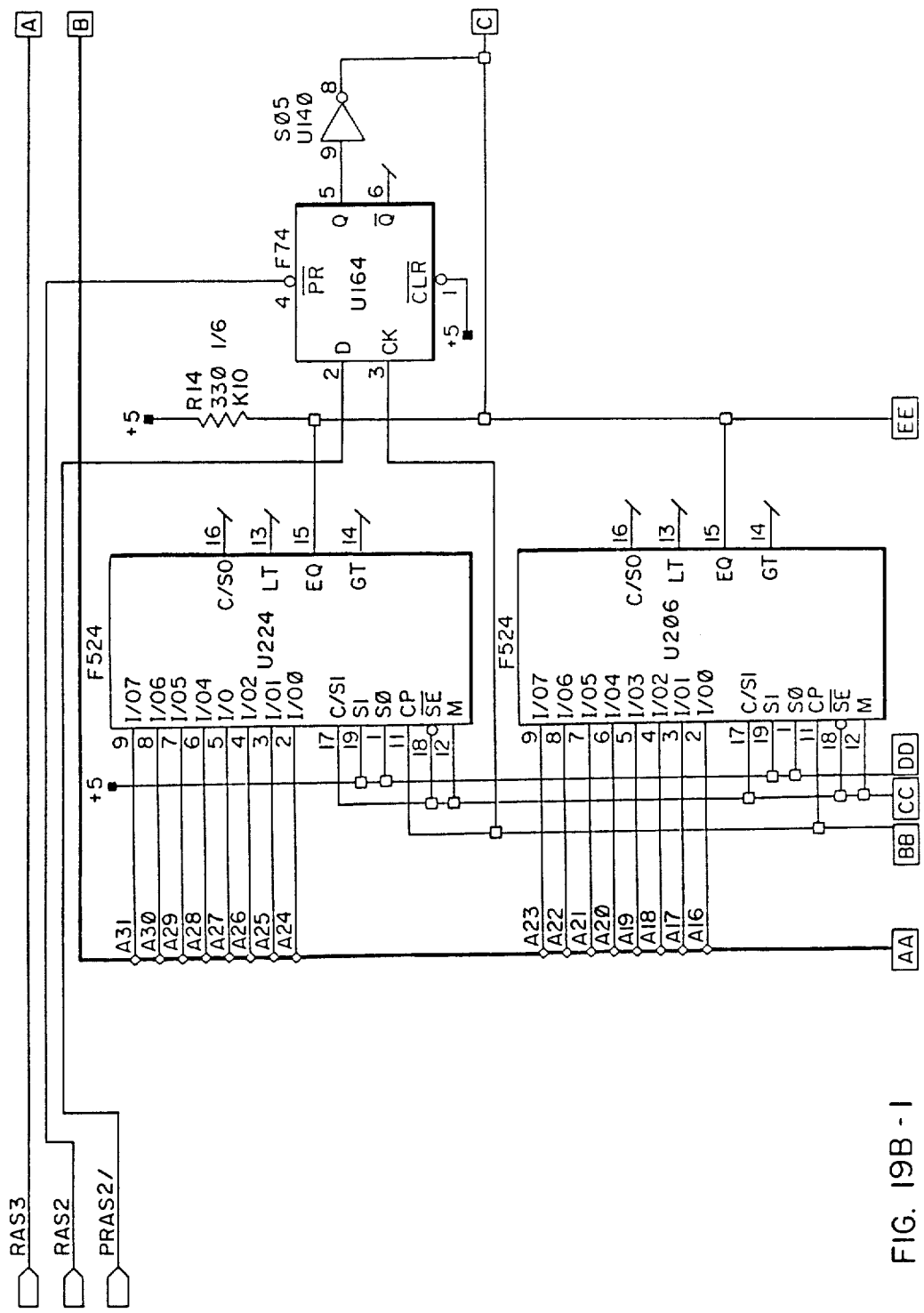
Figures 2, 19B:
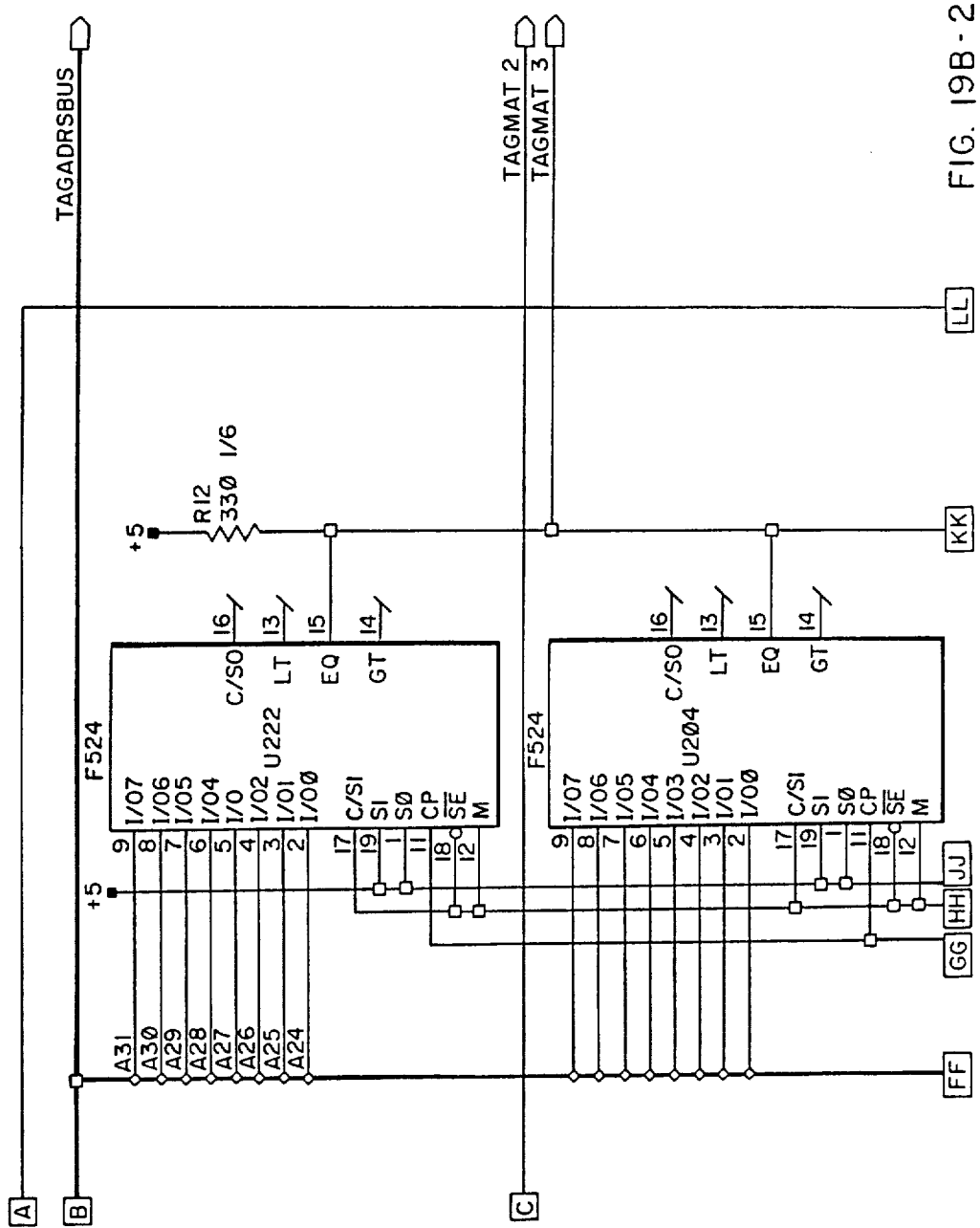
Figures 3, 19B:
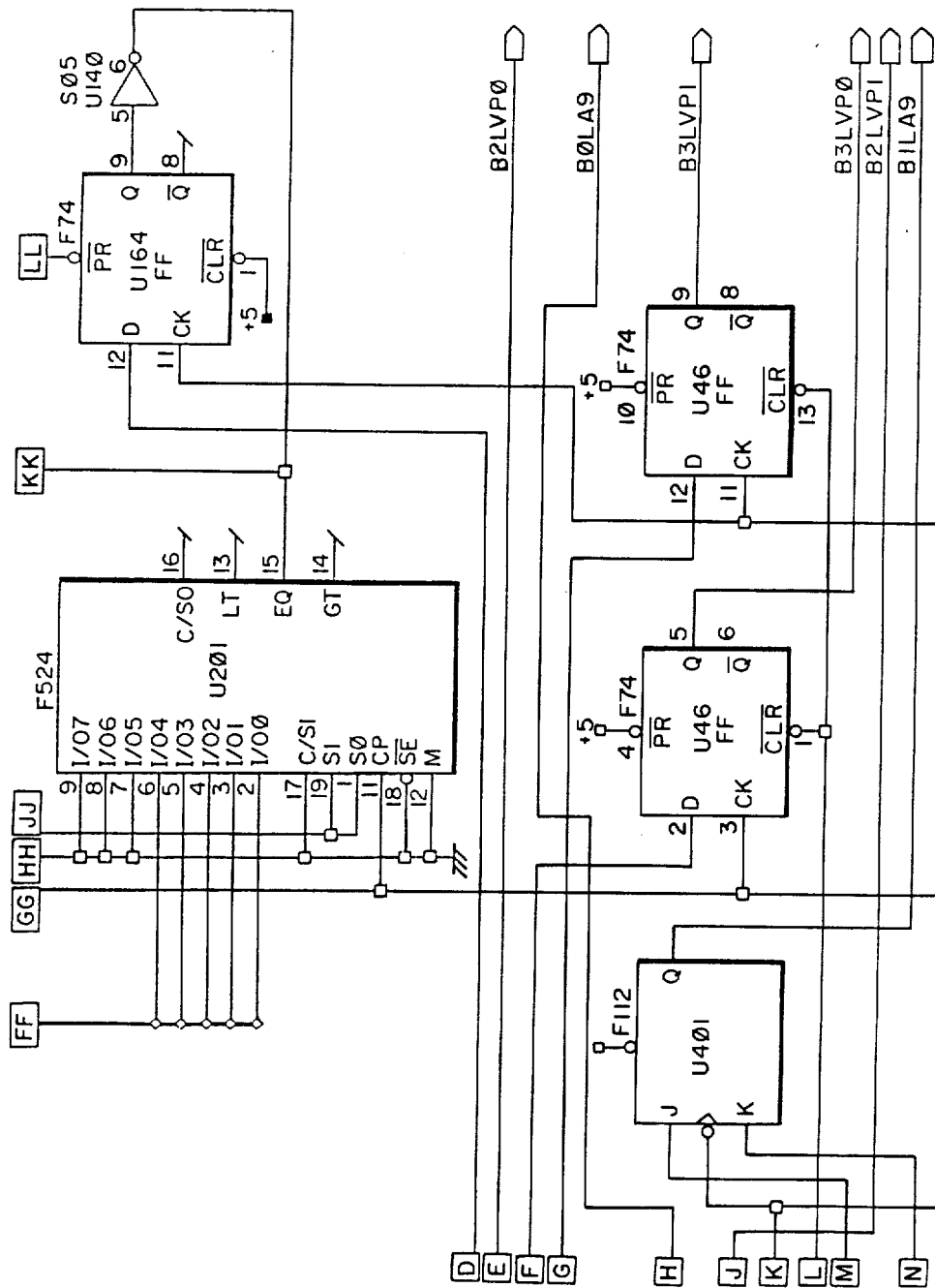
Figures 4, 19B:
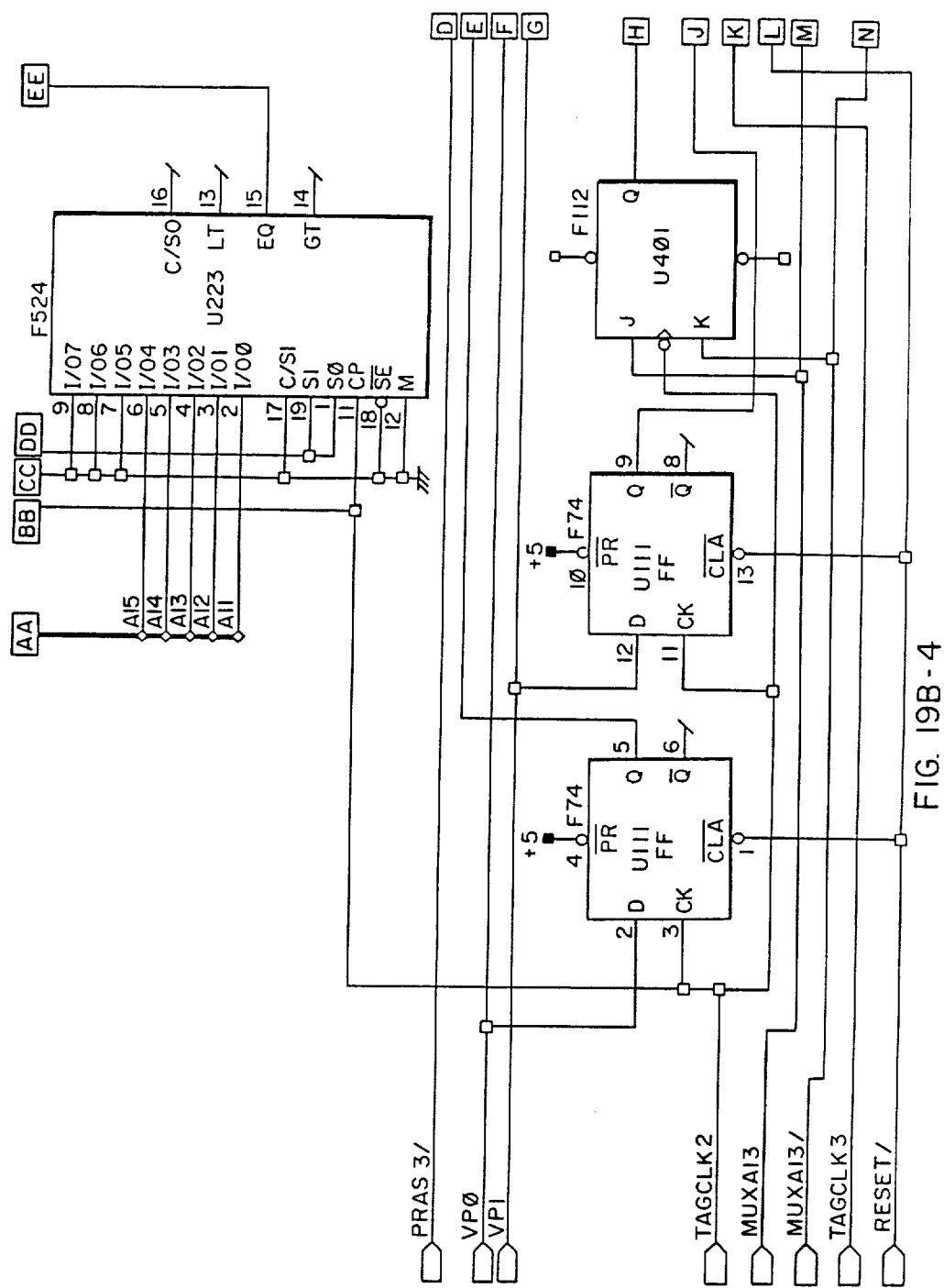

FIGS. 19A and 19B are detailed schematic diagrams of logical address latch, tag registers, comparators, and frame latches represented in FIG. 7. In FIG. 19A U400 functions as frame latches 242A and 242B. In FIG. 19B U401 functions as frame latches 242C and 242D. Both U400 and U401 are F112 devices and are generally described as dual J-K flip flops.

Provided below in Glossary J is a summary of the additional buses and/or signals represented in FIGS. 19A and 19B but which are not described previously in connection with FIGS. 9A and 9B.

| GLOSSARY J (FIGS. 19A and 19B) | |
|---|---|
| Signal/Bus | Function |
| MUXA13 | Multiplexed Address bit 13. Selected from LCLADRSBUS or GLBLADRSBUS bit 13 depending on the T10ARB signal from the dual-port arbitration circuit. |
| MUXA13/ | Multiplexed Address bit 13 (low asserted). Same function as MUXA13. |

-continued
GLOSSARY J
(FIGS. 19A and 19B)

| Signal/Bus | Function |
|---|---|
| B0LA9 | Bank 0 Latched Address bit 9. Stores a bit which is used as the most significant column address bit during column selection. |
| B1LA9 | Bank 1 Latched Address bit 9. Stores a bit which is used as the most significant column address bit during column selection. |
| B2LA9 | Bank 2 Latched Address bit 9. Stores a bit which is used as the most significant column address bit during column selection. |
| B3LA9 | Bank 3 Latched Address bit 9. Stores a bit which is used as the most significant column address bit during column selection. |

Figures 1, 20:
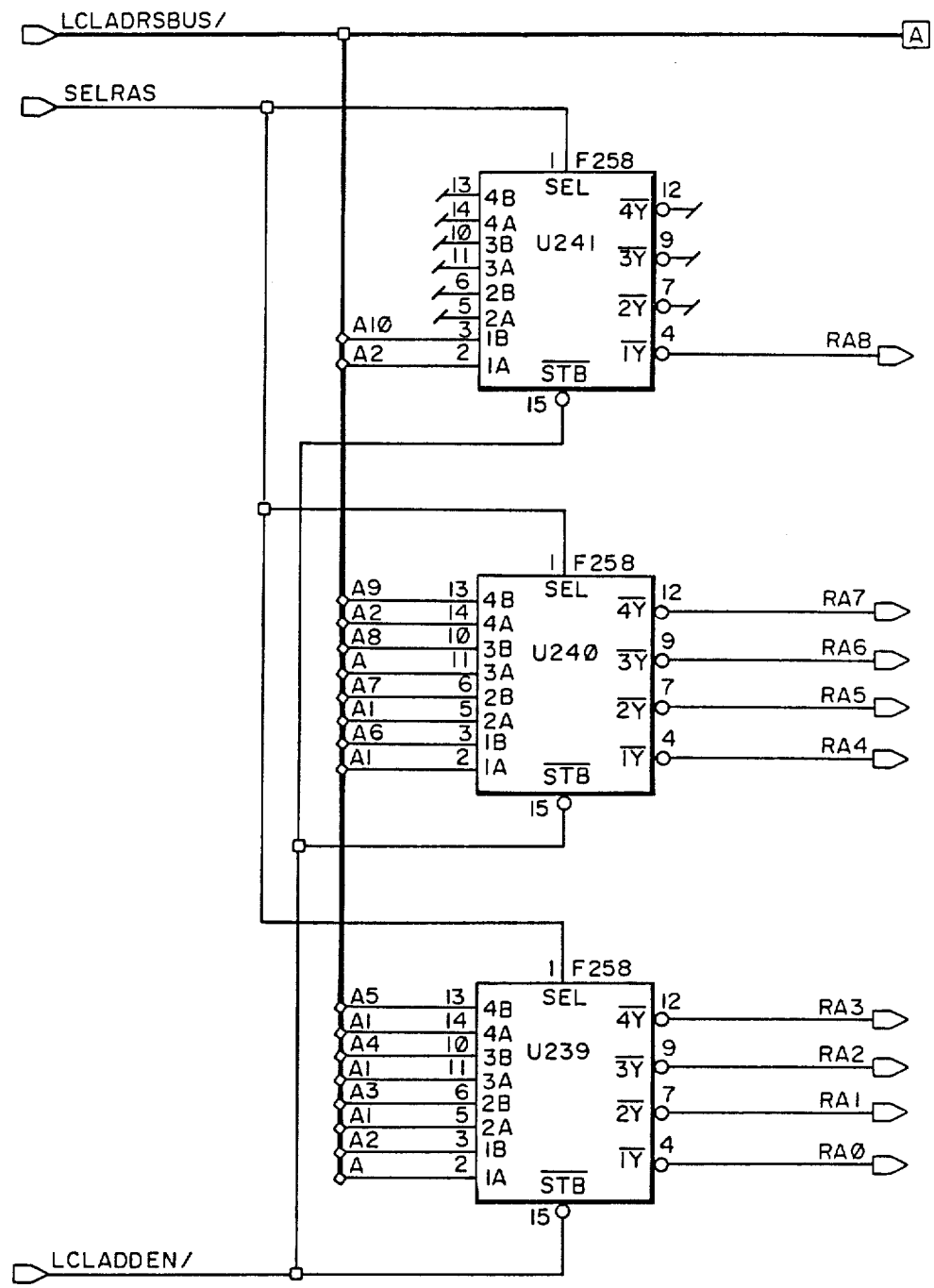
Figures 2, 20:
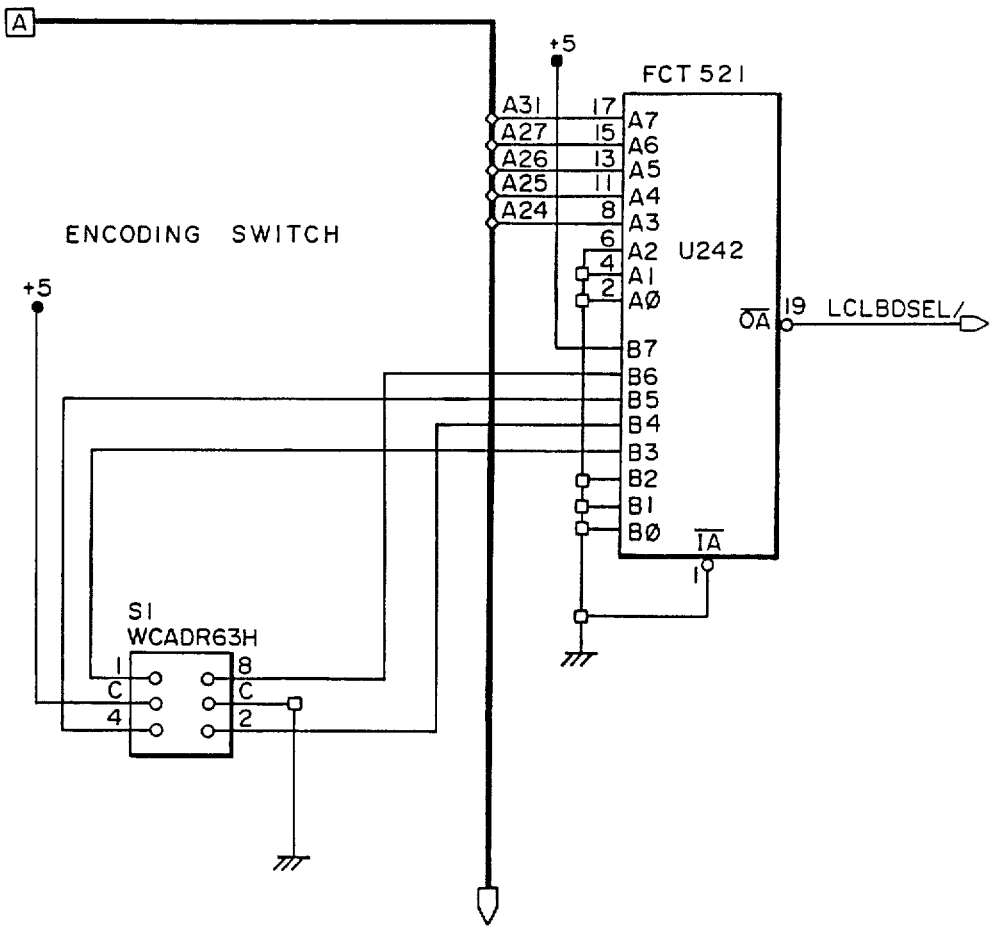

FIG. 20 is a detailed schematic diagram of the SCRAM address selector and the board decode circuit of the second embodiment. It will be noted U241, U240, and U239 are arranged identically as in FIG. 13 in connection with the first described embodiment. This is because only the first nine address bits are placed on the SCRAM address bus, as is the case with the first embodiment, with the tenth address bit being provided by way of the fame latches and frame multiplexors.

U242 and switch S1 may be identical to those devices discussed in connection with FIG. 13. U242 and switch S1 function as a board select circuit. In the second preferred embodiment switch S3 (shown in FIG. 13) may be omitted since only half the number of boards are necessary (and can be accommodated).

Figure 21:
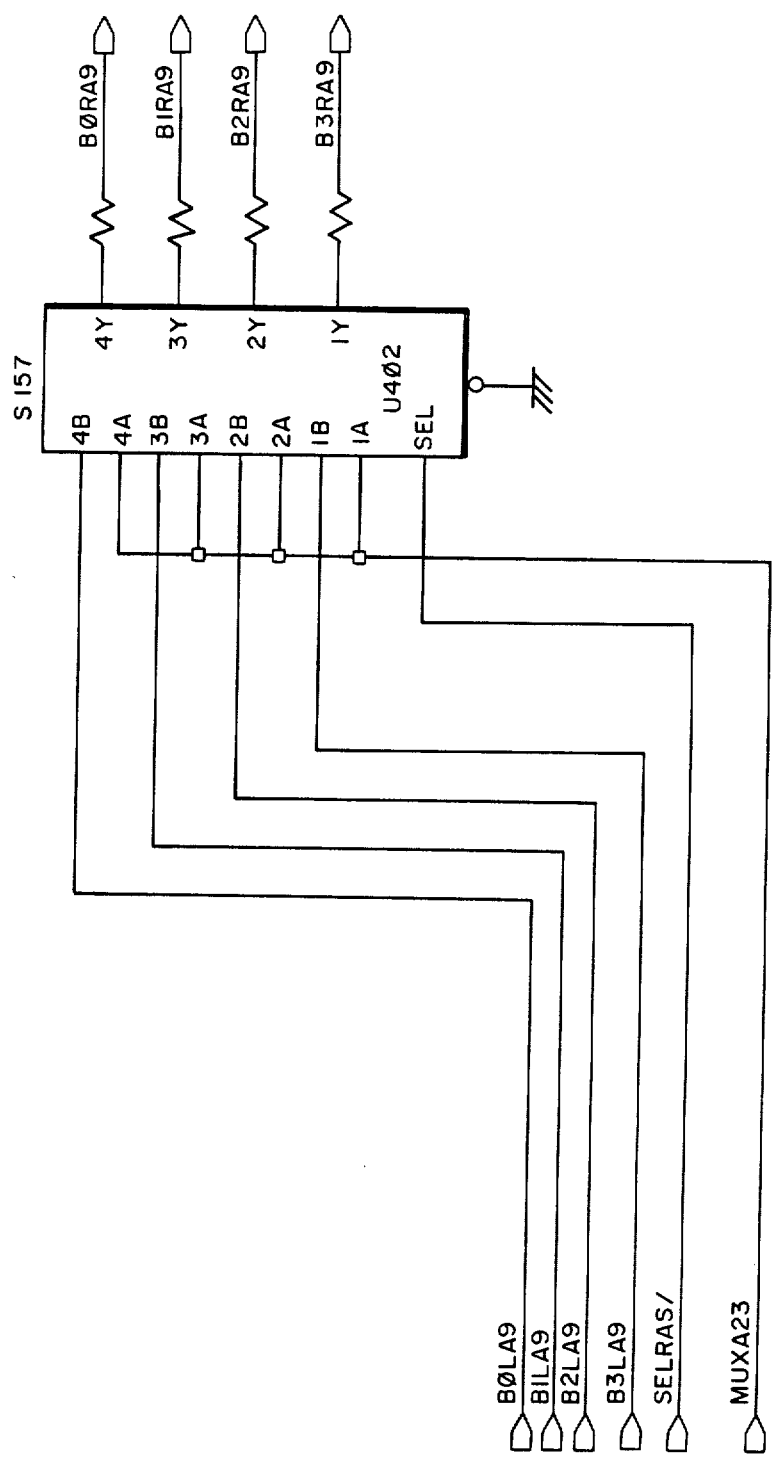
FIG. 21 is a detailed schematic diagram showing the circuit implementation of the frame multiplexors represented in FIG. 17.

FIG. 21 is a detailed schematic diagram showing the circuit implementation of frame multiplexors 240A-240D represented in FIG. 17. Device U402 is of the type designated in the art as S157 and generally referred to as a quadruple 4 to 1 multiplexor. U402 selectively applies either the bits latched into the frame latches (242A-242D in FIG. 17) or, if the select row address stobe signal (SELRAS/) is asserted, translated physical address bit 23 is used as the "tenth" address bit in the second preferred embodiment.

Figures 1, 22A:
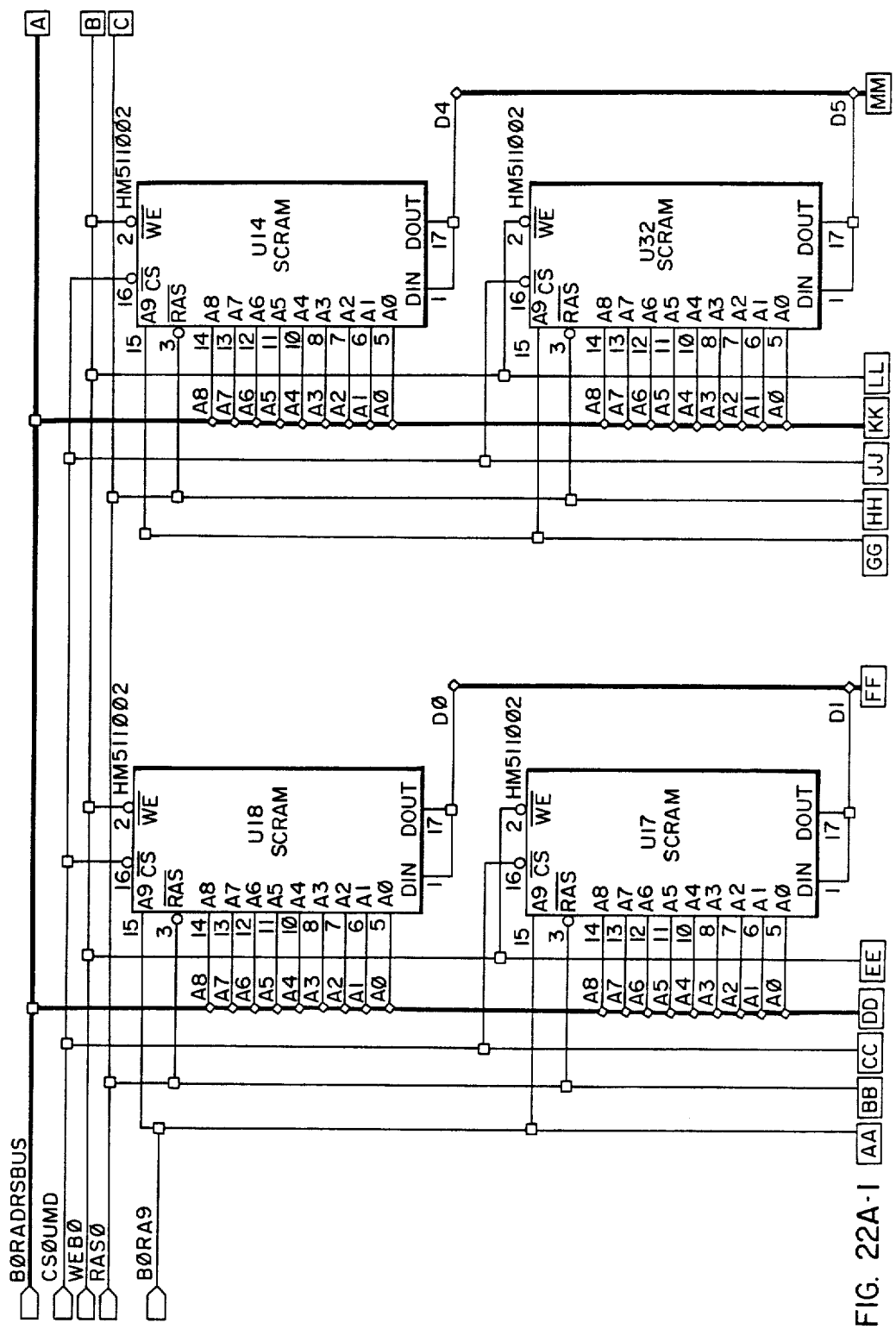
Figures 2, 22A:
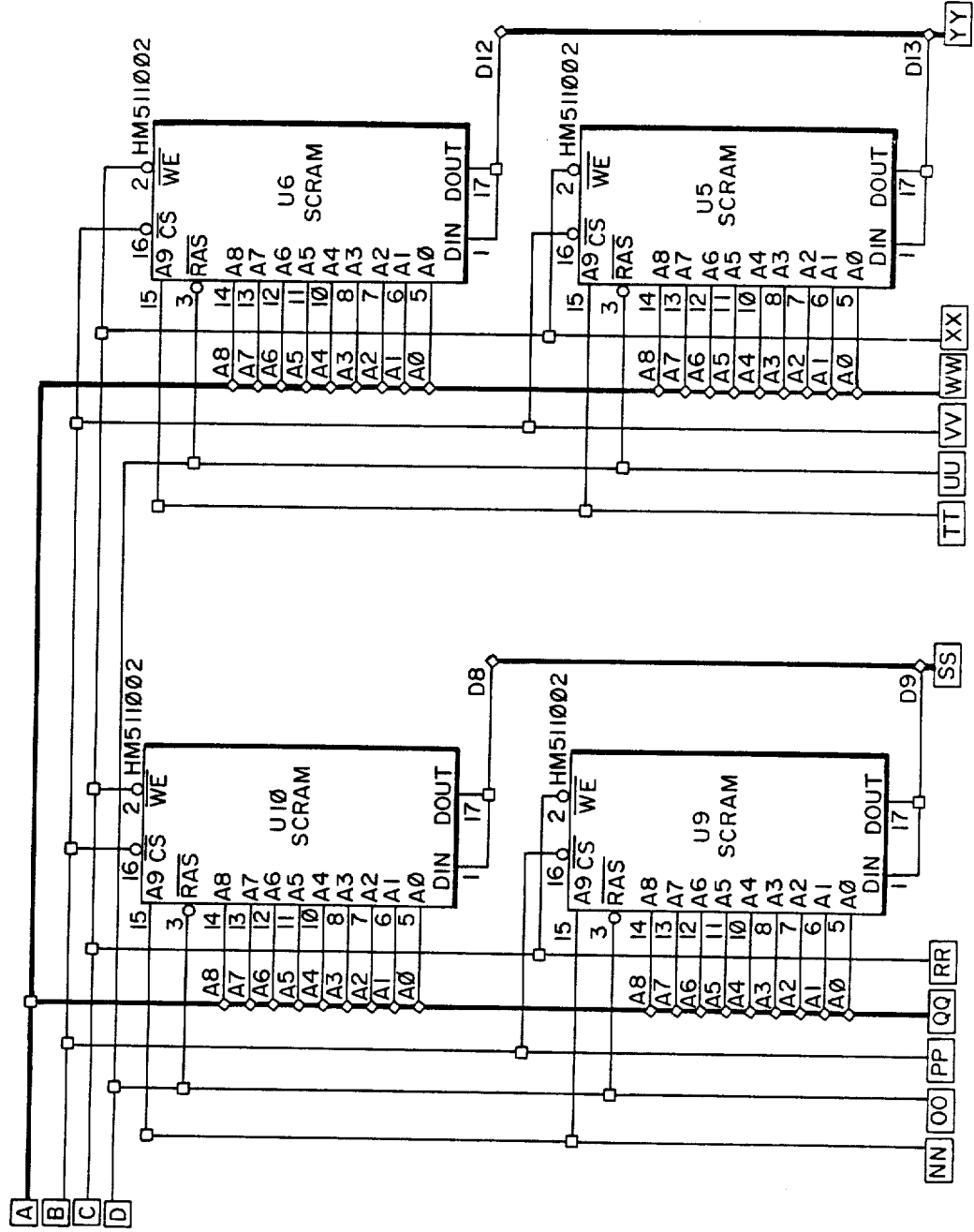
Figures 3, 22A:
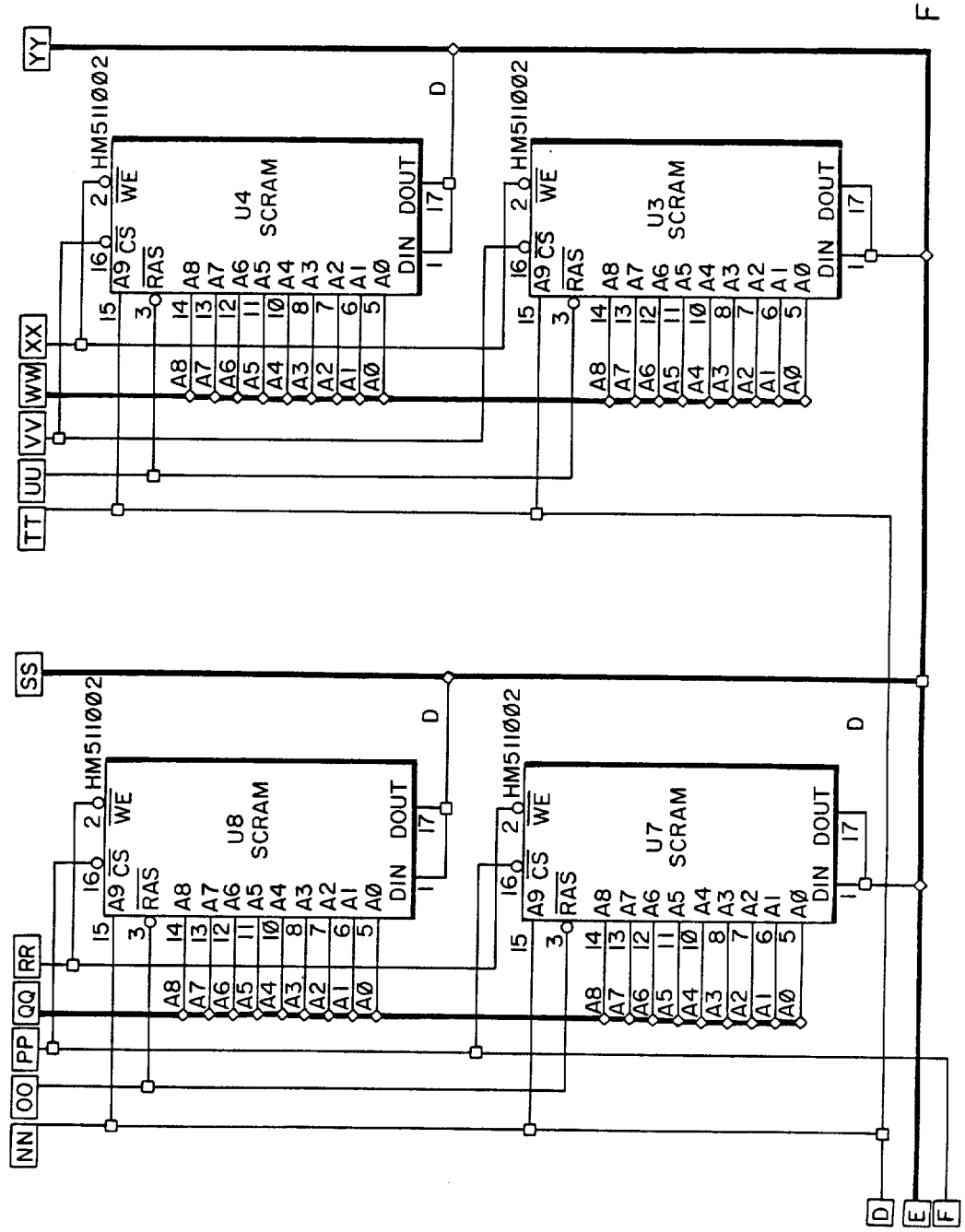
Figures 4, 22A:
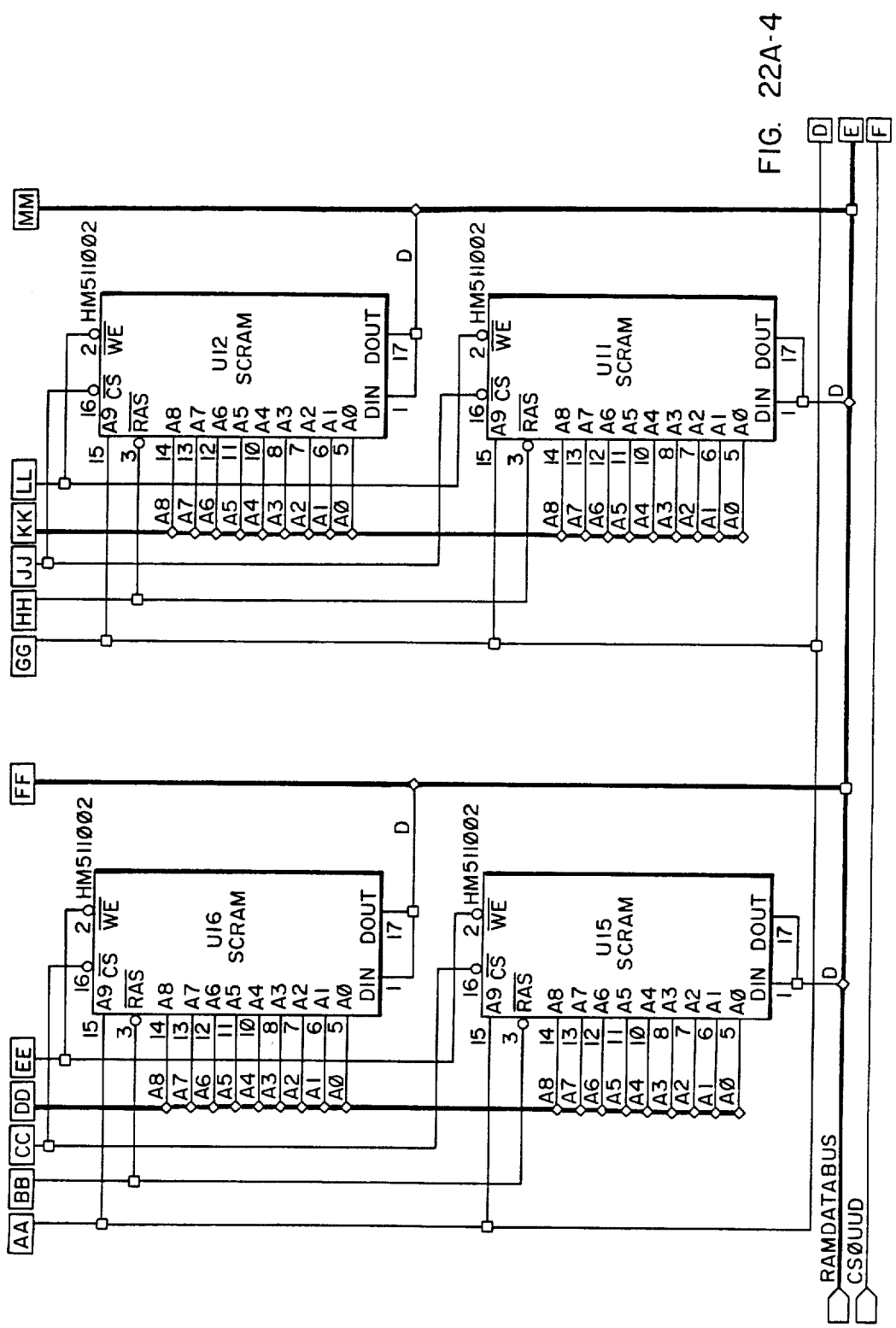
Figures 1, 22B:
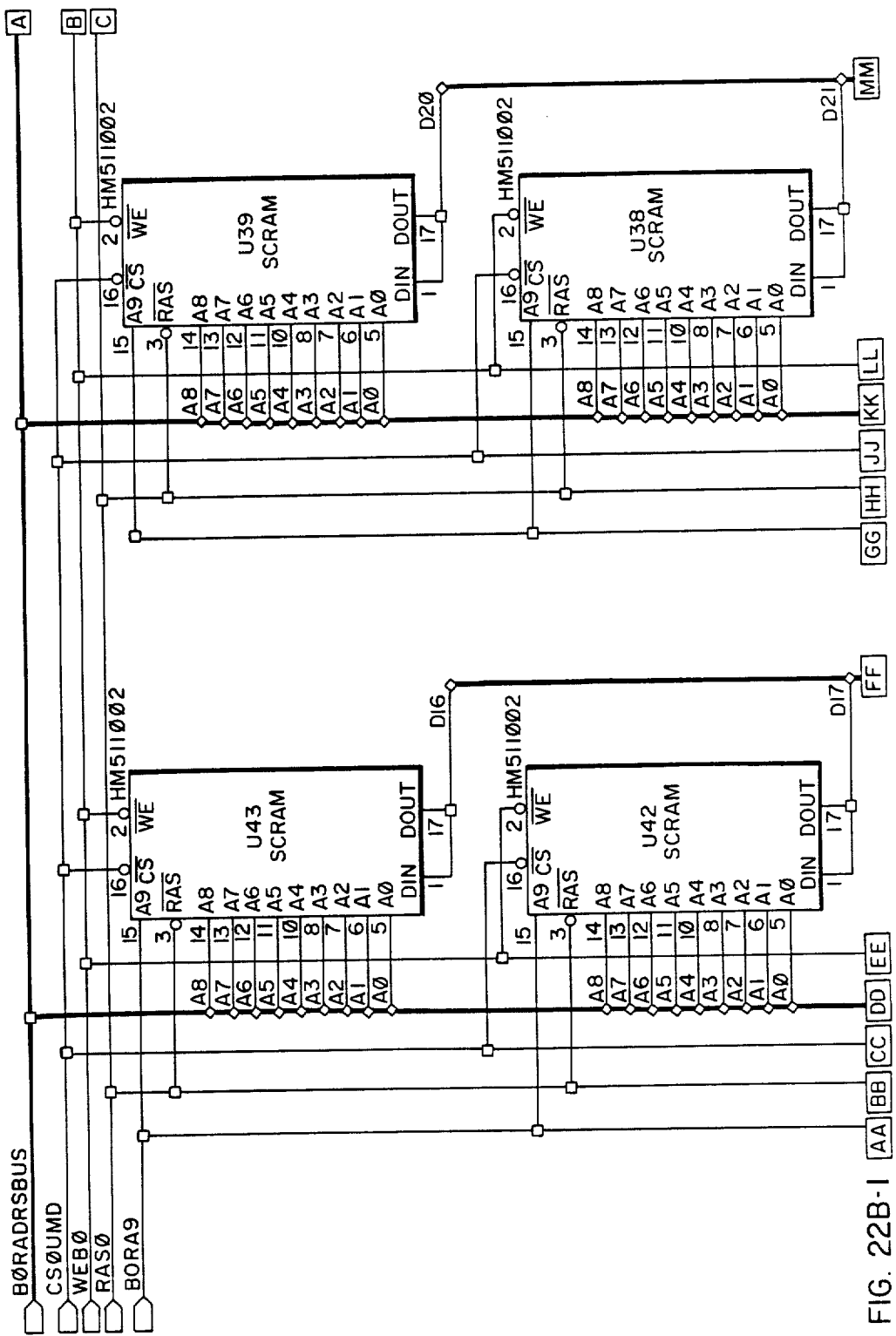
Figures 3, 22B:
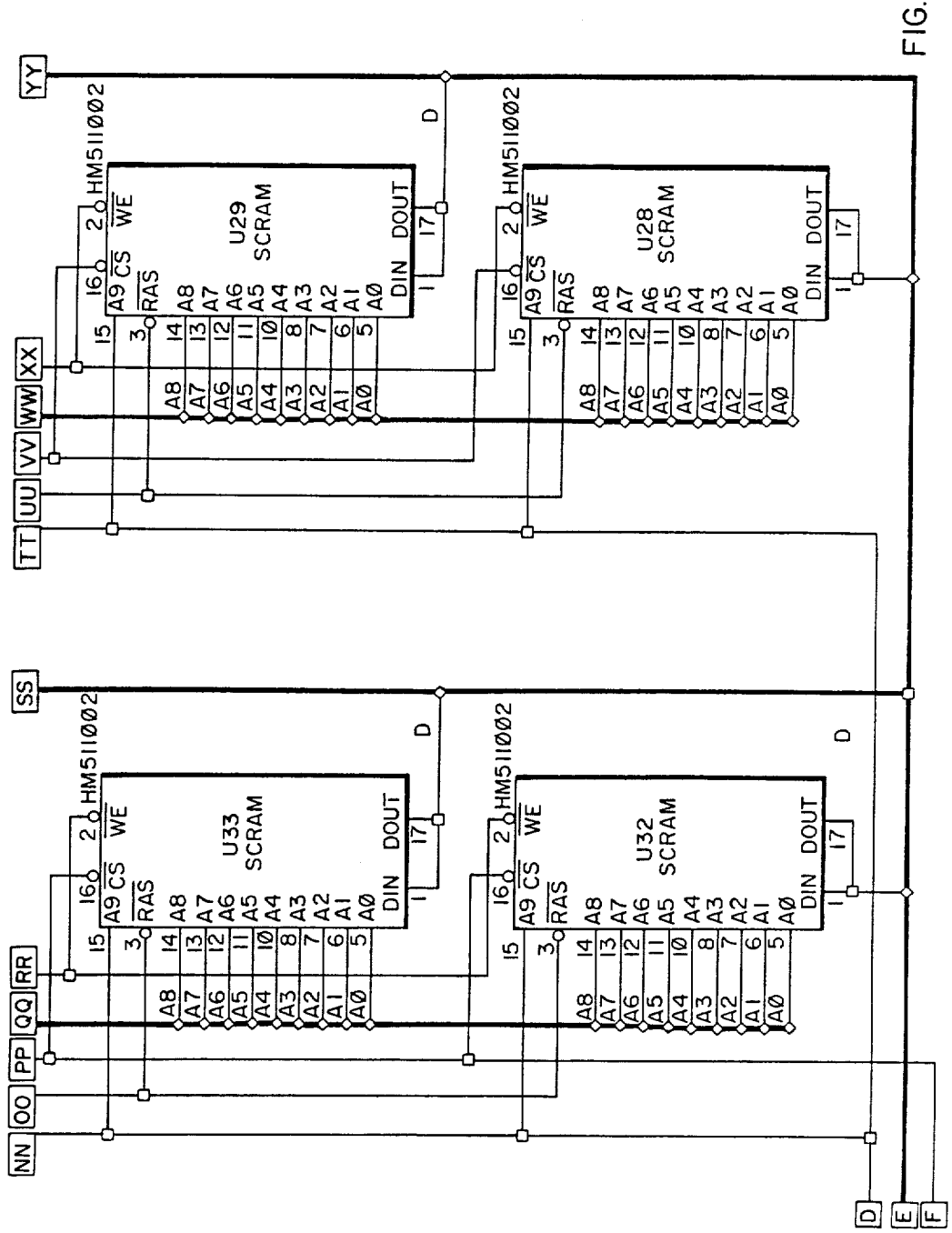
Figures 4, 22B:
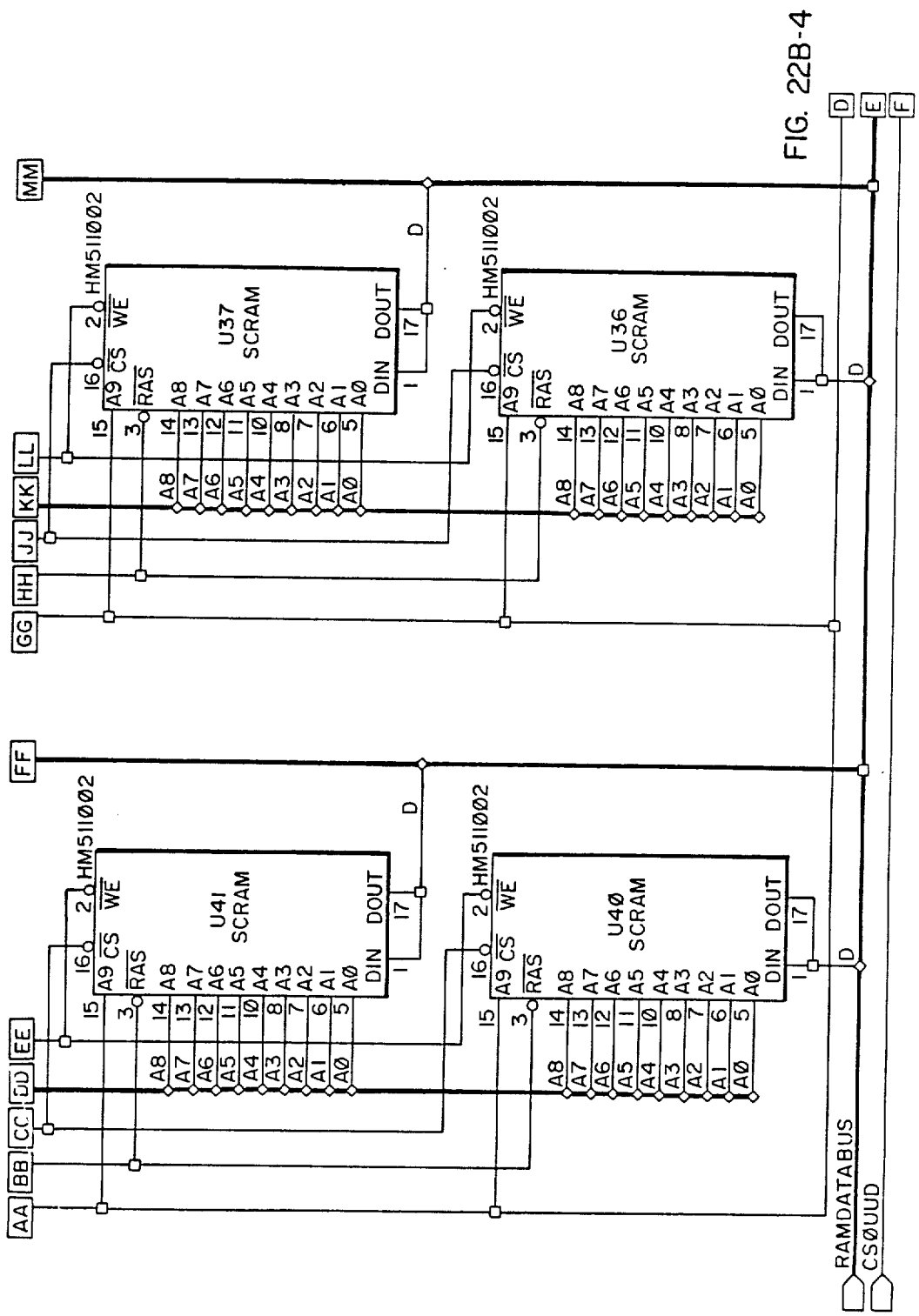

FIGS. 22A and 22b are detailed schematic diagrams showing the structure of bank 202A' incorporating the 1 megabit SCRAM devices. The structure of banks 202B'-202D' are identical to the structure shown in FIGS. 22A-22B with appropriate changes to the signal designations. As can be seen in FIGS. 22A and 22B, the structure of the SCRAM banks of the second embodiment is essentially similar to that found in the first embodiment with the addition of conductors to provide the "tenth" address bit to each of the SCRAM devices.

Provided below in Glossary K is a summary of the signals represented in FIGS. 21, 22A and 22B which have not previously been defined.

GLOSSARY K
(FIGS. 21 and 22A-22B)

| Signal/Bus | Function |
|---|---|
| B0LA9 | Bank Latched Address bit 9. Stores a bit which is used as the most significant column address bit during column selection. |
| B1LA9 | Bank 1 Latched Address bit 9. Stores a bit which is used as the most significant column address bit during column selection. |
| B2LA9 | Bank 2 Latched Address bit 9. Stores a bit which is used as the most significant column address bit during column selection. |
| B3LA9 | Bank 3 Latched Address bit 9. Stores a bit which is used as the most significant column address bit during column selection. |
| MUXA23 | Multiplexed Address bit 23. Selected from LCLADRSBUS or GLBLADRSBUS bit 23 depending on the T10ARB signal from the dual-port arbitration circuit. |
| B0RA9 | Bank 0 SCRAM Address bit 9. Address bit 9 to SCRAM bank 0. |
| B1RA9 | Bank 1 SCRAM Address bit 9. Address bit 9 to SCRAM bank 1. |
| B2RA9 | Bank 2 SCRAM Address bit 9. Address bit 9 to SCRAM bank 2. |
| B3RA9 | Bank 3 SCRAM Address bit 9. Address bit 9 to SCRAM bank 3. |

SUMMARY

The present invention is a significant advance in the art of memory systems for digital computers. The present invention provides a digital memory system which may be accessed at speeds attainable previously only when static RAM devices were used. Still further, the present invention provides a digital memory system having a density approximately equal to memory systems utilizing dynamic RAM devices. Still further, the embodiments of the present invention may be fabricated at a much lower cost than those memory systems utilizing static RAM devices.

The advance in the art which the present invention represents is best appreciated when it is realized that the memory systems previously available, which incorporate a memory management system and conventional dynamic RAM devices, often required between 200 and 300 nanoseconds, or longer, in order to perform a memory access. Thus, with previously available memory systems, a MC68020 CPU operating at 20 MHz is required to undergo one to three wait states for each memory access.

The present invention provides a dramatic increase over the relatively slow performance of previously available memory systems, and is able to complete a memory access in well under 150 nanoseconds (the time period allowed by the MC68020 CPU for a memory access without undergoing any wait states) when a hit occurs (i.e., the accessed memory location is positioned in a row already activated in static column mode). Still further, utilizing the presently preferred embodiments of the present invention, even if a miss occurs, the memory access may be completed within two wait states of a MC68020 CPU operating at 20 MHz.

Importantly, due to the nature of the structure of computer programs, it is generally expected that a digital computer operating in a typical business environment (and which has incorporated only 4 MBytes total memory provided on one board comprising four banks of the first embodiment illustrated herein) will experience one miss approximately every 12 hits. When the same digital computer is equipped with a total memory capacity of 8 MBytes provided in 8 banks as described herein, the performance dramatically improves to only one miss for every 46 hits.

Another important feature of the present invention is that the memory system and method is particularly well adapted for implementing a virtual memory scheme.

The pesent invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a digital computer including a high speed address generating device, an address bus, and a data bus, a digital memory system for rapidly accessing and retrieving binary information, the binary information being organized into frames and words contained in the frames, the digital memory system comprising:

digital memory storage means comprising a plurality of memory arrays, each array comprising memory locations defined by a plurality of rows and columns by which individual locations in each array are addressable, corresponding rows from each array together providing storage for at least a portion of said frames, the digital memory storage means further comprising (a) row activation means for activating in response to a first row address presented on the address bus corresponding first rows storing at least a portion of one of said frames, and (b) column selecting means for selecting in response to a sequence of column addresses presented on the address bus a sequence of memory locations on the first rows and accessing the memory locations identified by the activated first rows and selected columns;

tag means for storing a row identification portion of a first address presented on the address bus which identified and caused the activation of the first rows; and comparator means for determining whether a second address presented on the address bus includes a row identification portion which is equivalent to the row identification portion stored in the tag means, the comparator means generating an acknowledge signal whenever the row identification portion of the second address is equivalent to the row identification portion stored in the tag means thereby allowing the binary information contained in the memory locations on the first rows and identified by a column address portion of the second address to be output by the memory storage means directly onto the data bus in response to the presentation of the second address.

2. A memory system as defined in claim 1 wherein the memory means comprises at least on memory device and wherein the corresponding first rows of the memory array are equivalent to a frame.

3. A memory system as defined in claim 1 wherein the digital memory storage means comprises a plurality of static column random access memory devices.

4. A memory system as defined in claim 1 wherein the digital memory storage means comprises a plurality of static column random access memory devices, the static column random access memory devices interconnected such that at least one frame may be activated into static column mode.

5. A memory system as defined in claim 4 wherein the digital memory storage means comprises a plurality of static column random access memory devices interconnected such that a number of bits equal to a word may be simultaneously accessed.

6. A memroy system as defined in claim 5 wherein the word length comprises 32 bits.

7. A memory system as defined in claim 1 wherein the digital memory storage means comprises a plurality of banks, each bank capable of activating at least a frame into static column mode and wherein the row identification portion comprises a frame identification portion.

8. A memory system as defined in claim 7 wherein the digital memory storage means further comprises a plurality of static column random access memory devices and each bank comprises a plurality of static column random access memory devices.

9. A memory system as defined in claim 8 further comprising:

tag means for each bank, the tag means for storing a frame identification portion of an address previously presented on the address bus;

comparator means for each bank, the comparator means for comparing the frame identification portion stored in the tag means with a frame identification portion of an address currently presented on the address bus; and acknowledge means for indicating to the address generating device that the frame identification portion stored in the tag means and the frame identification portion of the address currently presented on the address bus are equivalent.

10. A memory system as defined in claim 1 wherein the tag means comprises means for storing a frame identification portion of the first address which was previously presented on the address bus and wherein the comparator means comprises means for comparing the frame identification portion stored in the tag means with a frame portion of a second address which is currently presented on the address bus.

11. A memory system as defined in claim 1 wherein the digital computer further includes a memory management unit adapted for translating logical addresses to physical addresses, the logical addresses including a page portion identifying a page in virtual memory, the page portion corresponding to a frame in physical memory and wherein the digital memory storage means comprises a plurality of banks, each bank including a plurality of static column random access memory devices arranged to hold at least one frame in static column mode in each bank, and wherein the tag means comprises a plurality of tag registers, each tag register associated with one bank, the tag registers each adapted for storing a page portion of a logical address, and wherein the comparator means comprises a plurality of comparators, each comparator associated with one tag register, a first input of each comparator in communication with the output of its associated tag register and a second input of each comparator in communication with the address bus each comparator adapted to compare the value stored in the associated tag register with the page portion of a logical address presented on the address bus, and wherein the memory system further comprises means for acknowledging to the address generating device that a hit has occurred.

12. A memory system as defined in claim 11 further comprising a transparent latch connected to the address bus, the transparent latch adapted to latch a page portion of the logical address and wherein the second input of each comparator is in communication with the output of the transparent latch.

13. A memory system as defined in claim 11 further comprising a multiplexor having inputs connected to the address bus and having outputs connected to the plurality of static column random access memory devices, the multiplexor being adapted to selectively apply a column address field or a row address field to the address inputs of the plurality of static column random access memory devices.

14. A memory system as defined in claim 11 further comprising a bank decode circuit connected to the address bus, the bank decode circuit comprising means for activating a frame in any of the plurality of banks into static column mode.

15. A memory system for rapidly accessing locations within a digital memory frame, the memory system adapted for use with a digital computer including an address generating device, a data bus, and an address bus, the memory system comprising:
digital storage means comprising an address input in communication with the address bus, at least one data port in communication with the data bus, and a plurality of memory array locations, accessed by a first presentation of a frame address and a subsequent presentation of at least one word address, and further comprising means for allowing the presentation of a plurality of word addresses without an intervening presentation of a frame address, whereby the presentation of each word address causes a location in the memory array to be place in communication with the data bus;
addressing means for presenting a word address portion to the digital storage means;
tag means for storing a frame address portion of a previously presented address placed on the address bus, the frame address portion identifying a set of memory locations corresponding to a portion of the digital storage means addressed by a frame address;
comparator means for (a) determining if the frame address portion of a previously presented address stored in the tag means is equivalent to a frame address portion of a currently presented address placed on the address bus and for (b) generating an acknowledge signal if the frame address portion of the currently presented address is equivalent to the frame address portion of the previously presented address; and
means for communicating the acknowledge signal to the address generating device to indicate that the presentation of the currently presented address on the address bus has caused the desired location in the memory array to be placed in communication with the data bus.

16. A memory system as defined in claim 15 wherein the digital memory means comprises at least one memory device wherein each set of active locations within the memory array is equivalent to a frame.

17. A memory system as defined in claim 15 wherein the digital memory means comprises a plurality of static column random access memory devices, the static column random access memory devices interconnected such that at least one frame may be activated into static column mode.

18. A memory system as defined in claim 17 wherein the digital memory means comprises a plurality of static column random access memory device interconnected such that a number of bits equal to a word may be simultaneously accessed.

19. A memory system as defined in claim 18 wherein the word is equal to 32 bits.

20. A memory system as defined in claim 15 wherein the digital memory means comprises a plurality of banks, each bank capable of activating at least an entire frame into static column mode.

21. A memory system as defined in claim 14 wherein the digital computer implements a virtual memory scheme whereby both logical addresses and translated physical addresses are sequentially presented on the address bus and wherein the tag means comprises a tag register adapted for storing a frame address portion of a logical address.

22. A memory system as defined in claim 21 wherein the digital memory means further comprises a plurality of static column random access memory devices, each bank comprising at least one static column random access memory device.

23. A memory system as defined in claim 22 further comprising a transparent latch connected to the address bus, the transparent latch adapted to latch a frame portion of the logical address and wherein the input of each tag register is in communication with the output of the transparent latch.

24. A memory system as defined in claim 23 wherein the comparator means comprises a plurality of comparators, each comparator having a first input connected to the address bus and a second input connected to the output of the tag register.

25. A memory system as defined in claim 22 further comprising a multiplexor having inputs connected to the address bus and having outputs connected to the plurality of static column random access memory devices, the multiplexor being adapted to selectively apply a column address field or a row address field tothe address inputs of the plurality of static column random access memory devices.

26. A memory system as defined in claim 20 further comprising a bank decode circuit connected to the address bus, the bank decode circuit comprising means for activating a frame in any of the plurality of banks into static column mode.

27. A memory system for use in a digital computer including an address generating device in communication with an address bus and a data bus, the memory system comprising:
a plurality of memory banks, each memory bank comprising a plurality of digital memory devices having their address inputs in communication with the address bus, each memory device capable of operating such that the presentation of a first device address activates a frame of memory array locations into static random access mode such that a plurality of locations in the frame of memory array locations may be sequentially accessed as a static random access memory by the presentation of a plurality of second device addresses, the digital memory devices all having a data port in communication with the data bus and the presentation of a second device address causes the addressed memory array location to be placed in communication with the data bus;

a plurality of tag registers, each tage register associated with one bank, the tag registers adapted for storing at least a frame address portion of the last address presented on the address bus which caused an access to a location in the bank associated with the tag register, the frame address portion corresponding to one frame of memory array locations which may be activated into static random access mode;

a plurality of comparators, each comparator associated with a tag register, the comparators adapted for (a) comparing the value stored in the associated tag register with the value of a frame address portion of a currently presented address placed on the address bus and for (b) asserting a hit signal if the two compared values are equivalent; and means for acknowledging to the address generating device if the comparator has asserted a hit signal and that the addressed memory location has been placed in communication with the data bus.

28. A memory system as defined in claim 27 wherein the plurality of digital memory devices comprise a plurality of static column random access memory devices.

29. A memory system as defined in claim 28 wherein the first device address comprises a row address of the plurality of static column random access memory devices and wherein the second device address comprises a column address to the plurality of static column random access memory devices.

30. A memory system as defined in claim 27 wherein the digital computer includes a memory management unit which controls the presentation of logical address and physical addresses on the address bus, and wherein the memory system further comprises a transparent latch, the transparent latch connected to the address bus and adapted for latching the value of a portion of the logical address corresponding to a frame of memory array locations, the output of the transparent latch connected to the input of the plurality of tag registers.

31. A memory system as defined in claim 27 wherein each bank comprises thirty-two static column random access memory devices having their outputs connected to form a thirty-two bit data pathway in communication with the address bus.

32. A static frame digital memory for use in a digital computer including an address generating device connected to an address bus and a data bus, the digital computer implementing a virtual memory scheme wherein virtual memory is divided into pages and the address generating device sequentially presents a logical address including a column address field and a remainder field to the static frame digital memory, the static frame digital memory comprising:

a plurality of memory banks, each memory bank comprising a plurality of static column random access memory devices, the static column random access memory devices being arranged such that at least one frame may be held in static column mode in each bank, the frame being of a size sufficient to hold one page of data;

a multiplexor circuit receiving input from the address bus and outputting a column address to all of the static column random access devices;

a plurality of tag registers, one tag register being associated with each bank, the tag registers each being adapted to store the value of the logical address remainder field of the most recent address presented on the address bus which caused an access to the bank associated with the tag register;

a latch circuit with inputs connected to the address bus and outputs connected to the inputs of all of the tag registers, the latch circuit holding the value of the remainder field of the address currently presented on the address bus;

a plurality of comparators, each comparator being associated with one bank and its associated tag register, each comparator being adapted for (a) ascertaining if a hit has occurred by determining if the value of the remainder field of the address currently presented on the address bus is equivalent to the value stored in the associated tag register and for (b) asserting a signal if the values are equivalent; and means for acknowledging to the address generating device that a hit has occurred.

33. A method of controlling the memory functions of a digital computer, the digital computer including an address generating device, an address bus, and a data bus, the method comprising the steps of:

providing a digital memory device having address inputs in communication with the address bus and having at least one data port in communication with the data bus, the digital memory device including a memory array wherein the presentation of a first device address to the address inputs causes the activation of a set of active locations within the memory array and the presentation of a second device address to the address inputs causes a memory location in the set of active locations to be placed in communication with the data bus;

presenting a currently presented address on the address bus;

comparing the currently presented address with a previously presented address to determine if the location to be accessed by the currently presented address is contained within the set of active locations in the memory array;

presenting the second device address to the digital memory device; and accessing the memory location in the set of active locations identified by the second device address if the location to be accessed by the currently presented address is contained within the active set of locations.

34. A method as defined in claim 33 wherein the step of providing at least one digital memory device comprises the steps of:

providing a plurality of static column random access memory devices; and organizing the plurality of static column random access memory devices into banks such that each bank is capable of activating at least one frame into static column mode.

35. A method as defined in claim 33 wherein the digital computer implements a virtual memory scheme including the steps of presenting a logical address on the address bus for each memory access followed by the conditional presentation of a translated physical address, and wherein the step of presenting a currently presented address comprises the steps of:

presenting a logical address on the address bus, the logical address including a field identifying a specific location within a frame; and presenting a translated physical address on the address bus, the translated physical address also including a field identifying the specific location within a frame.

36. A method as defined in claim 35 further comprising the step of storing a field in the logical address identifying a frame in physical memory.

37. A method as defined in claim 35 wherein the step of comparing the currently presented address with a previously presented address comprises the step of comparing a portion of the previously presented logical address which corresponds to a memory frame with a portion of the currently presented logical address which corresponds to a memory frame.

38. A method as defined in claim 33 wherein the step of providing a digital memory device comprises the step of providing a static column random access memory device and wherein the first device address comprises a row address and the second device address comprises a column address.

39. A method of performing memory accesses in a digital computer, the digital computer including an address generating device, an address bus, and a data bus, the method comprising the steps of:
providing at least one digital memory device having an address input in communication with the address bus and having at a data port in communication with the data bus, the digital memory device including a two dimensional memory array wherein the presentation of a first device address to the address input causes the selection of a set of active locations within the memory array and the sequential presentation of a plurality of second device addresses to the address input causes a plurality of memory locations in the set of active locations to be sequentially connected to the data port;
presenting an original address on the address bus from the address generating device;
selecting a set of active locations containing the memory array location identified by the original address;
selecting a first memory array location within the set of active locations corresponding to the original address;
accessing the first memory array location;
presenting a subsequent address on the address bus from the address generating divide;
determining if the location corresponding to the subsequent address is contained within the selected set of active locations;
selecting a second memory array location identified by the subsequent address from the set of active locations if the second single location is contained within the active set of locations; and
accessing the second memory array location.

40. A method as defined in claim 39 wherein the step of providing at least one digital memory device comprises the step of providing at least one static column random access memory device and wherein the first address comprises a row address and the second device address comprises a column address.

41. A method as defined in claim 40 wherein the step of selecting a set of active locations comprises the steps of:
presenting a row address to the static column random access memory device; and
asserting a row address selection signal.

42. A method as defined in claim 41 wherein the step of accessing the first memory array location comprises the step of presenting a column address to the static column random access memory device.

43. A method as defined in claim 42 wherein the step of accessing the first memory array location further comprises the step of asserting a chip select signal.

44. A method as defined in claim 39 wherein the step of determining if the location corresponding to the subsequent address is contained within the selected set of active locations comprises the steps of:
storing at least a portion of the original address;
comparing the stored portion of the original address with a corresponding portion of the subsequent address; and
generating an acknowledge signal if the compared portions are equivalent.

45. A method as defined in claim 39 further comprising the step of arranging a plurality of digital memory devices into banks, the digital memory devices organized such that a frame in memory is equivalent to a set of active locations.

46. A method as defined in claim 39 further comprising the steps of:
presenting a plurality of subsequent addresses on the address bus, the locations corresponding to the subsequent addresses being contained within the selected set of active locations;
sequentially selecting a plurality of memory array locations identified by the corresponding subsequent addresses; and
sequentially accessing the plurality of memory array locations.

47. A method of operating a memory system in a digital computer, the digital computer including an address generating device, an address bus, and a data bus, the method comprising the steps of:
providing a plurality of memory devices capable of operating in a static column mode, the address inputs of the memory devices in communication with the address bus and the data ports of the memory devices in communication with the data bus;
presenting a first address on the address bus;
activating a set of locations in the memory devices into static column mode, the set of locations containing the memory location identified by the first address;
storing a portion of the first address;
presenting a second address on the address bus;
comparing the stored portion of the first address with a corresponding portion of the second address to determine if the set of locations activated into static column mode contain the memory location identified by the second address; and
accessing the memory location identified by the second address if the memory location is located in the set of locations activated into static column mode.

48. A method as defined in claim 45 wherein the step of providing a plurality of memory devices comprises providing a plurality of static column random access memory devices.

49. A method as defined in claim 47 wherein the step of providing a plurality of memory devices comprises the step of providing a pluraity of static column random access memory devices, the random access memory devices being organized into banks, each bank including at least one static column random access memory device.

50. A method as defined in claim 47 further comprising the step of organizing the banks such that each bank contains memory frame which may be activated into static column mode.

51. A method as defined in claim 47 wherein the digital computer further includes a memory management unit which translates logical addresses into physical addresses and wherein the step of presenting a first address on the address bus comprises the steps of:
presenting a first logical address on the address bus; and
presenting a first physical address on the address bus; and
wherein the step of storing a portion of the first address comprises storing a portion of the first logical address.

52. A method as defined in claim 49 wherein the step of presenting a second address comprises the step of presenting a second logical address and wherein the step of comparing the stored portion of the first address comprises the step of comparing the stored portion of the first logical address with a corresponding portion of the second logical address.

53. A method as defined in claim 52 further comprising the steps of:
generating an acknowledge signal if the compared portions of the first and second logical addresses are equivalent; and
presenting the acknowledge signal to the address generating device.

54. A method as defined in claim 49 wherein the step of storing a portion of the first address further comprises storing a portion of a plurality of first addresses, each stored first address being associated with a bank, and wherein the step of comparing the stored portion of the first address further comprises comparing a portion of the second address with all the stored first addresses and wherein the method further comprises the step of acknowledging to the address generating device if a match occurs.

55. A method as defined in claim 49 wherein the step of accessing the memory location identified by the second address comprises the step of presenting a column address to the plurality of static column random access devices.

56. A method of operating a static frame digital memory system in a digital computer, the digital computer including an address generating device, an address bus, and a data bus, the digital computer implementing a virtual memory scheme wherein logical addresses comprising a column field and a remainder field and which identify locations within a page of virtual memory are presented on the address bus and translated physical addresses and which identify frames within the static frame digital memory system are also presented on the address bus, the method comprising the steps of:
providing a plurality of static column random access memory devices organized into banks such that at least one frame may be activated into static column mode in each bank by presenting a device row address to at least one static column random access memory device in each bank;
presenting a first logical address on the address bus;
defining a column field of the first logical address and presenting the column address to all static column random access memory devices;
defining a remainder field of the first logical address;
latching the remainder field of the first logical address into a logical address latch;
presenting a first translated address on the address bus;
defining a row device address field in the translated address;
presenting a row device address to the static column random access memory devices and activating a frame into static column mode in a bank;
storing the reaminder field latched into the logical address latch in a tag register which is associated with the bank containing the activated frame;
performing a static column mode access on the location identified by the first translated address and maintaining the active frame in static column mode;
presenting a second logical address on the address bus;
defining a column field of the second logical address and presenting the column address to all static column random access memory devices;
defining a remainder field of the second logical address;
latching the remainder field of the second logical address into a logical address latch;
comparing the value of the remainder field latched into the logical address latch with the values previously stored in the plurality of tag registers;
performing a static column mode access in the active frame which has been maintained in static column mode on the location within the active frame indentified by the column field in the second logical address; and
acknowledging to the address generating device that the memory access has occurred.

* * * * *

UNITED STATES PATENT AND TRADEMARK OFFICE
CERTIFICATE OF CORRECTION

PATENT NO. : 4,839,796

DATED : June 13, 1989

INVENTOR(S) : Randall J. Rorden et al.

It is certified that error appears in the above-identified patent and that said Letters Patent is hereby corrected as shown below:

Column 1, line 16, "capables" should be --capable--

Column 1, lines 41-42, "microprocessors operating speed" should be --microprocessor operating speed--

Column 3, line 9, "wherin" should be --wherein--

Column 3, line 65, "euals" should be --equals--

Column 4, line 5, "address" should be --address.--

Column 4, line 12, "preent" should be --present--

Column 4, line 19, "row " should be --row'--

Column 5, line 3, " FIG. 9A-2,   FIG. 9A-3,   and "FIG. 9A-4, " should be -- "FIG. 9A-2," "FIG. 9A-3," and "FIG. 9A-4." --

Column 5, lines 36-37, "are is a detailed schematic diagram" should be --are detailed schematic diagrams-- (PTO error)

Column 5, lines 41-42, "are a detailed schematic diagram" should be --are detailed schematic diagrams--

Column 5, lines 49-50, "are is a detailed schematic diagram" should be --are detailed schematic diagrams--

Column 5, line 53, "are a detailed schematic diagram" should be --are detailed schematic diagrams--

Column 5, lines 57-58, "are is a detailed schematic diagram" should be --are detailed schematic diagrams--

Column 5, line 61, "are a detailed schematic diagram" should be --are detailed schematic diagrams--

Column 6, lines 18-19, "are a detailed schematic diagram" should be --are detailed schematic diagrams--

Column 6, lines 23-24, "are a detailed schematic diagram" should be --are detailed schematic diagrams--

Column 6, line 28, "are a detailed schematic diagram" should be --are detailed schematic diagrams--

Column 6, lines 37-38, "are is a detailed schematic diagram" should be --are detailed schematic diagrams--

Column 8, line 19, " SCRAM,;38" " should be --"SCRAM,"--

UNITED STATES PATENT AND TRADEMARK OFFICE
CERTIFICATE OF CORRECTION

PATENT NO. : 4,839,796

DATED : June 13, 1989

INVENTOR(S) : Randall J. Rorden et al.

It is certified that error appears in the above-identified patent and that said Letters Patent is hereby corrected as shown below:

Column 9, line 68, "(COLUMN 32)" should be --COLUMN 2)--
Column 16, lines 8-9, "transfered" should be --transferred--
Column 16, line 50, "$2^6 = 64$)" should be --$(2^6 = 64)$)--
Column 20, line 48, "222" should be --322--
Column 22, line 8, "to defined" should be --to define--
Column 24, line 33, "devices" should be --devised--
Column 24, line 66, "registers" should be --register--
Columns 29-30, line 13, "PARITYCKL" should be --PARITYCLK--
Column 34, line 2, "addres" should be --address--
Column 39, line 11, "summar" should be --summary--
Column 41, line 54, "latches 242D-242D" should be --latches 242A-242D--
Column 43, line 28, "fame latches" should be --frame latches--
Column 46, line 8, "memroy" should be --memory--
Column 51, line 47, "address generating divide;" should be --address generating device--
Column 51, lines 59-60, "first address" should be --first device address--

Signed and Sealed this

Tenth Day of August, 1993

Attest:

Attesting Officer

MICHAEL K. KIRK

Acting Commissioner of Patents and Trademarks